(12) United States Patent
Longest

(10) Patent No.: US 11,150,800 B1
(45) Date of Patent: Oct. 19, 2021

(54) PINCH-BASED INPUT SYSTEMS AND METHODS

(71) Applicant: Facebook Technologies, LLC, Menlo Park, CA (US)

(72) Inventor: Matthew Longest, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/571,274

(22) Filed: Sep. 16, 2019

(51) Int. Cl.
| G06F 3/048 | (2013.01) |
| G02B 27/00 | (2006.01) |
| G06F 3/0488 | (2013.01) |
| G06F 3/0482 | (2013.01) |
| G02B 27/01 | (2006.01) |

(52) U.S. Cl.
CPC ..... *G06F 3/04883* (2013.01); *G02B 27/0172* (2013.01); *G06F 3/0482* (2013.01); *G02B 2027/0138* (2013.01); *G06F 2203/04808* (2013.01)

(58) Field of Classification Search
CPC ....... G06F 3/04883; G06F 2203/04808; G06F 2203/04809; G02B 27/0172; G02B 2027/0138
See application file for complete search history.

(56) References Cited

U.S. PATENT DOCUMENTS

| 8,854,433 | B1* | 10/2014 | Rafii | G06F 3/017 |
| | | | | 348/47 |
| 8,902,198 | B1* | 12/2014 | Karakotsios | G06F 3/017 |
| | | | | 345/175 |
| 9,207,852 | B1* | 12/2015 | Zhou | G06F 3/0425 |
| 9,229,534 | B2* | 1/2016 | Galor | G06F 3/0481 |
| 9,377,863 | B2* | 6/2016 | Bychkov | G06F 3/017 |
| 9,501,152 | B2* | 11/2016 | Bedikian | G06F 3/017 |
| 9,504,920 | B2* | 11/2016 | Kareemi | A63F 13/22 |
| 9,600,078 | B2* | 3/2017 | Rafii | G06F 3/042 |
| 9,639,167 | B2* | 5/2017 | Chang | G06F 3/017 |
| 9,734,393 | B2* | 8/2017 | Wang | G06F 3/011 |
| 9,996,638 | B1* | 6/2018 | Holz | G06F 30/20 |
| 10,001,838 | B2* | 6/2018 | Karakotsios | G06F 3/042 |
| 10,019,074 | B2* | 7/2018 | Hegde | G06F 3/0428 |
| 10,139,918 | B2* | 11/2018 | Bedikian | G06F 3/0325 |
| 10,416,834 | B1* | 9/2019 | Holz | G06F 3/011 |
| 10,437,465 | B2* | 10/2019 | Youn | G06F 3/04883 |

(Continued)

OTHER PUBLICATIONS

"The All New TAP Strap 2—Now With Air Gestures!", URL: https://www.tapwithus.com/, Tap Systems, Inc., as accessed on Dec. 16, 2019, 1 page.

(Continued)

*Primary Examiner* — Daeho D Song
(74) *Attorney, Agent, or Firm* — FisherBroyles, LLP

(57) ABSTRACT

The disclosed computer-implemented method may include (1) monitoring, at a computing device via one or more sensors, positions of one or more fingers of a user relative to an opposing thumb of the user, (2) detecting, while monitoring the positions, a pinch gesture of the one or more fingers, (3) determining one or more user inputs to which at least the pinch gesture has been mapped, and (4) performing, at the computing device, a user-input operation based on the one or more user inputs. Various other methods, systems, and computer-readable media are also disclosed.

20 Claims, 44 Drawing Sheets

(56) References Cited

U.S. PATENT DOCUMENTS

| | | | |
|---|---|---|---|
| 10,514,801 B2* | 12/2019 | Pahud | G06F 3/0393 |
| 10,545,663 B2* | 1/2020 | Yoon | G06F 3/04886 |
| 11,029,147 B2* | 6/2021 | Abovitz et al. | H04N 10/25891 |
| 2002/0158827 A1* | 10/2002 | Zimmerman | G06F 3/012 |
| | | | 345/88 |
| 2006/0066588 A1* | 3/2006 | Lyon | G06F 3/0446 |
| | | | 345/173 |
| 2011/0078568 A1* | 3/2011 | Park | G06F 3/04883 |
| | | | 715/702 |
| 2011/0134047 A1* | 6/2011 | Wigdor | G06F 3/04883 |
| | | | 345/173 |
| 2012/0242581 A1* | 9/2012 | Laubach | G06F 3/0213 |
| | | | 345/168 |
| 2012/0293427 A1* | 11/2012 | Mukai | G06F 3/0484 |
| | | | 345/173 |
| 2013/0283213 A1* | 10/2013 | Guendelman | G06F 3/0485 |
| | | | 715/848 |
| 2014/0267044 A1* | 9/2014 | Andersen | G06F 3/04886 |
| | | | 345/168 |
| 2014/0298266 A1* | 10/2014 | Lapp | G06F 3/04883 |
| | | | 715/835 |
| 2014/0317540 A1* | 10/2014 | Kawano | G06F 3/04842 |
| | | | 715/764 |
| 2015/0062006 A1* | 3/2015 | Karakotsios | G06F 3/042 |
| | | | 345/156 |
| 2015/0242118 A1* | 8/2015 | Zhang | G06F 3/04886 |
| | | | 715/773 |
| 2015/0346829 A1* | 12/2015 | Chang | G06F 3/0484 |
| | | | 345/156 |
| 2016/0070461 A1* | 3/2016 | Herbordt | G06F 3/04883 |
| | | | 345/178 |
| 2016/0124513 A1* | 5/2016 | Dal Zot | G06K 9/00355 |
| | | | 715/863 |
| 2017/0192465 A1* | 7/2017 | Lazaridis | G06F 1/1662 |
| 2017/0308181 A1* | 10/2017 | Youn | B60K 35/00 |
| 2018/0004312 A1* | 1/2018 | Lee | G06F 3/011 |
| 2018/0129402 A1* | 5/2018 | Rottler | G06F 3/04845 |
| 2018/0173417 A1* | 6/2018 | Foresti | G06F 3/013 |
| 2019/0362562 A1* | 11/2019 | Benson | G06K 9/00671 |
| 2020/0004403 A1* | 1/2020 | Holz | G06F 3/011 |

OTHER PUBLICATIONS

Lee et al., "Interaction Methods for Smart Glasses: A survey", IEEE, May 28, 2018, 23 pages.

Steimle et al., "On-Skin Interaction Using Body Landmarks", Computer, The IEEE Computer Society, Oct. 3, 2017, pp. 32-40.

* cited by examiner

PINCH-BASED INPUT SYSTEMS AND METHODS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
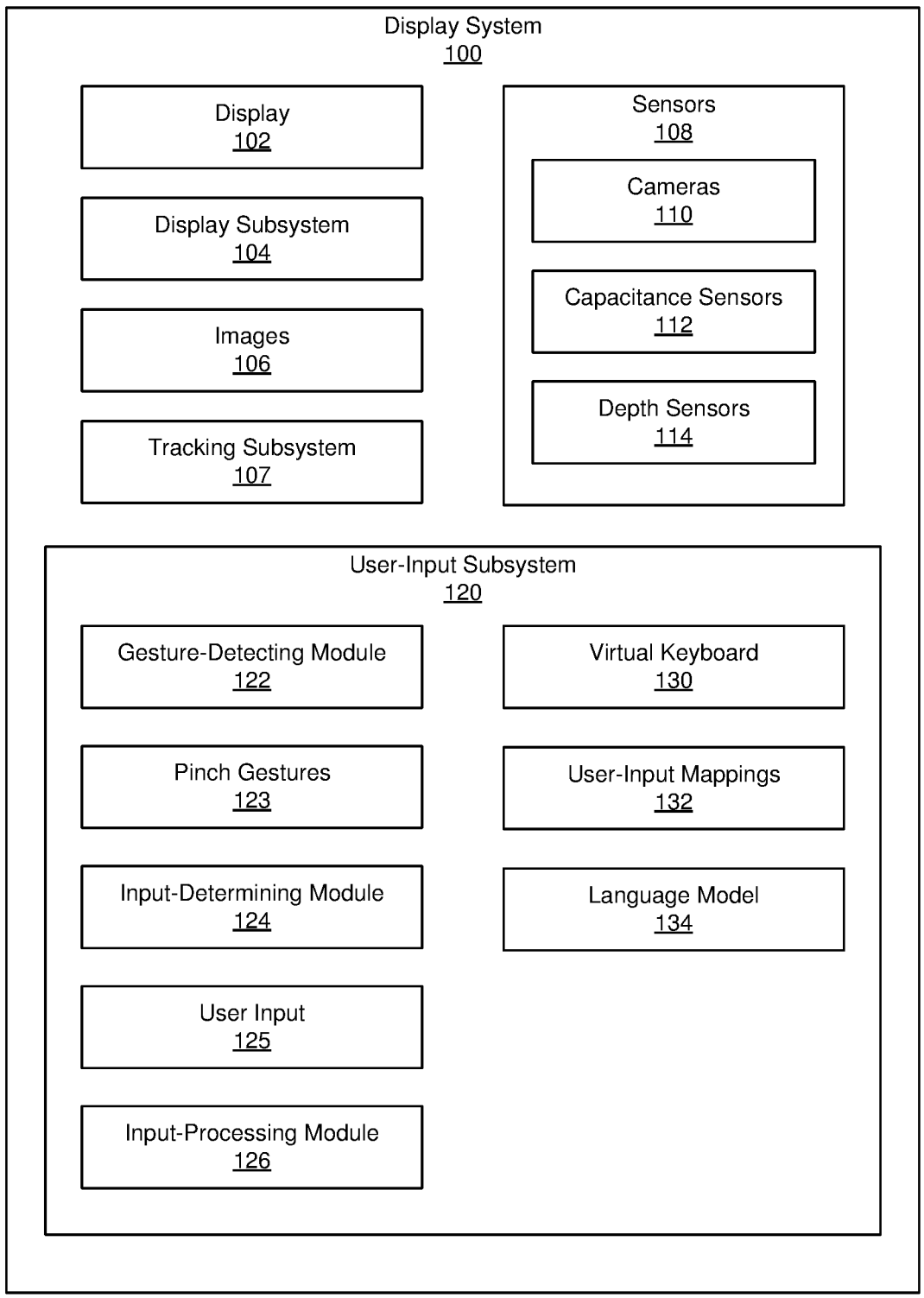
FIG. 1 is a block diagram of an exemplary display system for processing pinch-based user input according to some embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Many conventional computing systems do not include or integrate physical key-based input devices. In many instances, the form factors of these computing systems may not be conducive to such input devices. For example, many conventional artificial-reality devices, mobile phones, gaming systems, televisions, etc. cannot or do not include traditional physical keyboards like those that have typically been included or integrated with traditional desktop or laptop computing devices and with which many users are already proficient and comfortable. While most of these computing systems include alternative methods for inputting text, most methods come with significant downsides. For example, screen-based touch keyboards used by mobile phones, tablet devices, and other touch-based devices can consume large portions of screen real estate. Additionally, virtual keyboards used by conventional televisions and artificial-reality devices typically employ inefficient, slow, and/or limited means of key selection (e.g., x-y controllers or pointer devices).

The present disclosure is generally directed to pinch-based input systems and methods. As will be explained in greater detail below, embodiments of the present disclosure may enable users to select text-based input (e.g., characters or words) and/or other types and forms of user input using pinch gestures. In some embodiments, the systems and methods described herein may use various sensors (e.g., optical sensors) to track the positions of a user's fingers and thumbs and may transform pinch gestures involving one or more fingers and a respective thumb into distinct alphanumeric characters. By mapping the characters of standard keyboard layouts to particular finger-to-thumb pinch gestures, these systems and methods may enable users to have familiar touch-typing experiences without the need for conventional physical keyboards. Moreover, by employing pinch gestures for touch typing, the systems and methods described herein may enable a user's own fingertips to provide haptic feedback.

In some embodiments, the systems described herein may interpret the tapping of a finger to a thumb as a user selecting the same keyboard key or keys that that finger would typically select while typing on a conventional physical keyboard. In some embodiments, the systems and methods disclosed herein may map the three (or four) primary rows of a conventional keyboard to three (or four) orientations or positions of a user's hand. In some embodiments, the systems and methods described herein may include a language model configured to predict or disambiguate user input, particularly in embodiments that forego hand positions or orientations as keyboard-row selectors and/or embodiments that map one pinch gesture to many possible keyboard keys. In some embodiments, the systems described herein may interpret a pinch gesture and a twist motion as a special character, such as a space or a backspace. The systems described herein may also interpret various hand orientations or handshapes, such as a first gesture, as a command to modify other character selections made in the other hand. For example, a first gesture in one hand may designate a shift command for characters selected by pinch gestures in the other hand. Features from any of the embodiments described herein may be used in combination with one another in accordance with the general principles described herein. These and other embodiments, features, and advantages will be more fully understood upon reading the following detailed description in conjunction with the accompanying drawings and claims.

Figure 4:
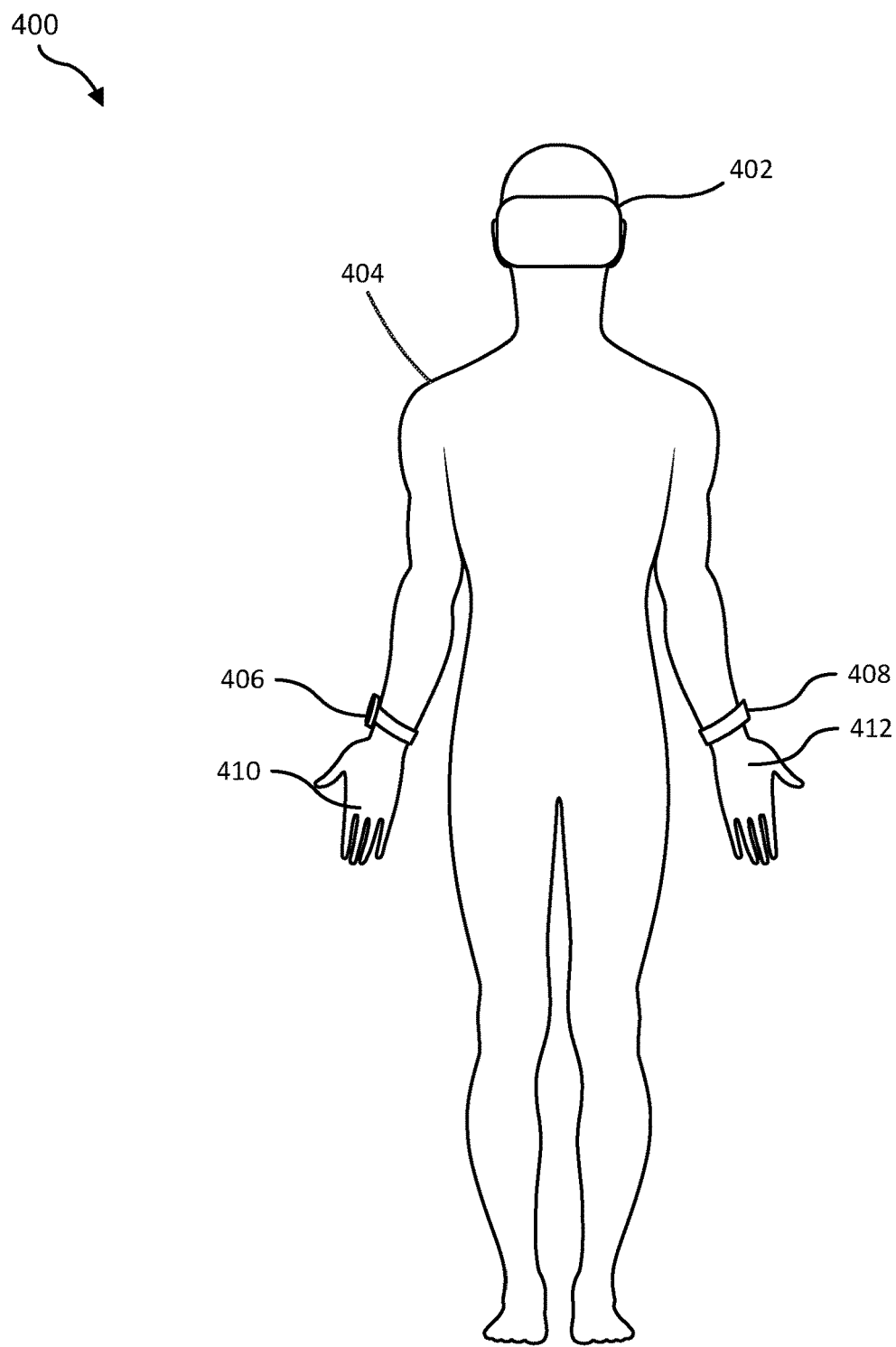
FIG. 4 is a front view of a user wearing an exemplary head-mounted-display device of an exemplary interactive system in accordance with some embodiments.
Figure 5:
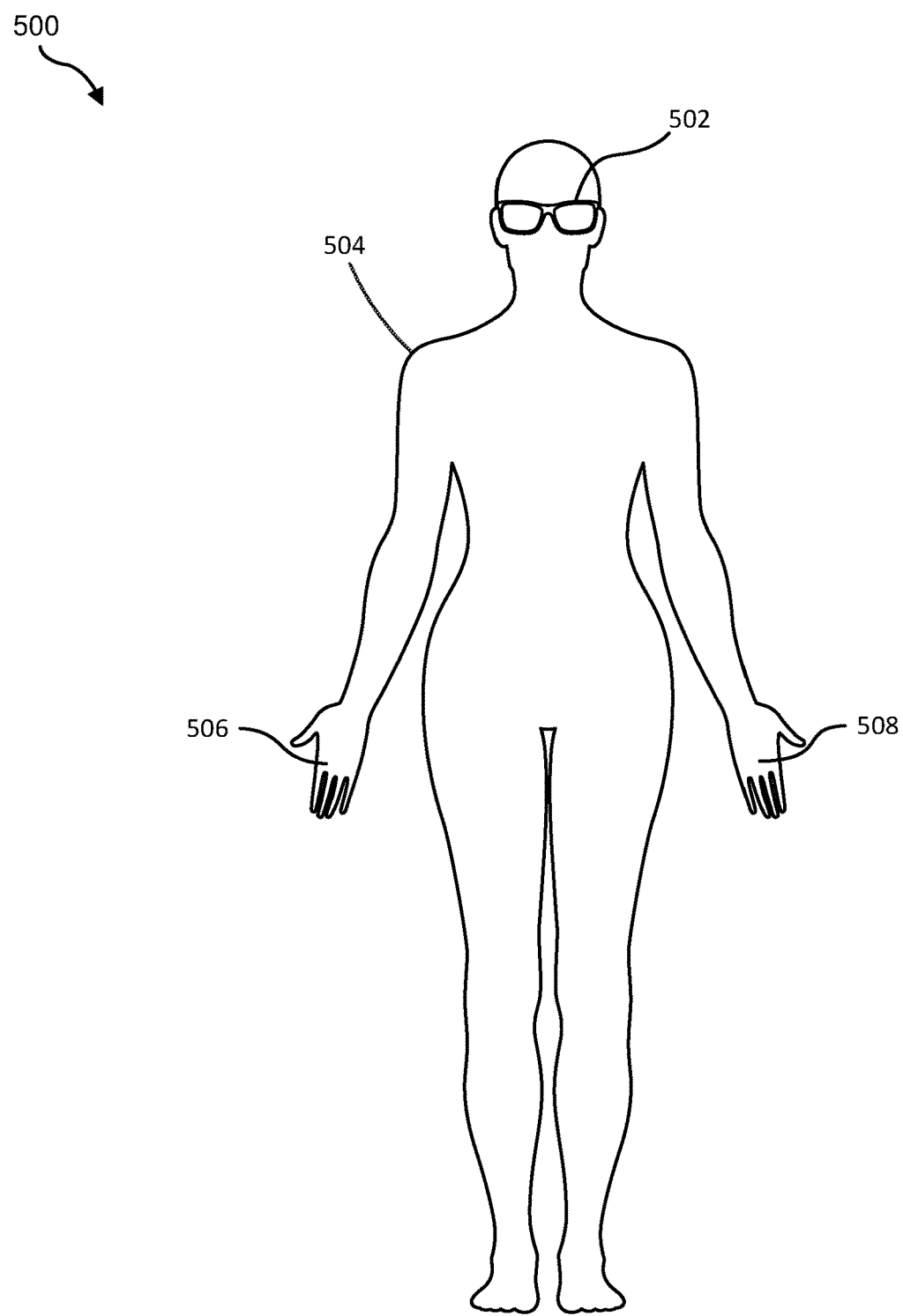
FIG. 5 is a front view of another user wearing a head-mounted-display device of another exemplary interactive system in accordance with some embodiments.
Figure 6:
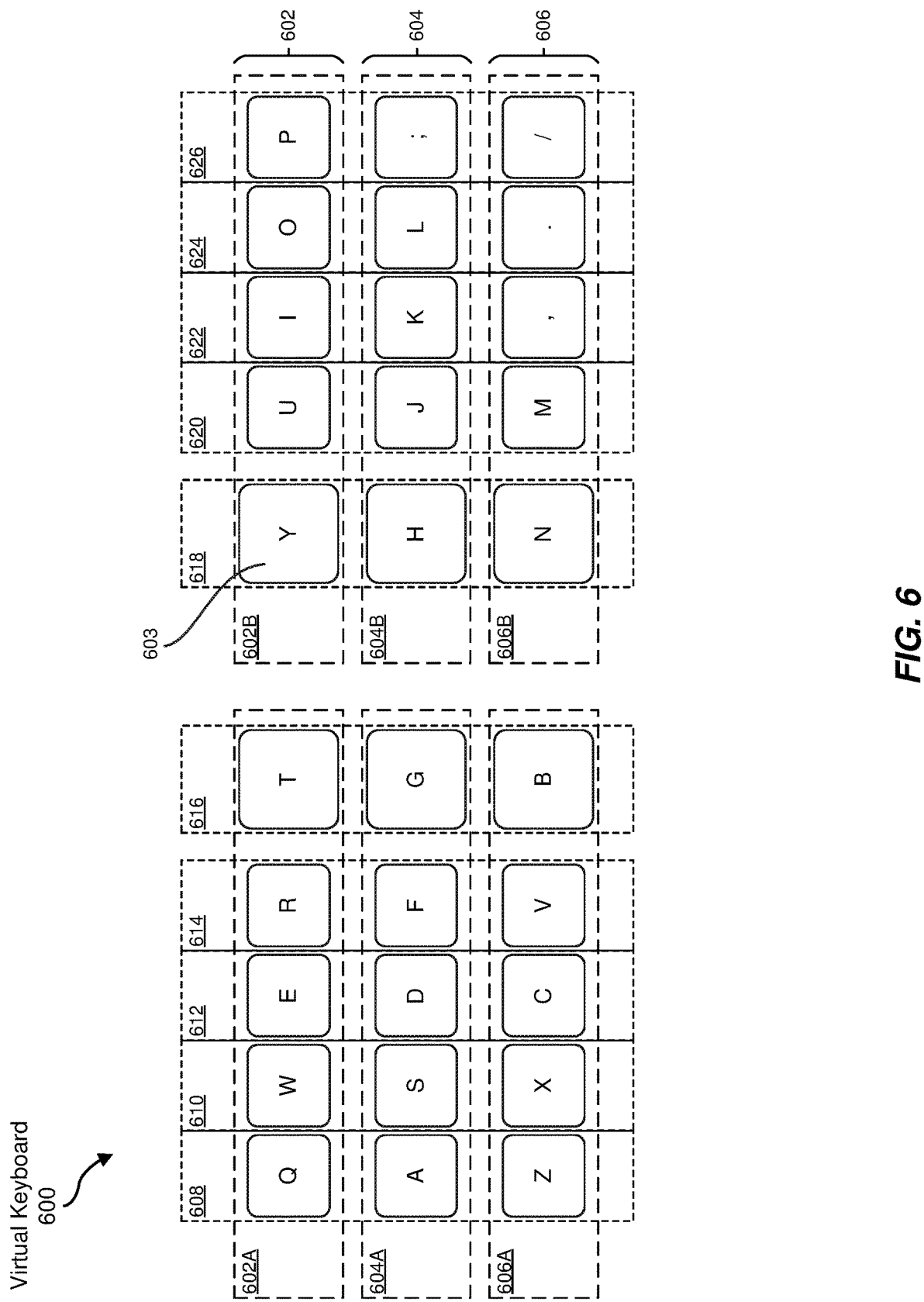
FIG. 6 is an illustration of a layout of an exemplary virtual keyboard, in accordance with some embodiments.
Figure 7:
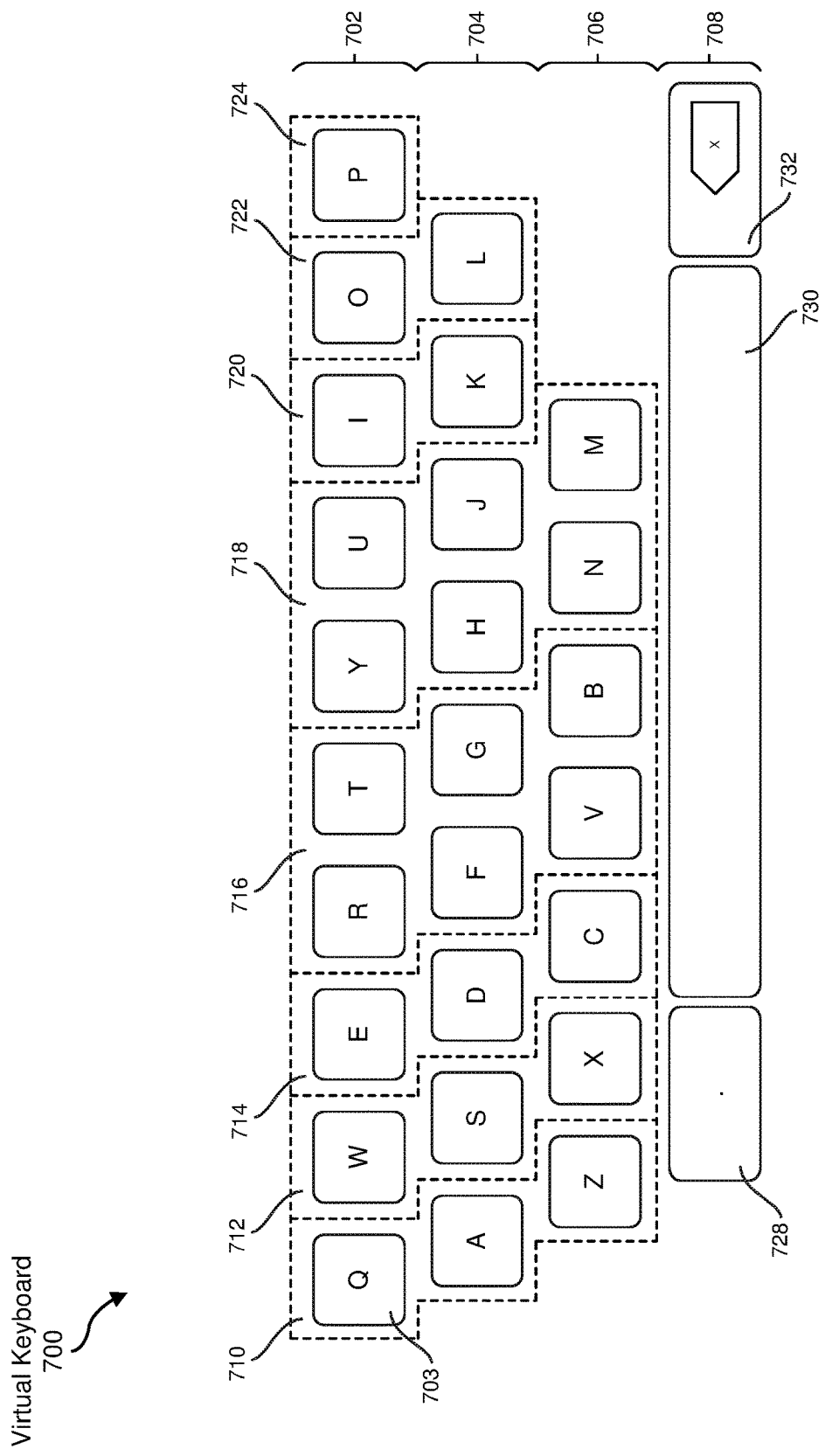
FIG. 7 is an illustration of a layout of another exemplary virtual keyboard, in accordance with some embodiments.

The following will provide, with reference to FIGS. 1-5 and 39-44, detailed descriptions of various exemplary systems configured to process pinch-based user input. FIGS. 6 and 7 provide detailed descriptions of exemplary virtual-keyboard layouts and mappings. FIGS. 8-38 provide detailed descriptions of exemplary methods for processing pinch-based user input.

FIG. 1 is a block diagram of an exemplary display system 100 that may present one or more images 106 to a user via a display 102. In some examples, display system 100 may operate in a virtual reality system environment, an augmented reality system environment, a mixed reality system environment, or some combination thereof. In some examples, some or all of display system 100 may be included in a head-mounted display device (such as those illustrated in FIGS. 2-5, 10, 39-41, 43, and 44). In other examples, display system 100 may represent any type or form of computing device that is designed to accept user input. For example, some or all of display system 100 may be included in a desktop computer, a laptop computer, a television, a mobile device (e.g., a cellular phone, a tablet computer, a gaming device, etc.), a smart device or appliance, or an interactive display.

As shown, display system 100 may include a display subsystem 104 (e.g., a display driver) that presents, via display 102, a variety of content to a user, including virtual views of an artificially rendered virtual-world environment and/or augmented views of a physical, real-world environment. In some examples, such views may contain or be augmented with computer-generated elements (e.g., two-dimensional (2D) or three-dimensional (3D) images, 2D or 3D video, sound, etc.) that convey a scene (e.g., a captured scene, an artificially-generated scene, an evolving artificial-reality environment, or a combination of the same) and/or a graphical user interface to the user.

Display system 100 may further include a hand tracking subsystem 107 and one or more sensors 108 that may be used to track or determine a user's finger and hand positions, orientations, and/or locations. In some examples, sensors 108 may include one or more cameras 110 (e.g., RGB or time-of-flight cameras) that capture measurements of a user's hands and fingers, one or more capacitance sensors 112 that measure changes to body capacitance (e.g., when a user touches one finger to another to perform a pinch gesture), one or more depth sensors 114, and/or any other suitable sensors (e.g., touch-sensing gloves, three-dimensional scanners, sonar sensors, radar sensors, etc.) for determine a user's finger and hand positions, orientations, and/or locations. In some embodiments, some or all of sensors 108 may be integrated into a single computing device to which a user wishes to input text. In other embodiments, some or all of sensors 108 may be integrated into an auxiliary device (e.g., a glove, a watch, or a wristband).

As shown in FIG. 1, display system 100 may include a user-input subsystem 120 for receiving input from a user. In some embodiments, user-input subsystem 120 may include a gesture-detecting module 122 that detects pinch gestures 123 and/or other attributes of a user's hands, an input-determining module 124 that translates pinch gestures 123 into user input 125, and an input-processing module 126 that processes user input 125. In some embodiments, user-input subsystem 120 may include a virtual keyboard 130 for displaying key-based input options to a user, user-input mappings 132 that map pinch gestures to user input (e.g., keys of virtual keyboard 130), and a language model 134 for predicting or disambiguating user input based on contextual and other information. As will be explained in greater detail below, user-input mappings 132 may contain one-to-one mappings (e.g., each pinch gesture represented in user-input mappings 132 may be mapped to a single character) or one-to-many mappings (e.g., each pinch gesture represented in user-input mappings 132 may be mapped to multiple characters). In some embodiments, language model 134 may be optimized for conversational user-input predictions.

Figure 2:
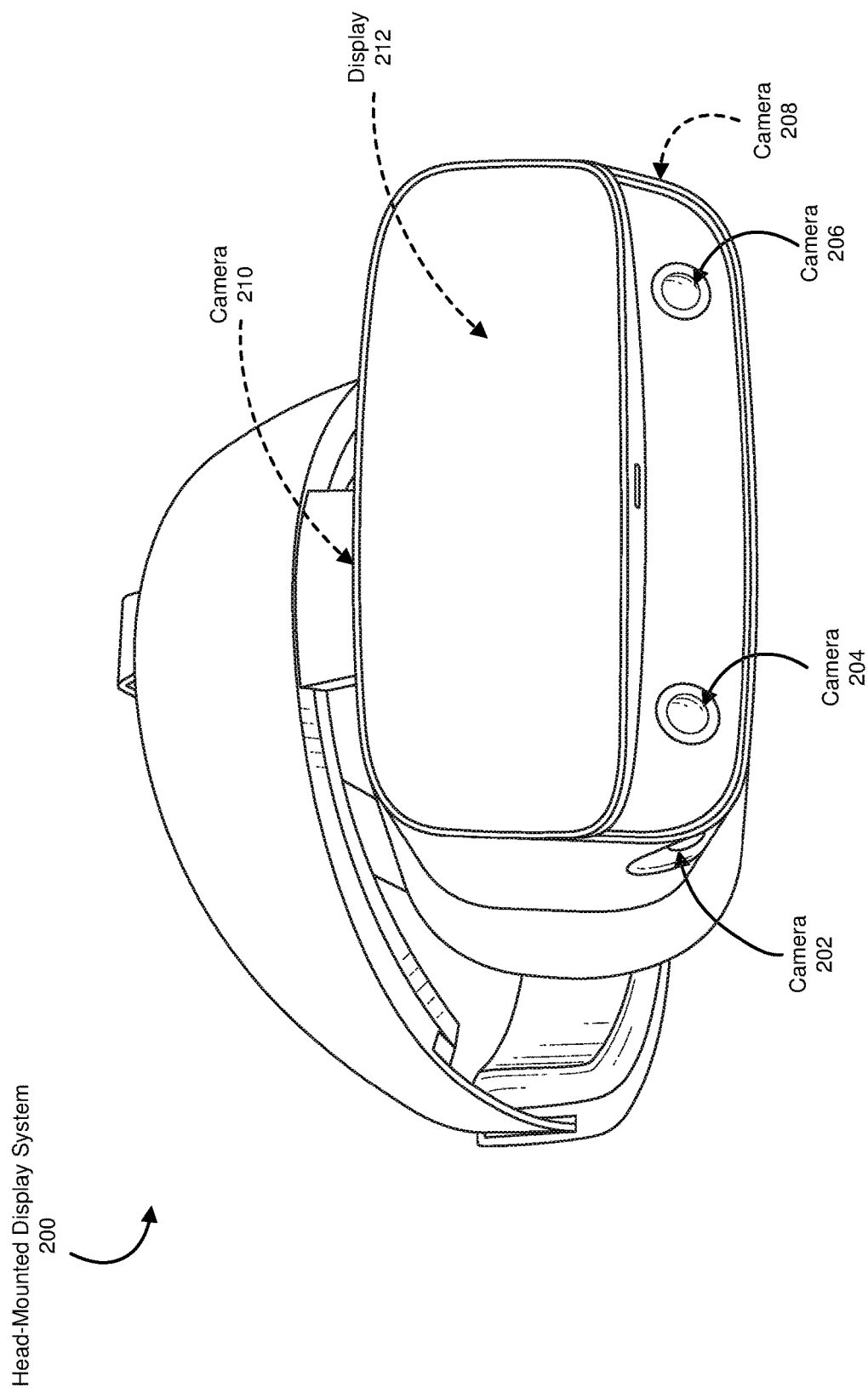
FIG. 2 is an illustration of an exemplary head-mounted display system that may be used in connection with embodiments of this disclosure.

FIG. 2 is an illustration of an example display system, in this example an exemplary head-mounted display system 200 that includes multiple cameras for tracking the positions, orientations, and/or physical locations of a user's hands and fingers. In some embodiments, head-mounted display system 200 may include cameras 202, 204, 206, 208, and/or 210, and/or a display 212. In some embodiments, cameras 202, 204, 206, 208, and/or 210 may be oriented within head-mounted display system 200 such that one or more of cameras 202, 204, 206, 208, and/or 210 will, under typical use, capture a digital view of a user's hands. In some examples, cameras 202, 204, 206, 208, and/or 210 may may be used to capture or construct a digital view or representation (e.g., a 2D or 3D model) of a user's hands and/or fingers.

Figure 3:
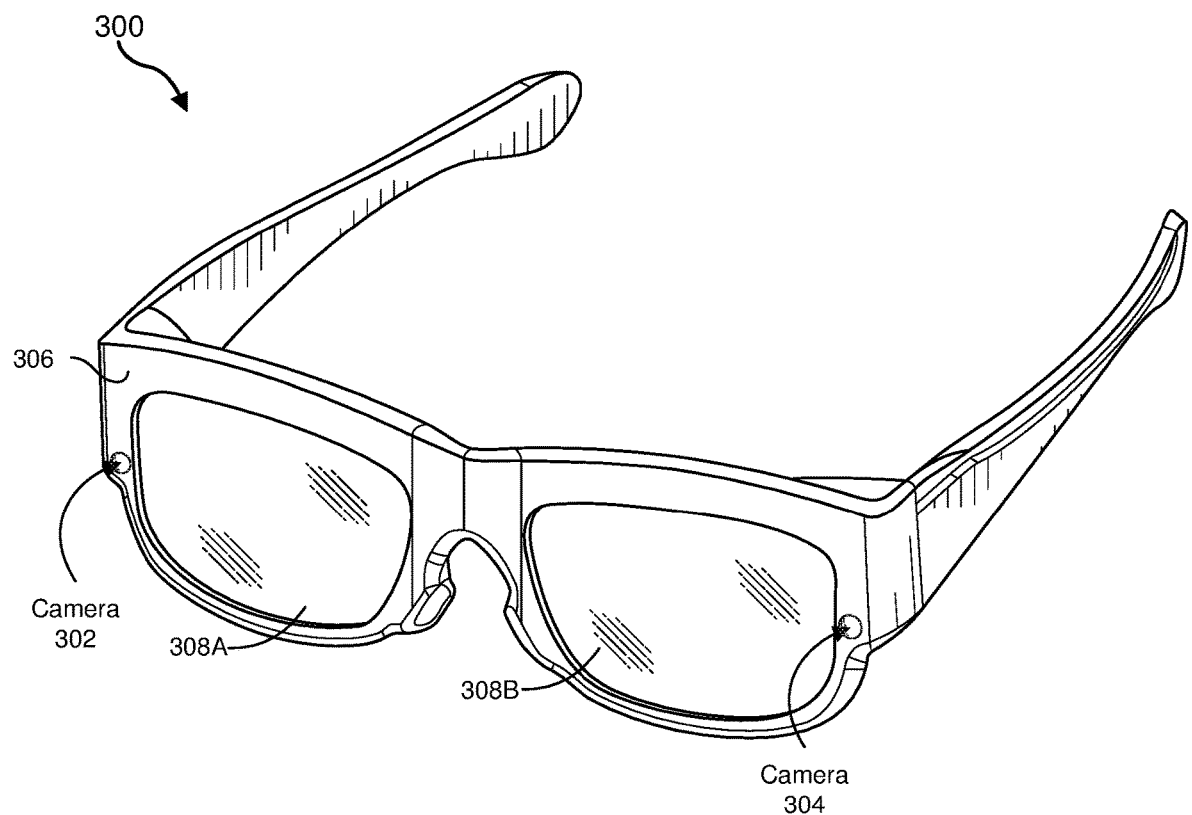
FIG. 3 is an illustration of another exemplary head-mounted display system that may be used in connection with embodiments of this disclosure.

FIG. 3 shows another example display system, in this example augmented reality glasses 300 that includes multiple cameras for tracking the positions, orientations, and/or physical locations of a user's hands and fingers. In some embodiments, augmented reality glasses 300 may include cameras 302 and 304. In some embodiments, cameras 302 and 304 may be oriented within head-mounted display system 300 such that one or more of cameras 302 and 304 will, under typical use, capture a digital view of a user's hands. In some examples, cameras 302 and/or 304 may be used to capture or construct a digital view or representation of a user's hands and/or fingers. The depicted embodiment includes a right near-eye display 308A and a left near-eye display 308B, which are collectively referred to as near-eye displays 308. Near-eye displays 308 may be transparent or semi-transparent lenses that include or utilize a display system (e.g., a projection display system) to present media to a user. Examples of media presented by near-eye displays 308 include one or more images, a series of images (e.g., a video), audio, or some combination thereof. Near-eye displays 308 may be configured to operate as an augmented-reality near-eye display, such that a user can see media projected by near-eye displays 308 and see the real-world environment through near-eye displays 308. However, in some embodiments, near-eye displays 308 may be modified to also operate as virtual-reality near-eye displays, mixed-reality near-eye displays, or some combination thereof. Accordingly, in some embodiments, near-eye displays 308 may augment views of a physical, real-world environment with computer-generated elements (e.g., images, video, sound, etc.). As shown in FIG. 3, head-mounted-display device 300 may include a support or frame 306 that secures near-eye displays 308 in place on the head of a user, in embodiments in which near-eye displays 308 includes separate left and right displays. In some embodiments, frame 304 may be a frame of eye-wear glasses.

Example display systems 100 may be implemented in a variety of ways. For example, all or a portion of example display system 100 may represent portions of example systems 400 and 500 shown in FIGS. 4 and 5. As shown in FIG. 4, system 400 may include a head-mounted-display device 402 worn by a user 404. In one embodiment, head-mounted-display device 402 may include all of the sensors necessary for tracking the positions, orientations, and/or physical locations of hands 410 and 412. In some embodiments, system 400 may also include a watch 406 and a wristband 408 for tracking the positions, orientations, and/or physical locations of hands 410 and 412 of user 404 and/or the positions, orientations, and/or physical locations of the fingers and thumbs of hands 410 and 412. As shown in FIG. 5, system 500 may include a head-mounted-display device 502, such as a pair of augmented reality glasses, worn on the head of user 504. In this example, head-mounted-display device 502 may include all of the sensors necessary for tracking the positions, orientations, and/or physical locations of hands 506 and 508.

FIG. 6 is an illustration of an exemplary layout of a virtual keyboard 600 that may be displayed to a user and/or whose keys may be mapped to various pinch gestures. As shown, virtual keyboard 600 includes a top row 602 of virtual keys (e.g., virtual key 603), a middle row 604 of virtual keys, and a bottom row 606 of virtual keys. In some embodiments, virtual keys 602A, 604A, and 606A may be mapped to pinch gestures involving fingers of a user's left hand, and virtual keys 602B, 604B, and 606B may be mapped to pinch gestures involving fingers of a user's left hand. In some embodiments, virtual keys 608 may be mapped to pinch gestures involving a user's left little finger, virtual keys 610 may be mapped to pinch gestures involving a user's left ring finger, virtual keys 612 may be mapped to pinch gestures involving a user's left middle finger, virtual keys 614 may be mapped to pinch gestures involving a user's left index finger, and virtual keys 616 may be mapped to pinch gestures involving a combination of a user's left index finger and the user's left middle finger. Similarly, virtual keys 618 may be mapped to pinch gestures involving a combination of a user's right index finger and the user's right middle finger, virtual keys 620 may be mapped to pinch gestures involving a user's right index finger, virtual keys 622 may be mapped to pinch gestures involving a user's right middle finger, virtual keys 624 may be mapped to pinch gestures involving a user's right ring finger, and virtual keys 626 may be mapped to pinch gestures involving a user's right little finger.

Figure 12:
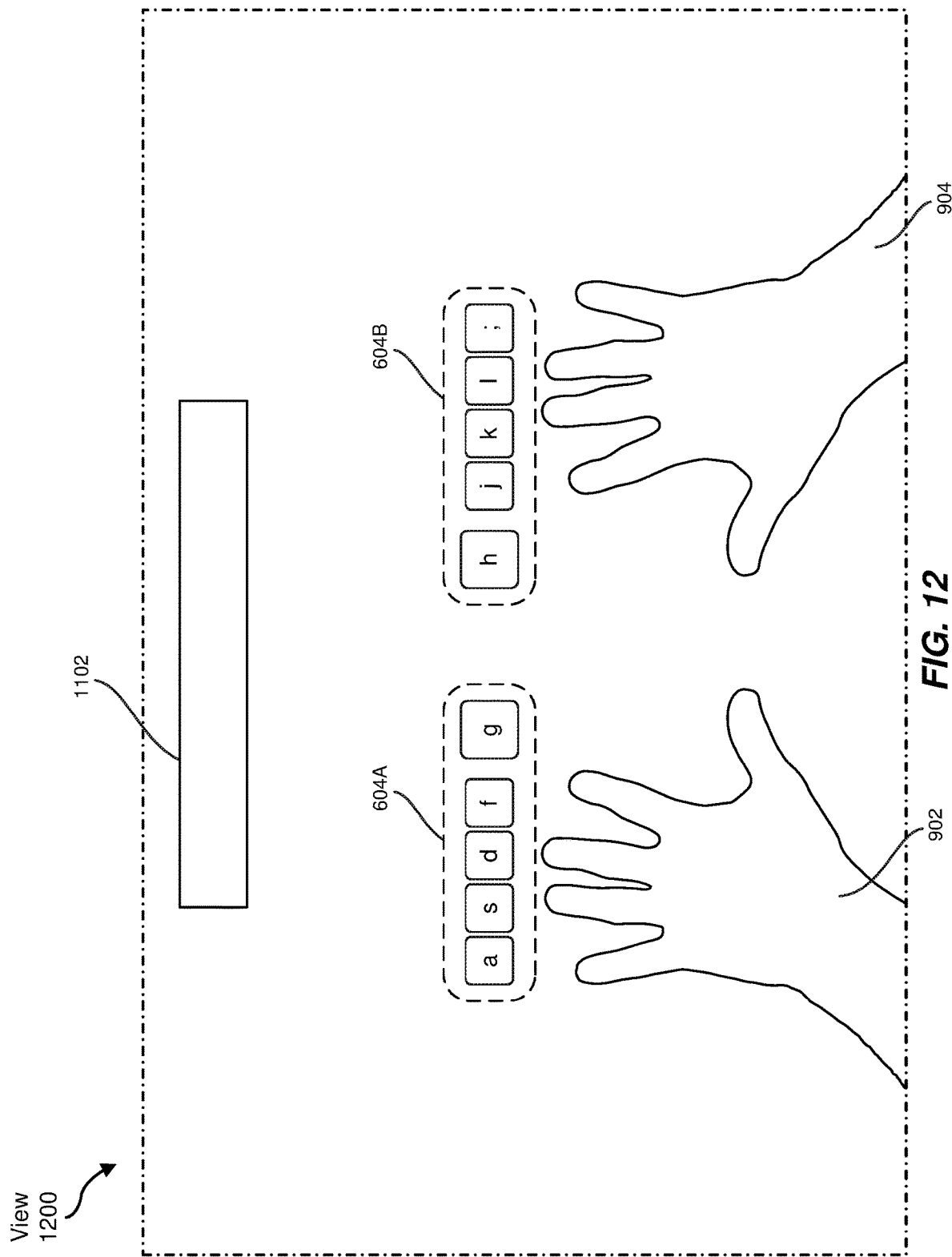
FIG. 12 is an illustration of a user's initial view of an exemplary virtual keyboard, in accordance with some embodiments.
Figure 15:
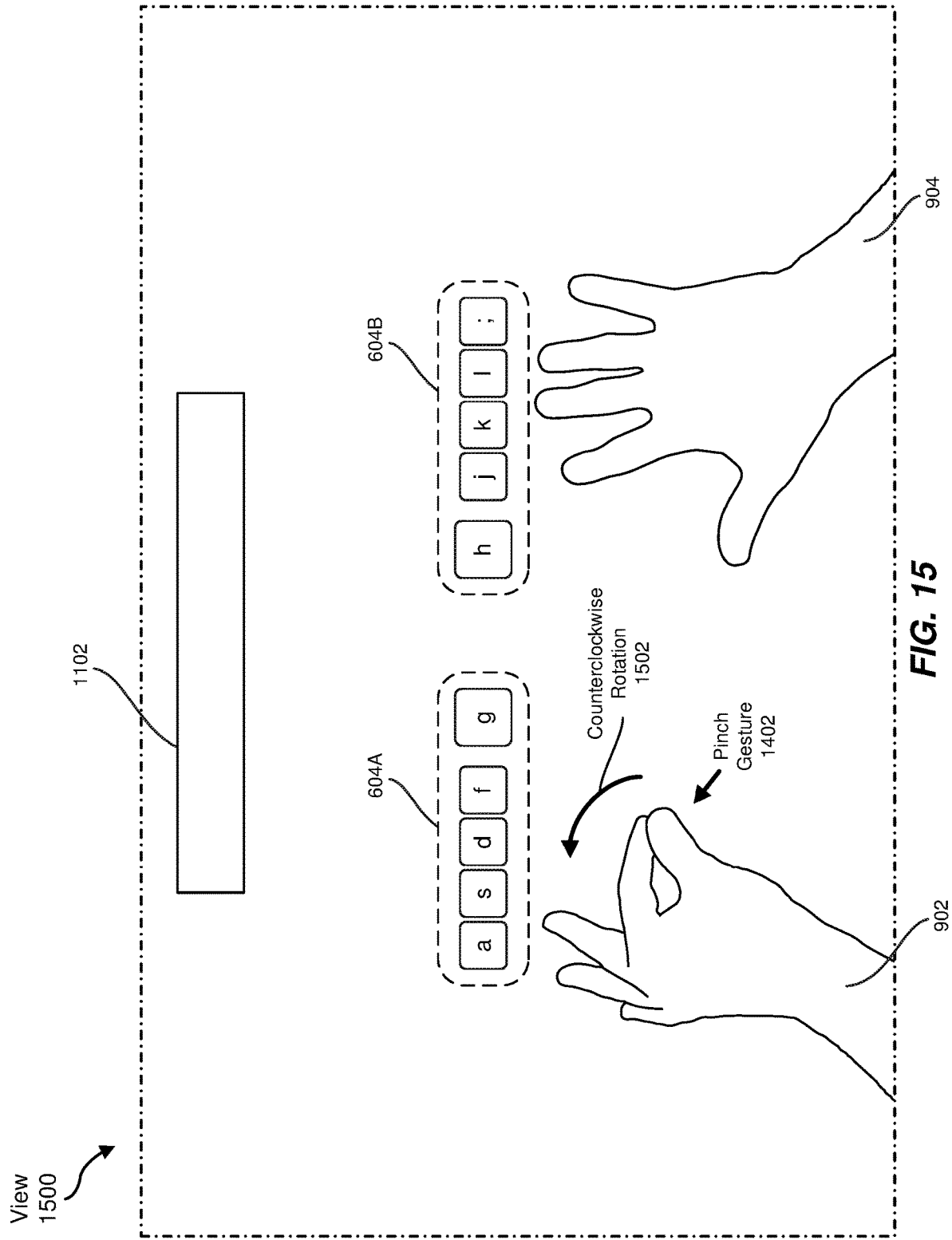
Figure 16:
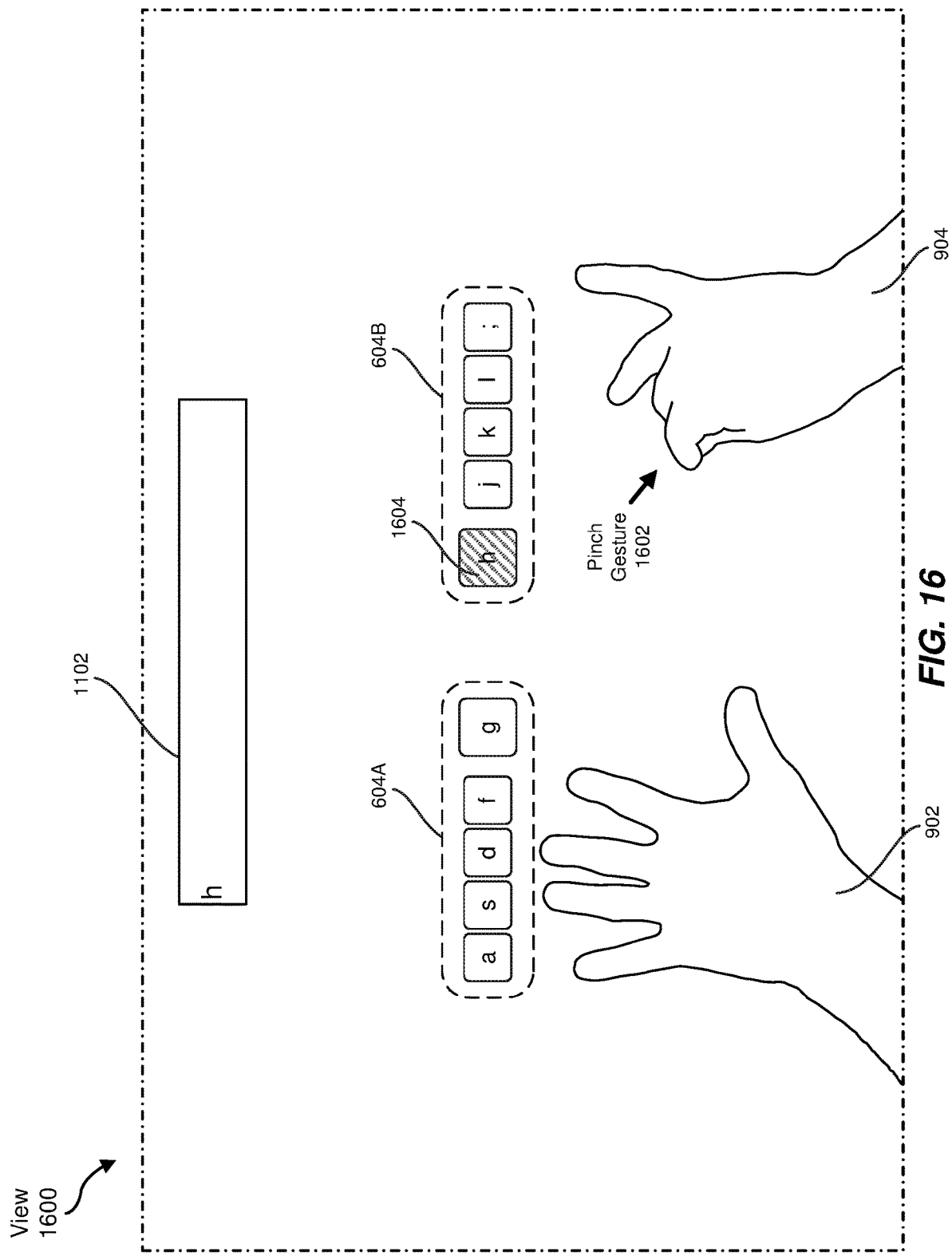
FIG. 16 is an illustration of a user's view of an exemplary virtual keyboard as the user performs an exemplary pinch gesture, in accordance with some embodiments.
Figure 17:
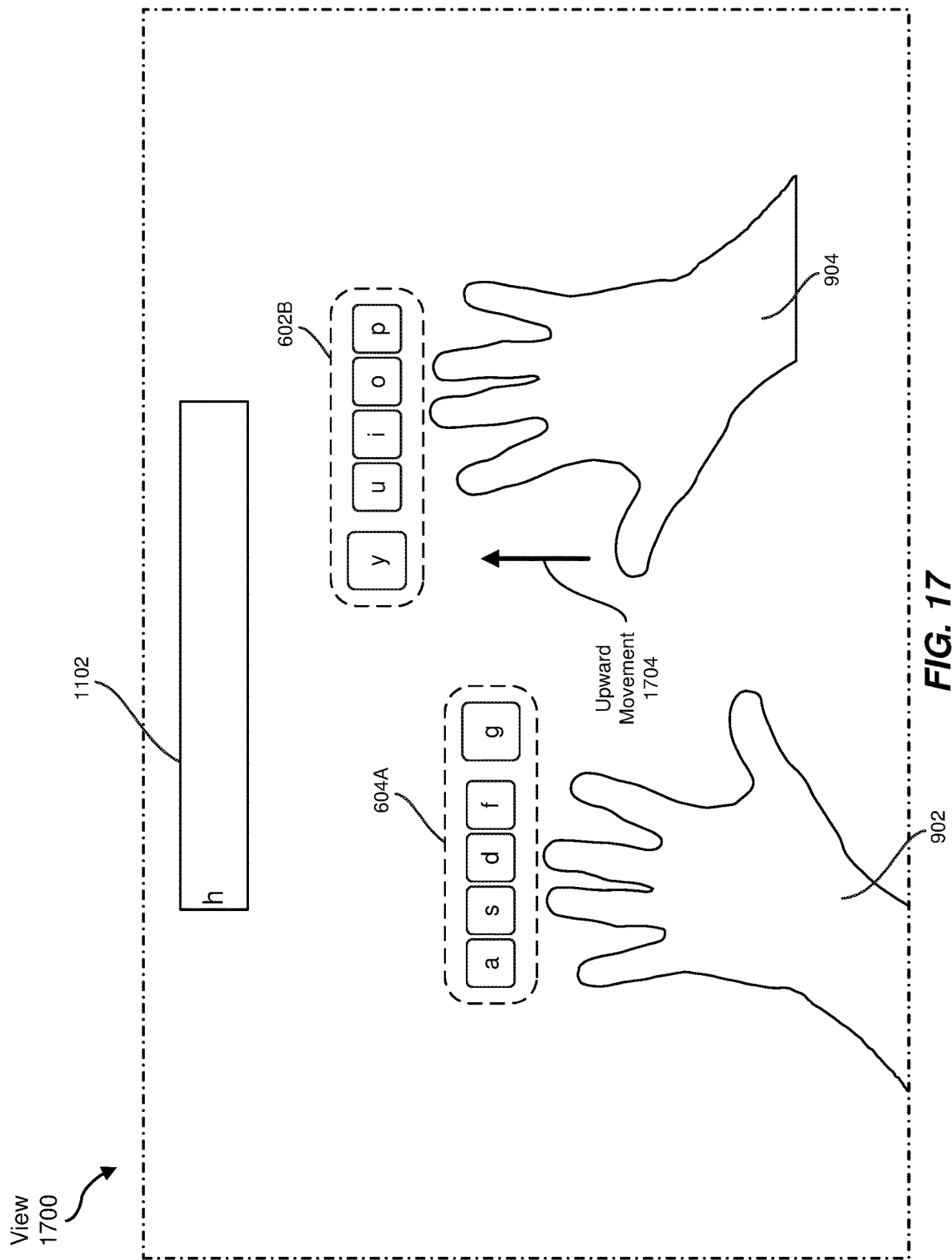
FIG. 17 is an illustration of a user's view of an exemplary virtual keyboard as the user performs an exemplary hand movement, in accordance with some embodiments.
Figure 19:
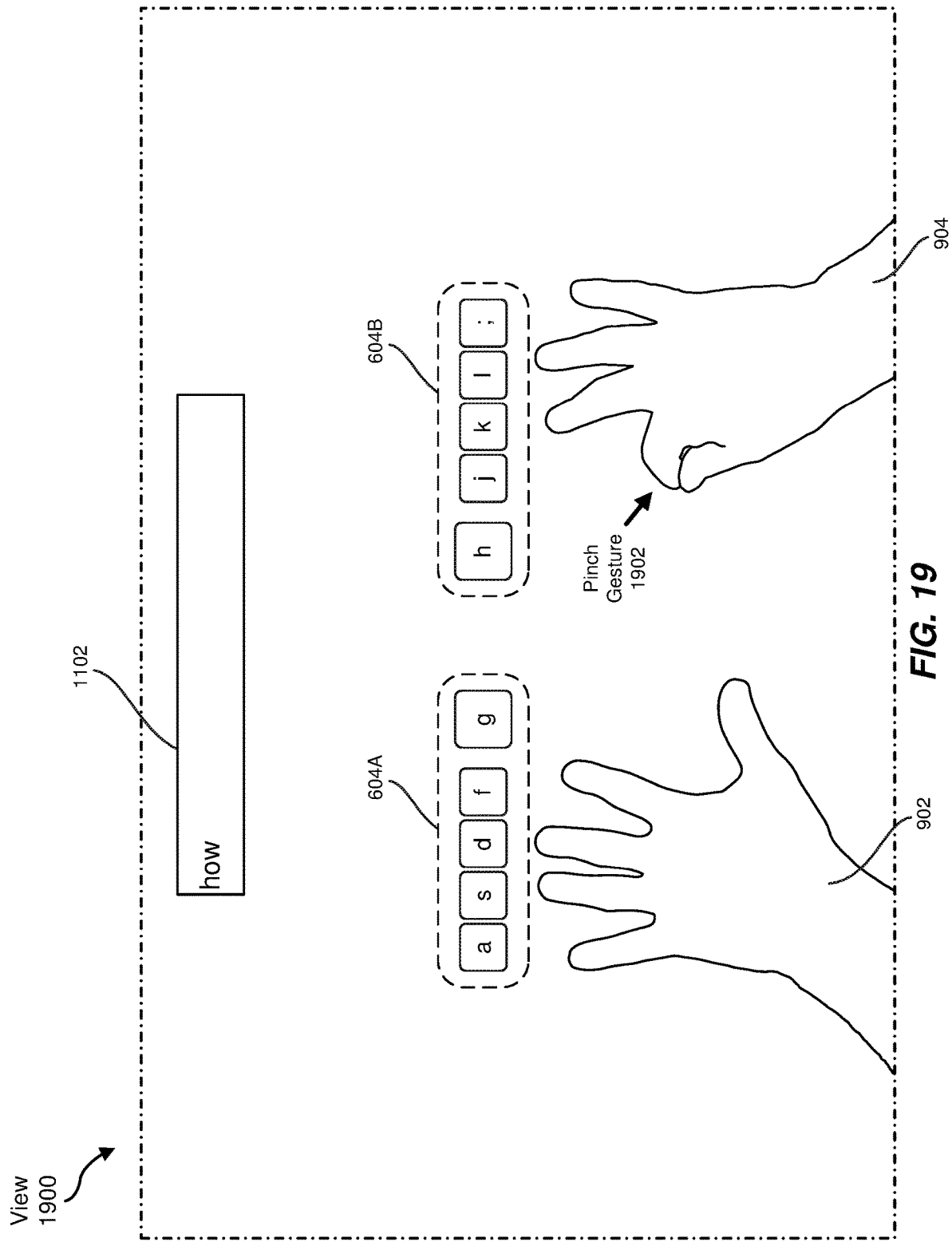
FIGS. 19 and 20 are illustrations of a user's view of an exemplary virtual keyboard as the user performs an exemplary pinch gesture, in accordance with some embodiments.
Figure 20:
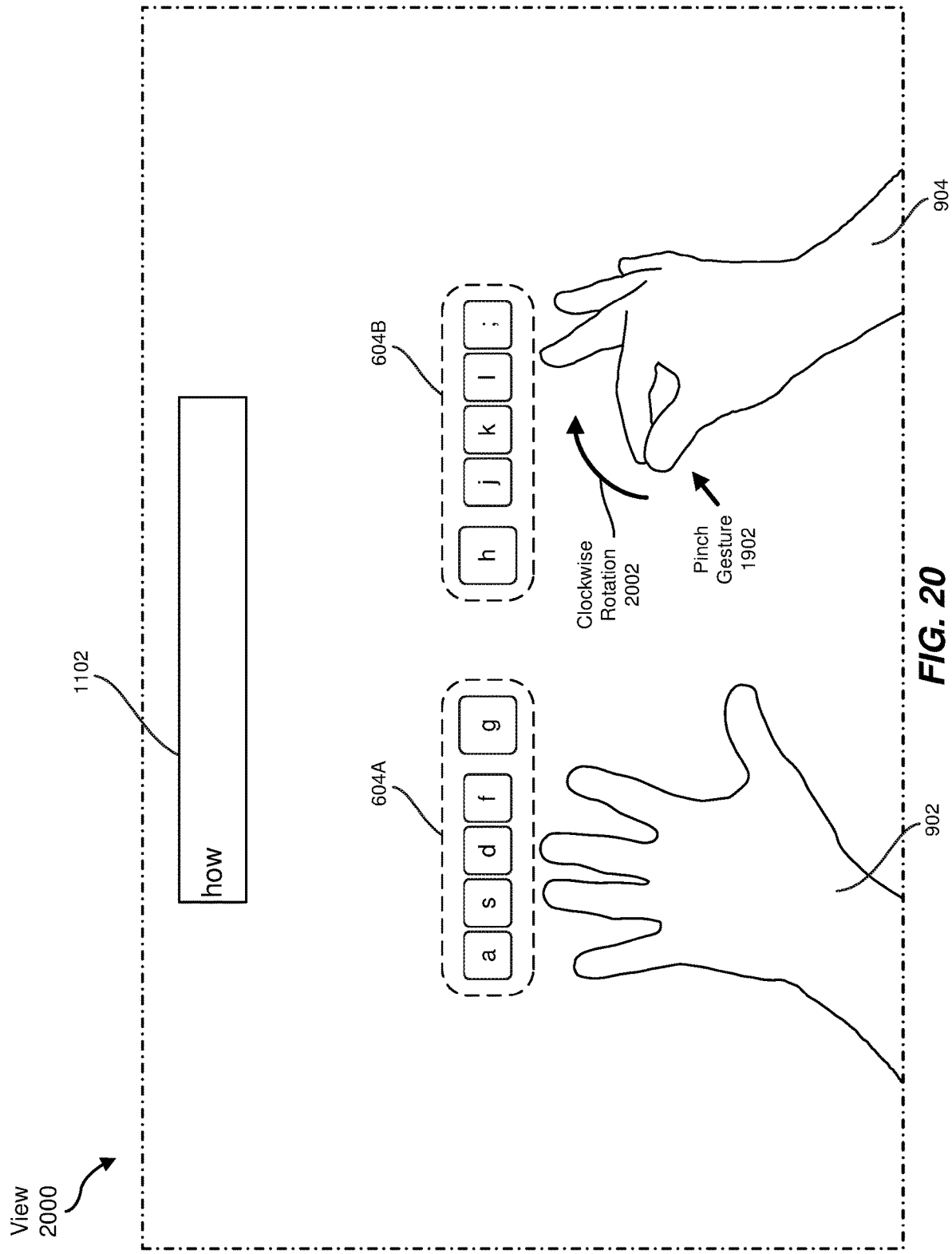
Figure 21:
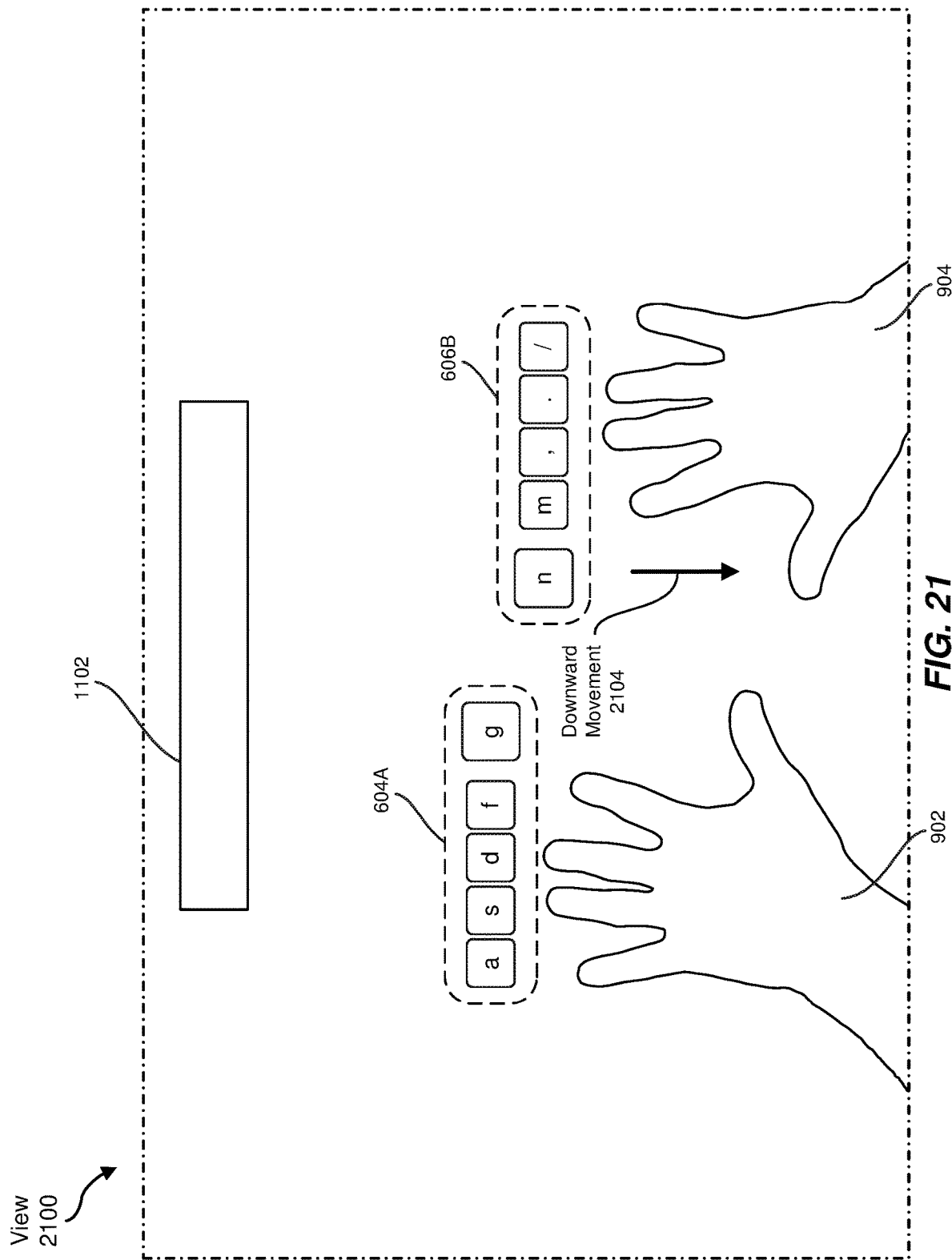
FIG. 21 is an illustration of a user's view of an exemplary virtual keyboard as the user performs an exemplary hand movement, in accordance with some embodiments.
Figure 22:
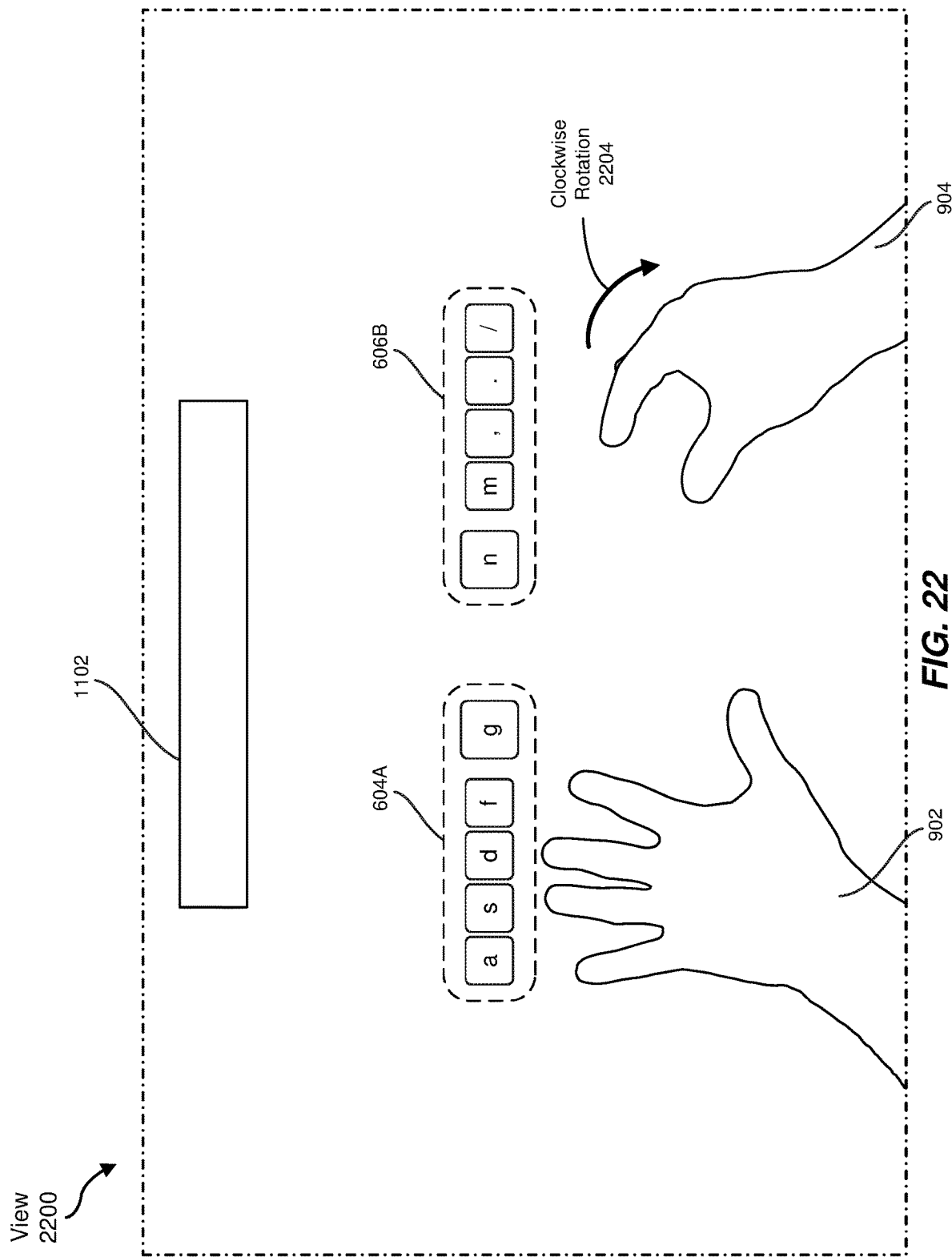
FIG. 22 is an illustration of a user's view of an exemplary virtual keyboard as the user performs an exemplary hand movement, in accordance with some embodiments.

In some embodiments, the systems described herein may display only one of virtual keys 602A, 604A, and 606A at a time to a user and/or only one of virtual keys 602B, 604B, and 606B at a time to a user (e.g., as shown in FIGS. 12-23). In some embodiments, the systems described herein may display one of virtual keys 602A, 604A, or 606A when the user's left hand is in a particular corresponding position or orientation and/or may display one of virtual keys 602B, 604B, or 606B when the user's right hand is in a particular corresponding position or orientation. For example, the systems described herein may display virtual keys 604A when the user's left hand is placed in an initial or neutral orientation or position (e.g., as shown in FIG. 12) and may display one of virtual keys 602A or 606A when the user's left hand moves away from the initial or neutral orientation or position (e.g., as shown in FIGS. 17, 21, and 22). In one embodiment, the systems described herein may display virtual keys 602A when the user's left hand moves higher than the initial or neutral orientation or position (e.g., as shown in FIG. 17) and may display virtual keys 606A when the user's left hand moves lower than the initial or neutral orientation or position (e.g., as shown in FIG. 21). In another embodiment, the systems described herein may display virtual keys 602A when the user's left hand rotates counterclockwise from an initial or neutral orientation or position and may display virtual keys 606A when the user's left hand rotates clockwise from the initial or neutral orientation or position (e.g., as shown in FIG. 22).

Figure 29:
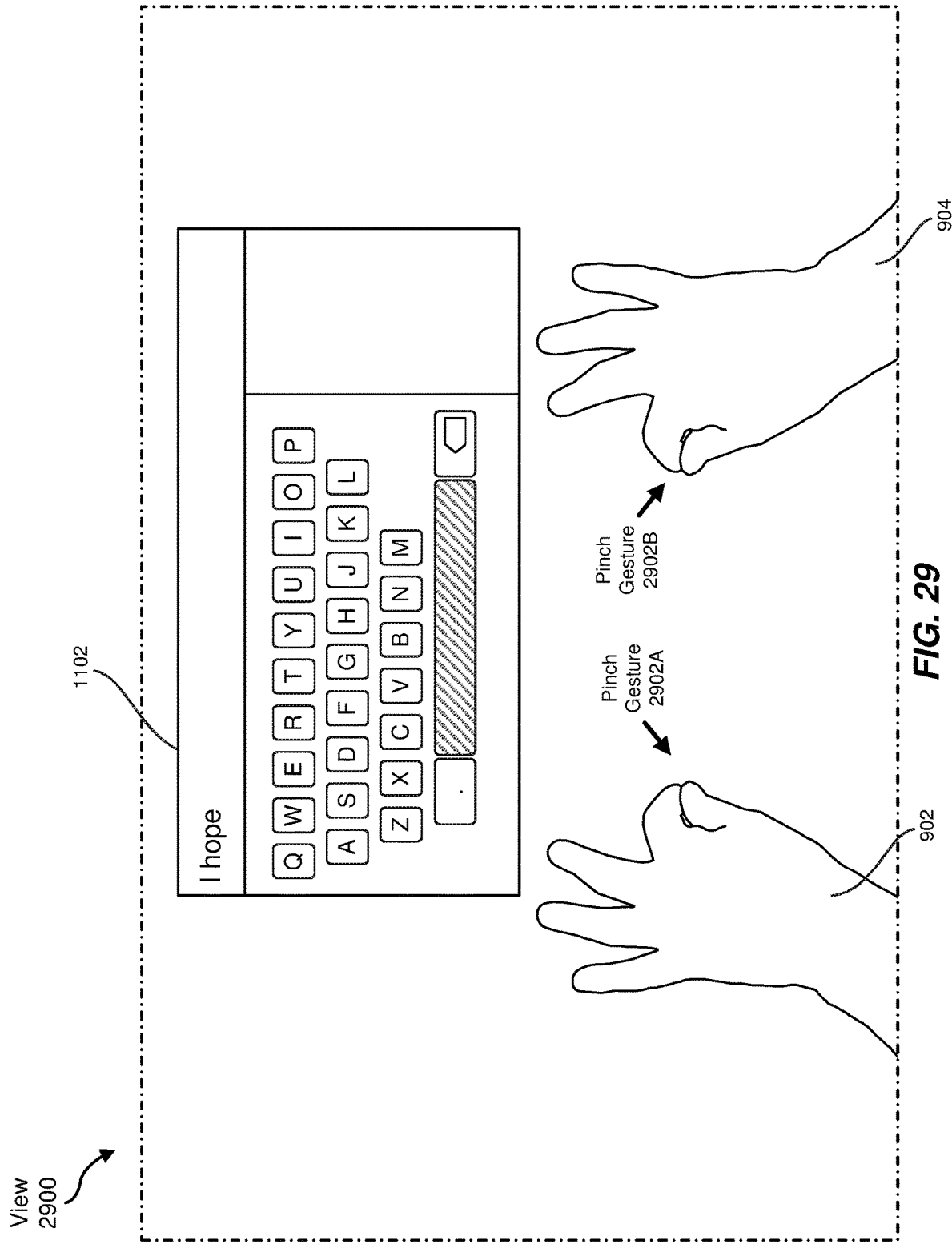
FIG. 29 is an illustration of a user's view of an exemplary virtual keyboard as the user performs an exemplary pinch gesture, in accordance with some embodiments.
Figure 30:
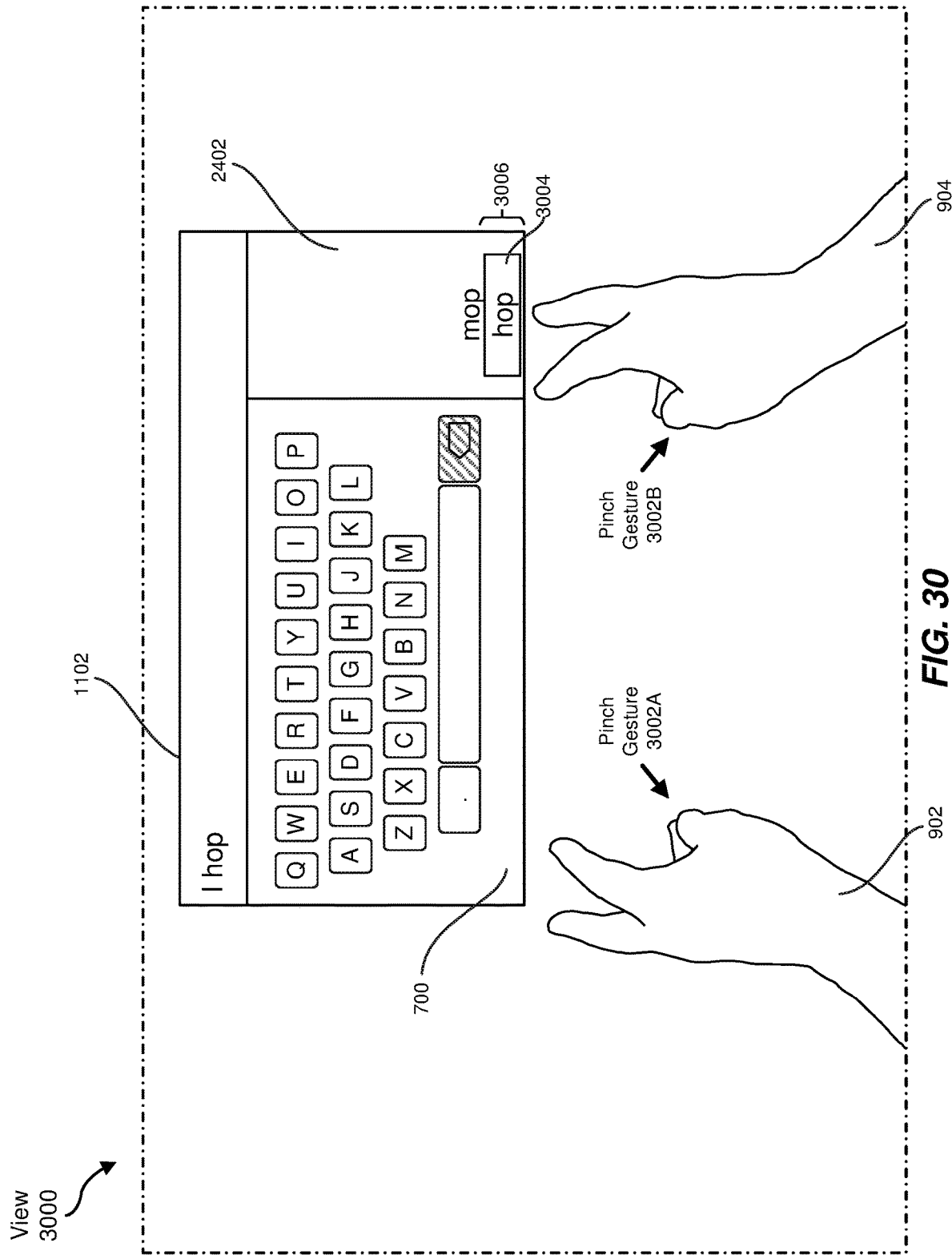
FIG. 30 is an illustration of a user's view of an exemplary virtual keyboard as the user performs an exemplary pinch gesture, in accordance with some embodiments.

FIG. 7 is an illustration of an exemplary layout of a virtual keyboard 700. As shown, virtual keyboard 700 includes a first row 702 of virtual keys (e.g., virtual key 703), a second row 704 of virtual keys, a third row 706 of virtual keys, and a fourth row 708 of virtual keys. In this example, virtual keys 710, 712, 714, and 716 may be mapped to pinch gestures involving fingers of a user's left hand, and virtual keys 718, 720, 722, and 724 may be mapped to pinch gestures involving fingers of a user's right hand. In some embodiments, virtual keys 710 may be mapped to pinch gestures involving a user's left little finger, virtual keys 712 may be mapped to pinch gestures involving a user's left ring finger, virtual keys 714 may be mapped to pinch gestures involving a user's left middle finger, and virtual keys 716 may be mapped to pinch gestures involving a user's left index finger. Similarly, virtual keys 718 may be mapped to pinch gestures involving a user's right index finger, virtual keys 720 may be mapped to pinch gestures involving a user's right middle finger, virtual keys 722 may be mapped to pinch gestures involving a user's right ring finger, and virtual keys 724 may be mapped to pinch gestures involving a user's right little finger. As shown in FIG. 7, fourth row 708 of virtual keyboard 700 may include a virtual key 728 for inputting a period character, a virtual key 730 for inputting a space character, and a virtual key 732 for inputting a backspace or delete command. In at least one embodiment, virtual key 728 may be mapped to a combination of pinch gestures involving both of a user's index fingers, virtual key 730 may be mapped to a combination of pinch gestures involving both of a user's index fingers (e.g., as illustrated in FIG. 29), and virtual key 732 may be mapped to a combination of pinch gestures involving both of a user's little fingers (e.g., as illustrated in FIG. 30).

While the keyboard layouts illustrated in FIGS. 6 and 7 are based on common QWERTY-based Latin-script keyboard layouts, the systems described herein may utilize any other suitable keyboard layout (e.g., a common non-QWERTY-based Latin-script keyboard layout, a common keyboard layout for non-Latin alphabetic scripts, or a numeric keypad). Additionally or alternatively, the systems described herein may utilize a user or application customized keyboard layout.

Figure 8:
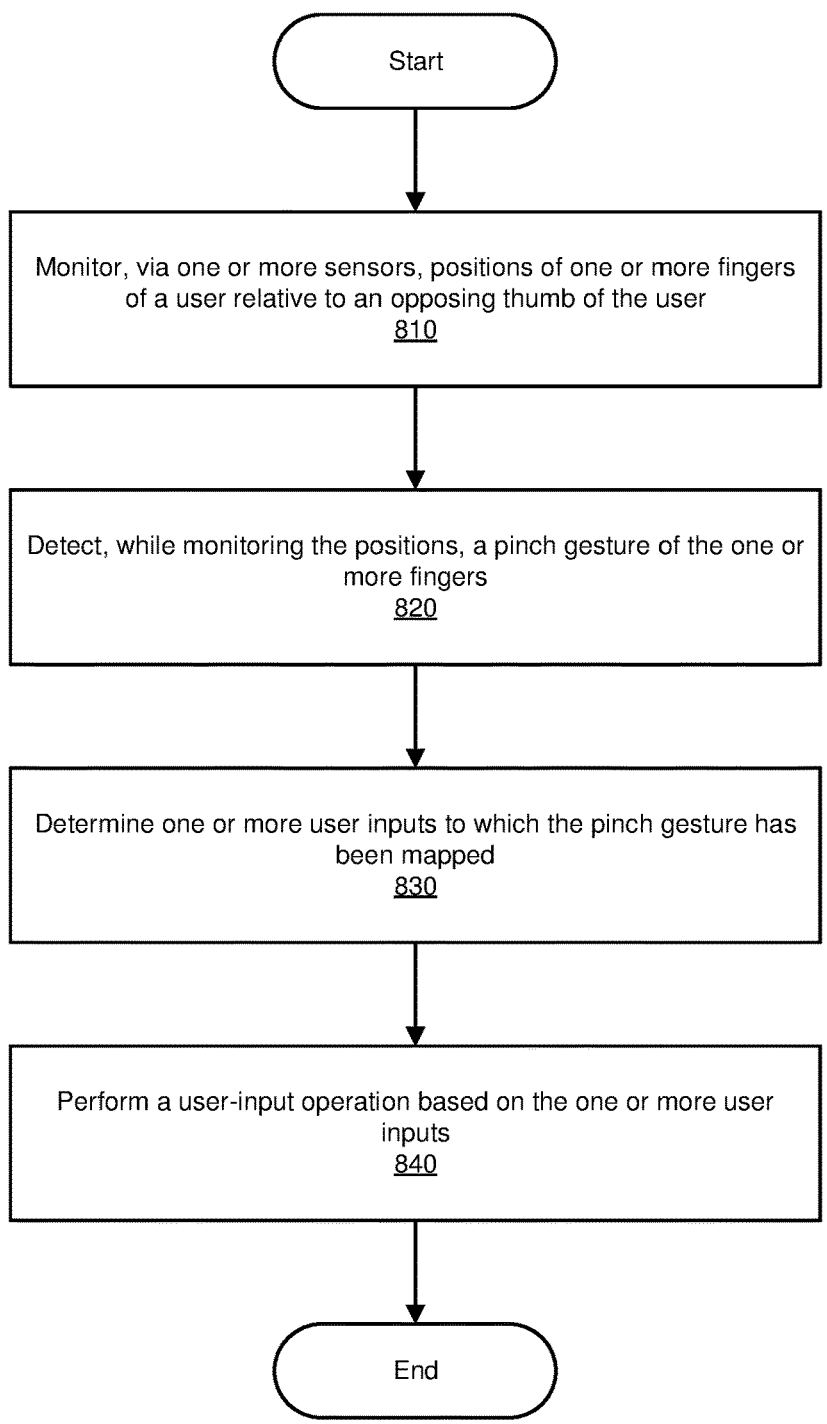
FIG. 8 is a flow diagram of an exemplary method for processing pinch-based user input, in accordance with some embodiments.

FIG. 8 is a flow diagram of an exemplary computer-implemented method 800 for processing one or more pinch gestures as user input. The steps shown in FIG. 8 may be performed by any suitable computer-executable code and/or computing system, including the system(s) illustrated in FIGS. 1-5, 10, and 39-44. In one example, each of the steps shown in FIG. 8 may represent an algorithm whose structure includes and/or is represented by multiple sub-steps, examples of which will be provided in greater detail below. In some examples, all or a portion of computer-implemented method 800 may be performed by an operating system, an application programing interface, or an artificial-reality framework of a head-mounted display system. In other examples, all or a portion of computer-implemented method 800 may be performed by a third-party application executing on a head-mounted display system.

As illustrated in FIG. 8, at step 810 one or more of the systems described herein may monitor, at a computing device via one or more sensors, positions of one or more fingers of a user relative to an opposing thumb of the user. For example, gesture-detecting module 122 may monitor, via one or more of sensors 108, the positions of one or more fingers of a user relative to an opposing thumb of the user.

Figure 9:
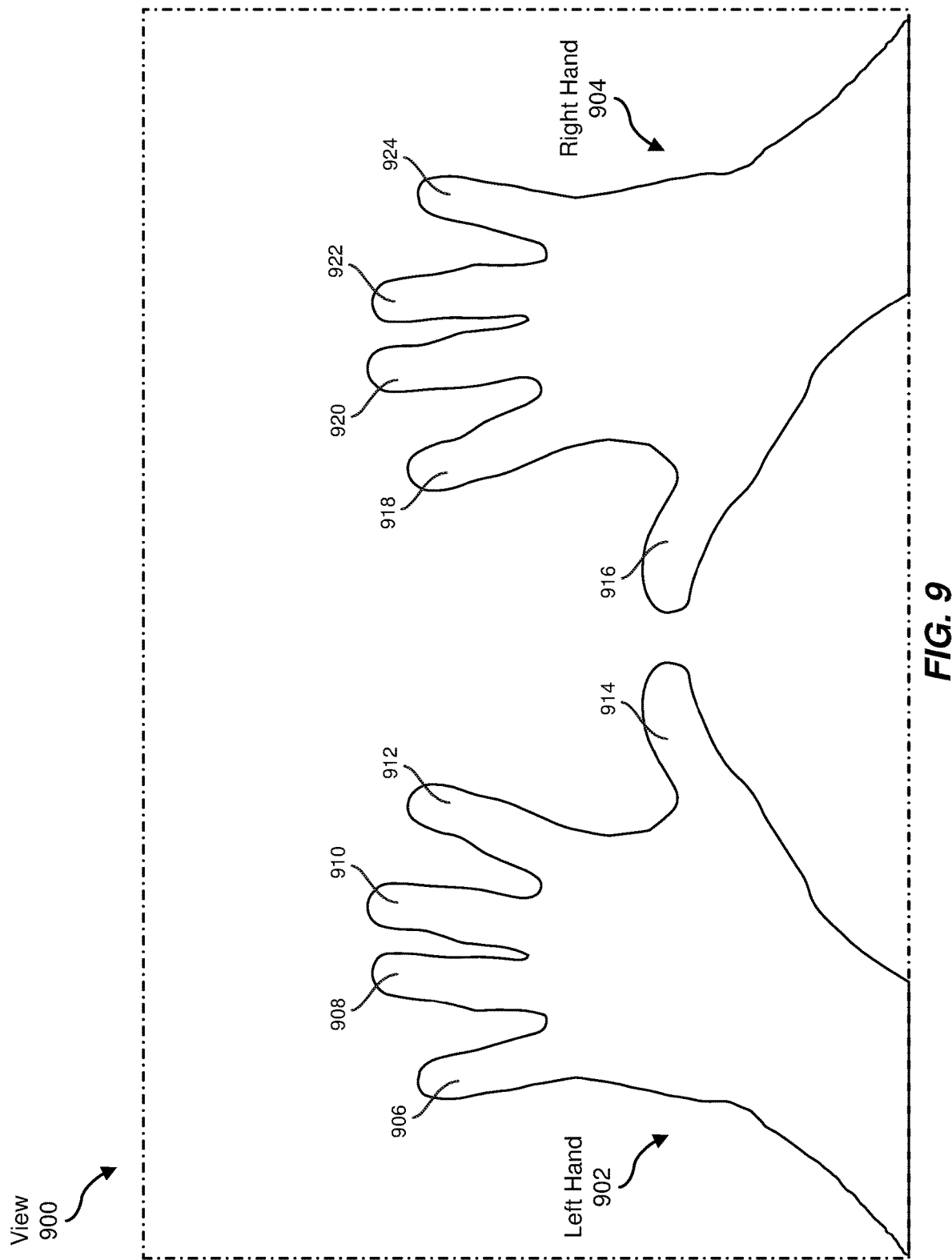
FIG. 9 is an illustration of an exemplary view of a user's hands, in accordance with some embodiments.
Figure 10:
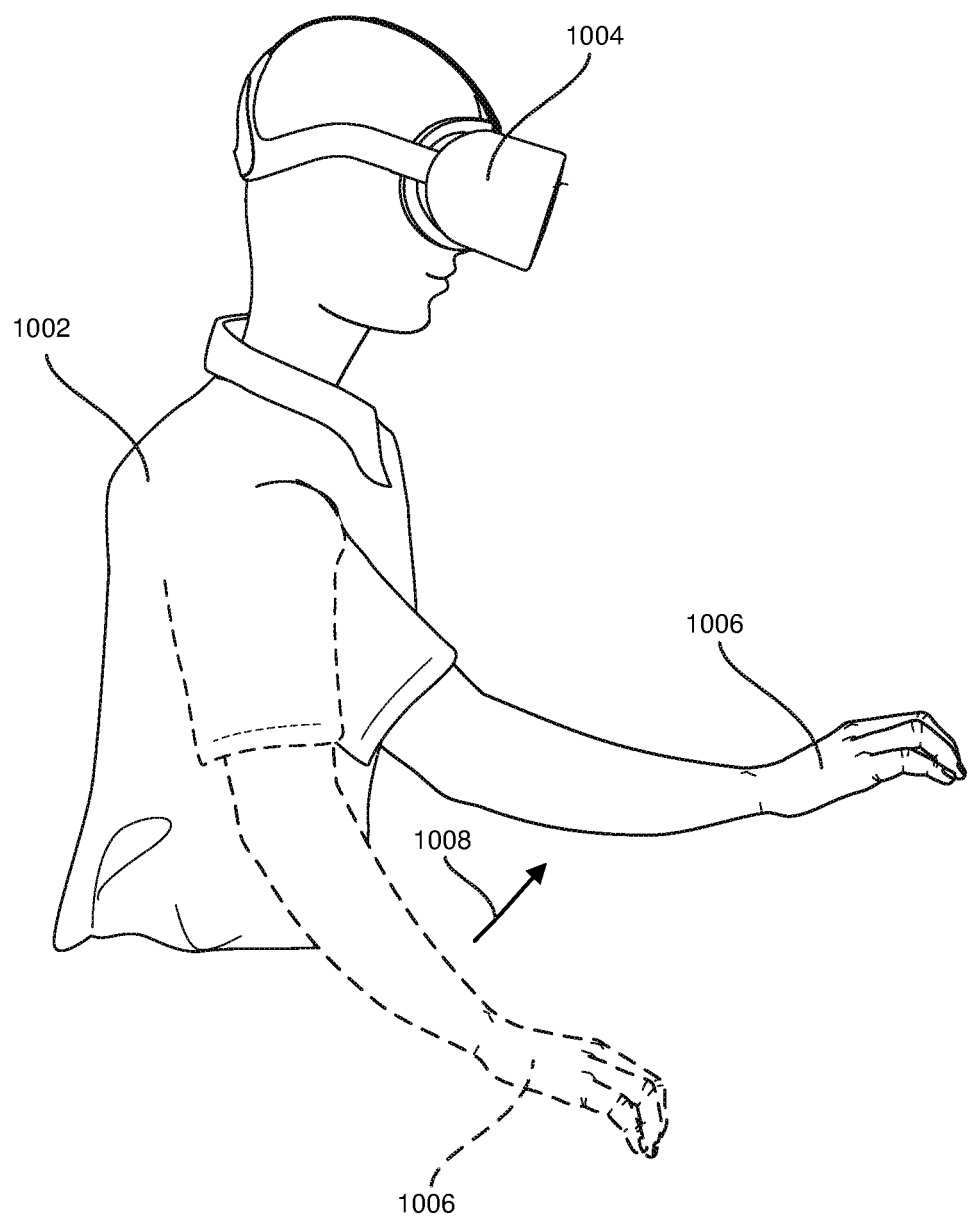
FIG. 10 is an illustration of an exemplary user gesture.

FIG. 9 provides an exemplary view 900 of a left hand 902 and a right hand 904 of a user. In some examples, exemplary view 900 may represent a user's field of view when wearing a head-mounted display system and/or the head-mounted display system's view or digital representation of the user's left and right hands. In some embodiments, left hand 902 and right hand 904 may represent real views of the user's left and right hands. Alternatively, in other embodiments, left hand 902 and right hand 904 may represent virtualized views of the user's left and right hands. As shown, left hand 902 may include a little finger 906 (i.e., a pinky or fifth digit), a ring finger 908 (i.e., a fourth digit), a middle finger 910 (i.e., a third digit), an index finger 912 (i.e., a second digit), and a thumb 914 (i.e., a first digit), and right hand 904 may include a thumb 916, an index finger 918, a middle finger 920, a ring finger 922, and a little finger 924. In this example, the systems described herein may perform step 810 by monitoring the positions of each of fingers 906-912 relative to thumb 914 and each of fingers 918-924 relative to thumb 916.

The systems described herein may perform step 810 in a variety of ways using any combination of the sensors described herein. In some embodiments, the systems described herein may use image-based hand tracking to generate three-dimensional models of a user's hands and fingers from which pinch gestures may be detected. Using FIG. 5 as an example, glasses 502 may include one or more cameras and a hand-tracking system that uses image-based hand tracking to generate three-dimensional models of hands 506 and 508 fingers from which pinch gestures may be detected.

In addition to monitoring finger and thumb positions, the systems described herein may also monitor various attributes of a user's hands. For example, the systems described herein may monitor an orientation, a handshape, or an absolute or relative rotation, height, or distance of the user's hands. As will be explained in greater detail below, the systems described herein may map user input to combinations of pinch gestures and hand attributes and/or may use various changes to hand attributes as triggers for changing the states of displayed virtual keyboards.

At step 820, one or more of the systems described herein may detect a pinch gesture of the one or more fingers. For example, gesture-detecting module 122 may detect pinch gestures 123. In some embodiments, the term "pinch gesture" may refer to any finger gesture that includes the touching of the fingertips of one or more fingers to the fingertip of an opposing thumb. In some embodiments, the term "pinch gesture" may refer to any finger gesture that includes the contacting of a distal segment of one or more fingers to the distal segment of an opposing thumb. Additionally or alternatively, the term "pinch gesture" may refer to any finger gesture that includes the placing of the fingertips of one or more fingers in close proximity (e.g., within 1-3 centimeters) of the fingertip of an opposing thumb. In at least one embodiment, the term "pinch gesture" may refer to any finger gesture that includes the placing of the fingertips of one or more fingers in relative closer proximity to the fingertip of an opposing thumb.

In addition to or as part of detecting pinch gestures, the systems disclosed herein may detect hand shapes, positions, orientations, and/or locations. In some embodiments, the systems described herein may transform a pinch gesture into one user input if the pinch gesture is made when a hand is in a particular shape, position, orientation, and/or location but another user input if the pinch gesture is made when the hand is in another shape, position, orientation, and/or location. Using FIG. 10 as an example, head-mounted display system 1004 may transform pinch gestures of a right hand 1006 of user 1002 into different user inputs before and after movement 1008.

At step 830, one or more of the systems described herein may determine one or more user inputs to which at least the pinch gesture has been mapped. For example, input-determining module 124 may determine that pinch gesture 123 is mapped to user input 125 using user-input mappings 132. In some embodiments, the term "user input" may refer to a character or string of characters. In some embodiments, the term "user input" may refer to a word. In other embodiments, the term "user input" may refer to a user command. In some embodiments, the term "user input" may refer to any output of an input device (e.g., a keyboard, a mouse, a controller, a pen, a microphone, a video camera, an eye-tracking device, etc.). Examples of user input include, without limitation, a key press, a combination of key presses, a button press, a pen touch, and scroll-wheel input.

The systems described herein may perform step 830 in a variety of ways. In one example, the systems described herein may determine that only one user input has been mapped to a detected pinch gesture. In other examples, the systems described herein may determine that several user inputs have been mapped to a detected pinch gesture. In some embodiments, the systems described herein may use a language model to determine the most likely user input when a pinch gesture or series of pinch gestures map to multiple user inputs. In at least one embodiment, the systems described herein may enable, when a pinch gesture or series of pinch gestures map to multiple user inputs, a user to select an intended user input.

At step 840, one or more of the systems described herein may perform, at the computing device, a user-input operation based on the one or more user inputs. For example, input-processing module 126 may perform a user-input operation on user input 125. The term "user-input operation" may generally refer to any type or form of data processing. In some embodiments, the systems described herein may perform a user-input operation by displaying the user input to the user via a graphical user interface element, processing the user input, storing the user input, triggering an action or function based on the user input, passing the user input to another function or application for further processing, and/or transmitting the user input to another computing system for further processing.

Figure 11:
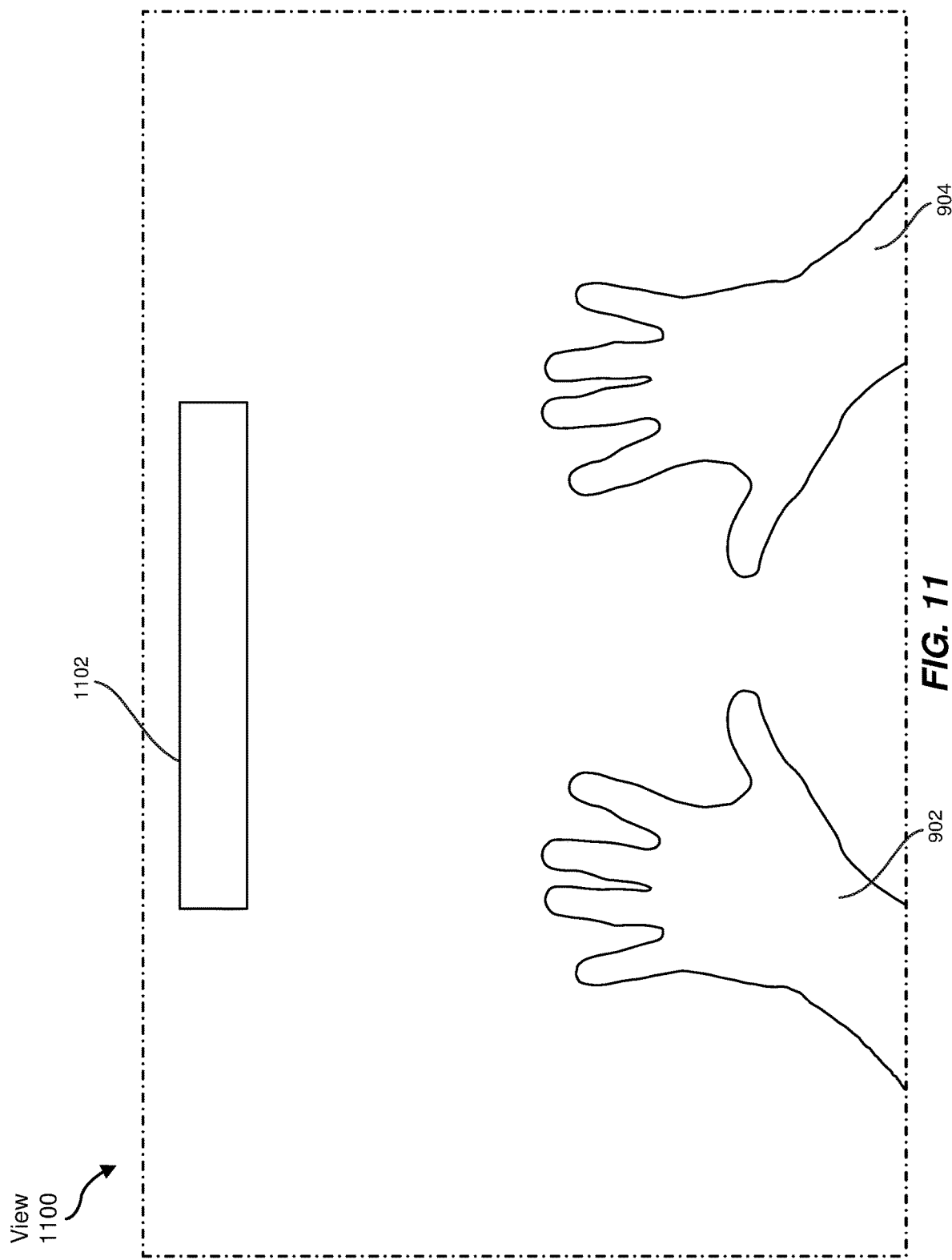
FIG. 11 is an illustration of a user's field of view, in accordance with some embodiments.
Figure 13:
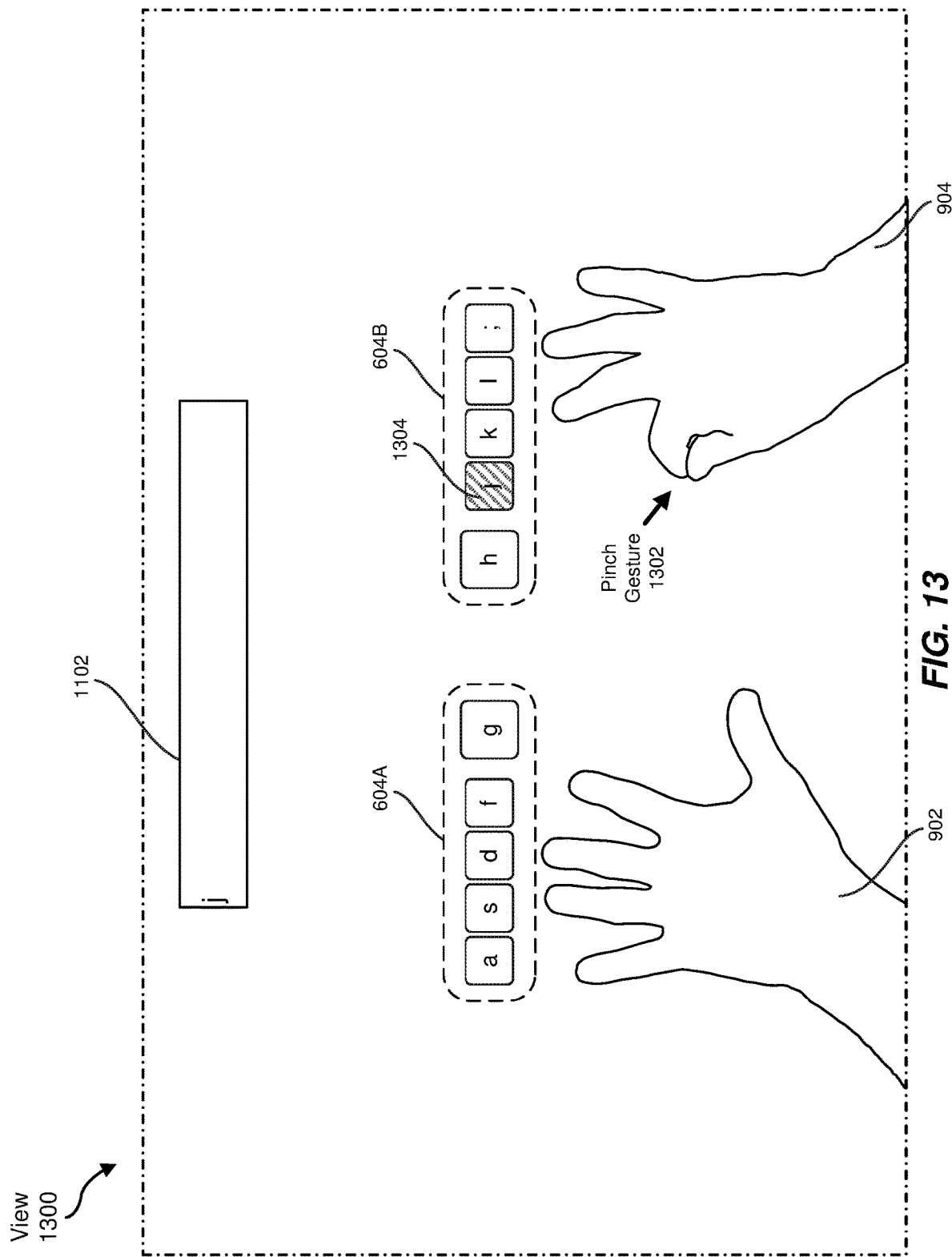
FIG. 13 is an illustration of a user's view of an exemplary virtual keyboard as the user performs an exemplary pinch gesture, in accordance with some embodiments.

FIGS. 11-33 illustrate various exemplary implementations of the steps of method 800. FIGS. 11-23 illustrate various exemplary pinch gestures made by a user while inputting text into an input field 1102 using virtual keyboard 600. As shown in FIG. 11, the systems disclosed herein may display a view 1100 including input field 1102. As shown in FIG. 12, the systems and methods disclosed herein may provide virtual keyboard 600 to the user to input text into input field by displaying a view 1200 including input field 1102 and virtual keys 604A and 604B. While not illustrated, in some embodiments, the systems disclosed herein may enable a user to use virtual keyboard 600 to input text into input field 1102 without ever displaying virtual keyboard 600 to the user. As shown in FIG. 13, the systems described herein may detect a pinch gesture 1302 involving finger 918 and thumb 916 that maps to the character "j" when hand 904 is in the neutral position shown in FIG. 13 and may display a view 1300 with the character "j" added to input field 1102 and a state of virtual keyboard 600 in which key 1304 is highlighted.

Figure 14:
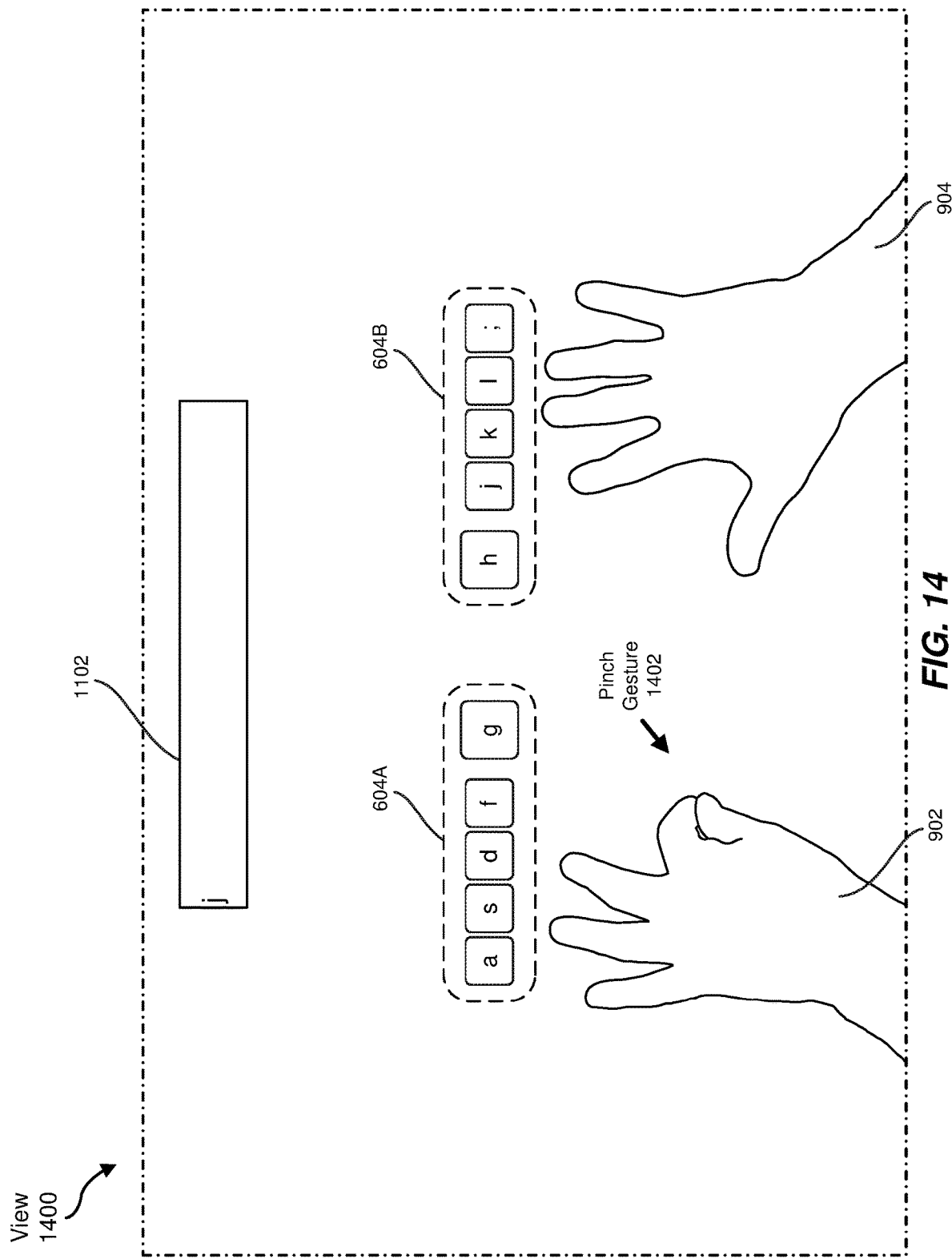
FIGS. 14 and 15 are illustrations of a user's view of an exemplary virtual keyboard as the user performs an exemplary pinch gesture, in accordance with some embodiments.

FIGS. 14 and 15 illustrate views 1400 and 1500 of a user inputting a backspace command that has been mapped to a combination of pinch gesture 1402 and counterclockwise rotation 1502 of left hand 902. In this example, the systems described herein may detect pinch gesture 1402 in temporal proximity to counterclockwise rotation 1502 of hand 902 and may responsively display view 1500 with the character "j" removed from input field 1102.

Figure 18:
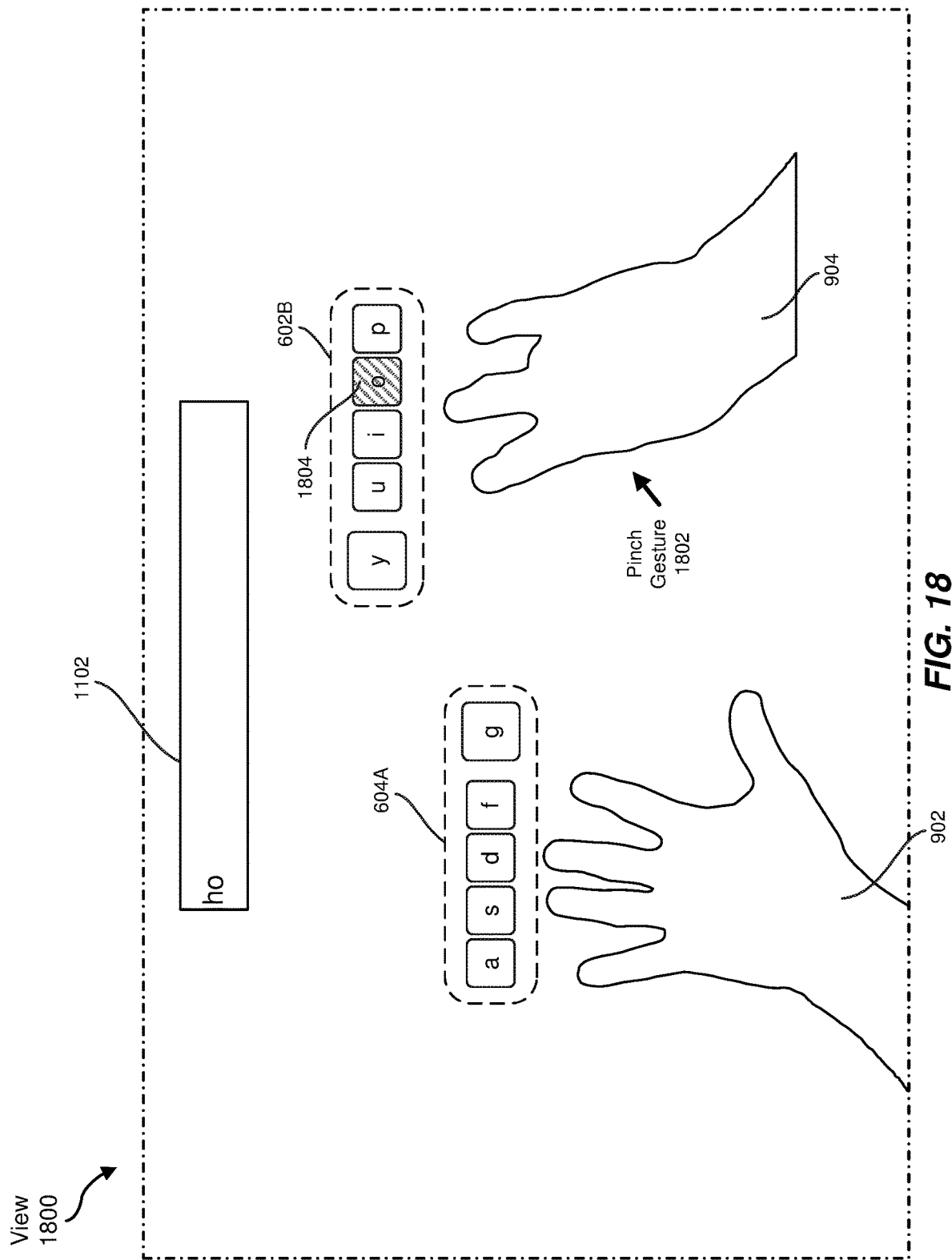
FIG. 18 is an illustration of a user's view of an exemplary virtual keyboard as the user performs an exemplary pinch gesture, in accordance with some embodiments.

FIGS. 16-20 illustrate exemplary views 1600-2000 of a user inputting the first, the second, and the fourth characters of "how are you?" into input field 1102. As shown in FIG. 16, the systems described herein may detect a pinch gesture 1602 involving fingers 918 and 920 and thumb 916 of hand 904 that maps to the character "h" when hand 904 is in the neutral position shown in FIG. 16 and may display view 1600 with the character "h" shown in input field 1102 and a state of virtual keyboard 600 in which key 1604 is highlighted. As shown in FIG. 17, the systems described herein may detect an upward motion 1704 of hand 904 and may display view 1700 with virtual keys 602B replacing virtual keys 604B. As shown in FIG. 18, the systems described herein may detect a pinch gesture 1802 involving finger 922 and thumb 916 of hand 904 that maps to the character "o" when hand 904 is in raised position shown in FIG. 18 and may display view 1800 with the character "o" added to input field 1102 and a state of virtual keyboard 600 in which key 1804 is highlighted.

FIGS. 19 and 20 illustrate views 1900 and 2000 of a user inputting a space character that has been mapped to a combination of a pinch gesture 1902 and a clockwise rotation 2002 of right hand 904. In this example, the systems described herein may detect pinch gesture 1902 in temporal proximity to clockwise rotation 2002 of hand 904 and may responsively display view 2000 with a space character added to input field 1102.

FIGS. 21 and 22 illustrate exemplary views 2100 and 2200 of alternative ways in which a user may select virtual keys 606B (e.g., a bottom row of virtual keyboard 600). As shown in FIG. 21, the systems described herein may detect a downward motion 2104 of hand 904 and may display a view 2100 with virtual keys 606B replacing virtual keys 604B. As shown in FIG. 22, the systems described herein may alternatively detect a clockwise rotation 2204 of hand 904 and may display view 2200 with virtual keys 606B replacing virtual keys 604B.

Figure 23:
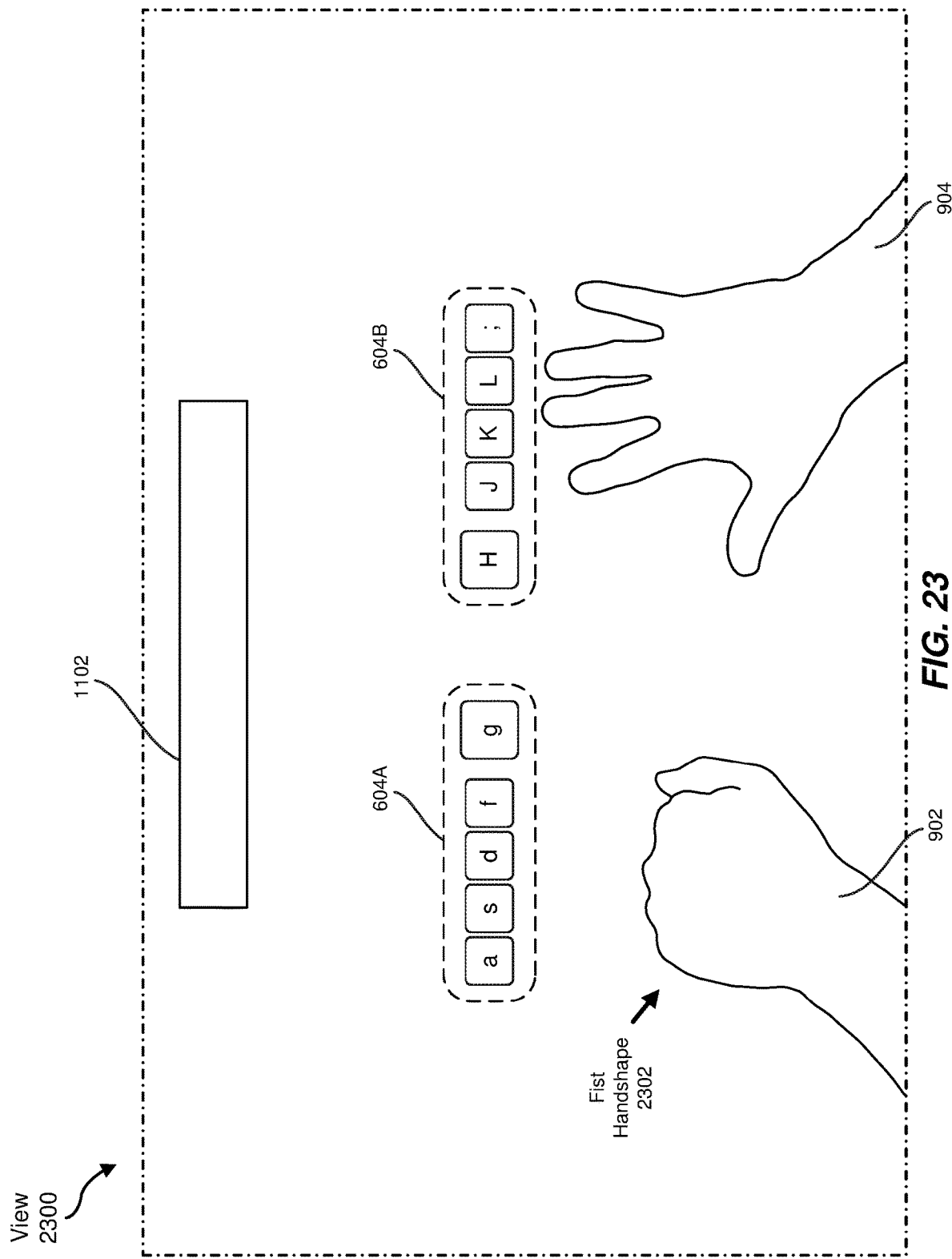
FIG. 23 is an illustration of a user's view of an exemplary virtual keyboard as the user performs an exemplary hand-shape, in accordance with some embodiments.

FIG. 23 illustrates an exemplary view 2300 of a user inputting a shift command that may be applied to virtual keys 604B. As shown in FIG. 23, the systems described herein may detect a first handshape 2302 of hand 902 and may display a view 2300 of a state of virtual keyboard 600 in which the characters of virtual keys 604B are shown in caps.

Figure 24:
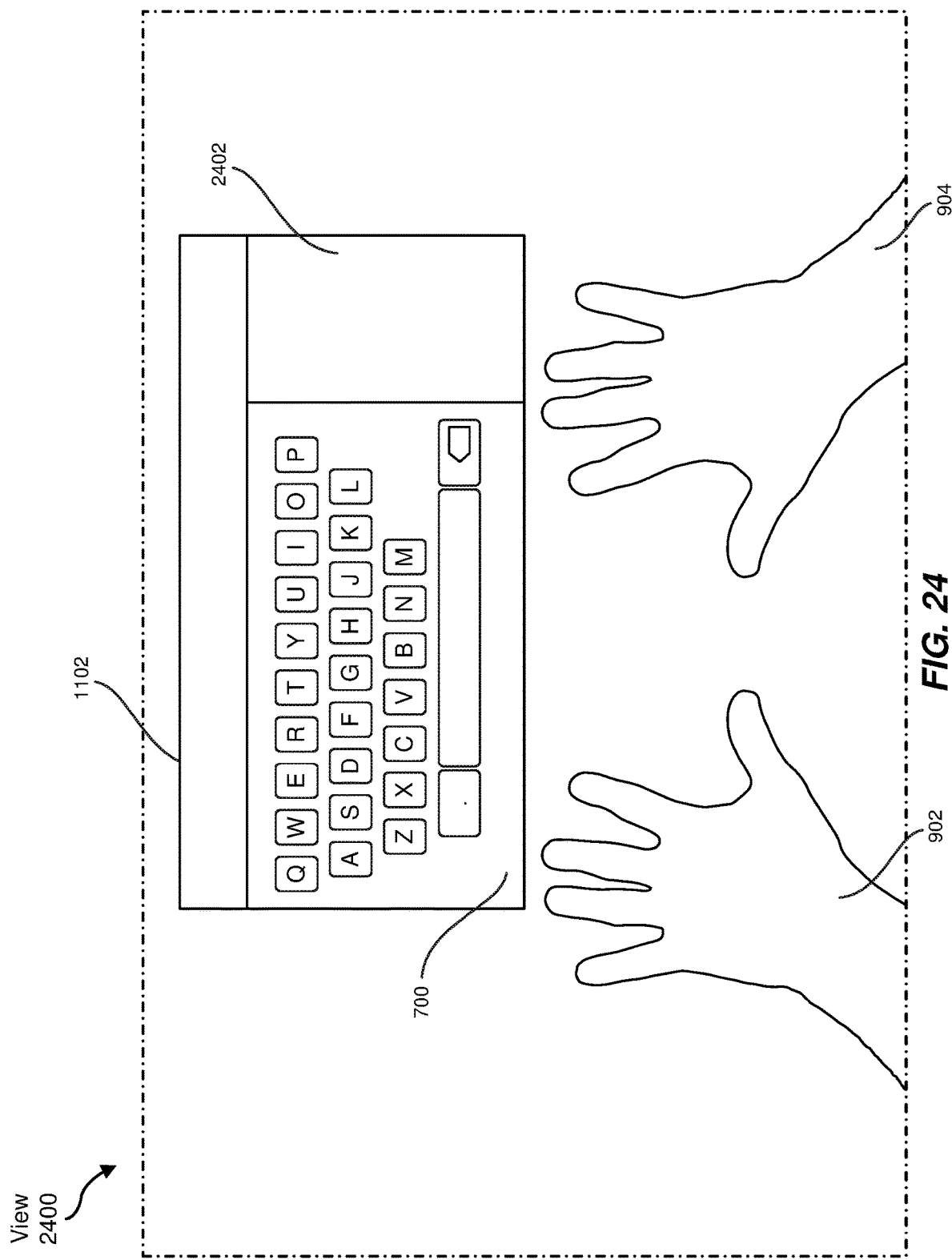
FIG. 24 is an illustration of a user's initial view of an exemplary virtual keyboard, in accordance with some embodiments.
Figure 31:
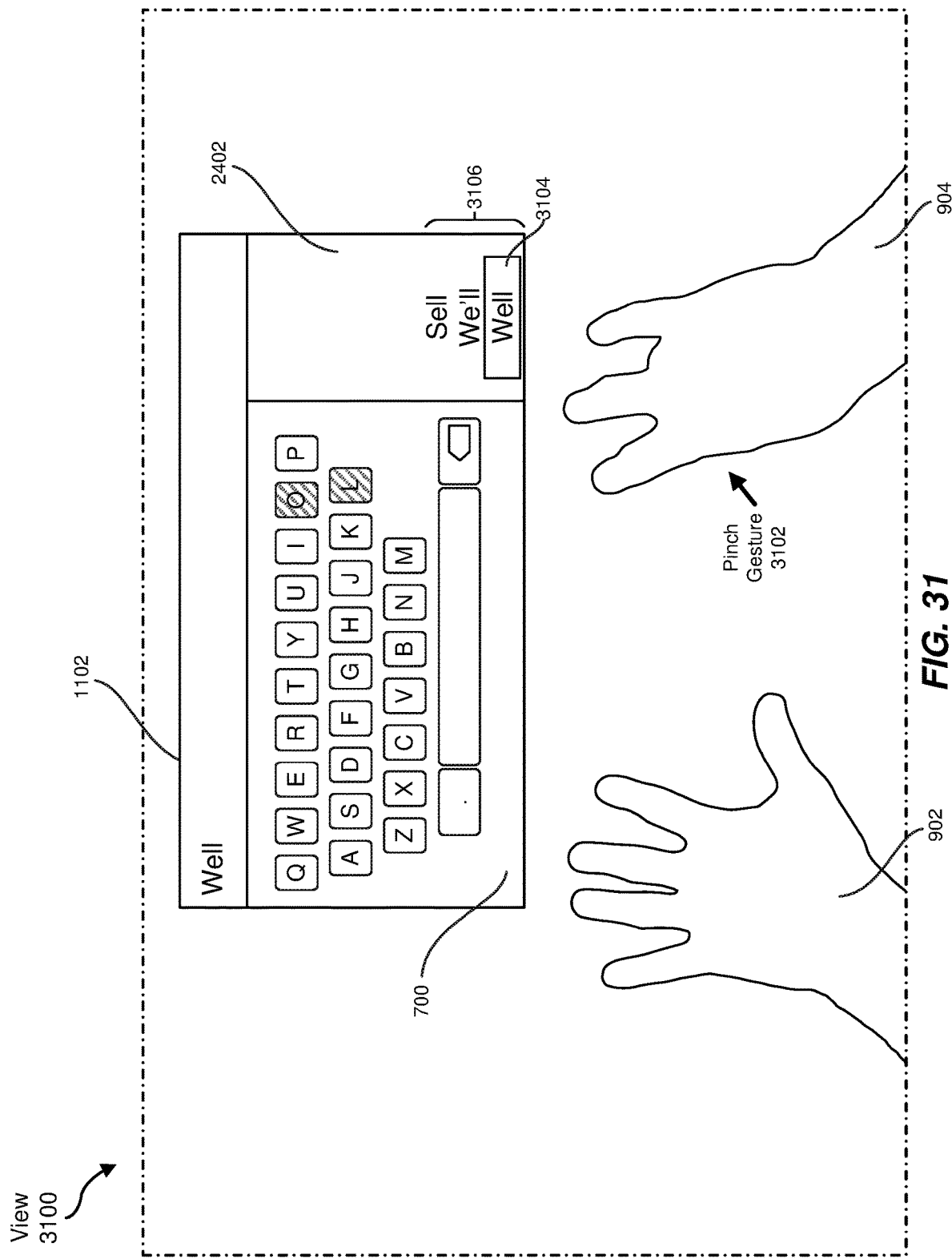
FIG. 31 is an illustration of a user's view of an exemplary virtual keyboard as the user performs an exemplary pinch gesture, in accordance with some embodiments.
Figure 32:
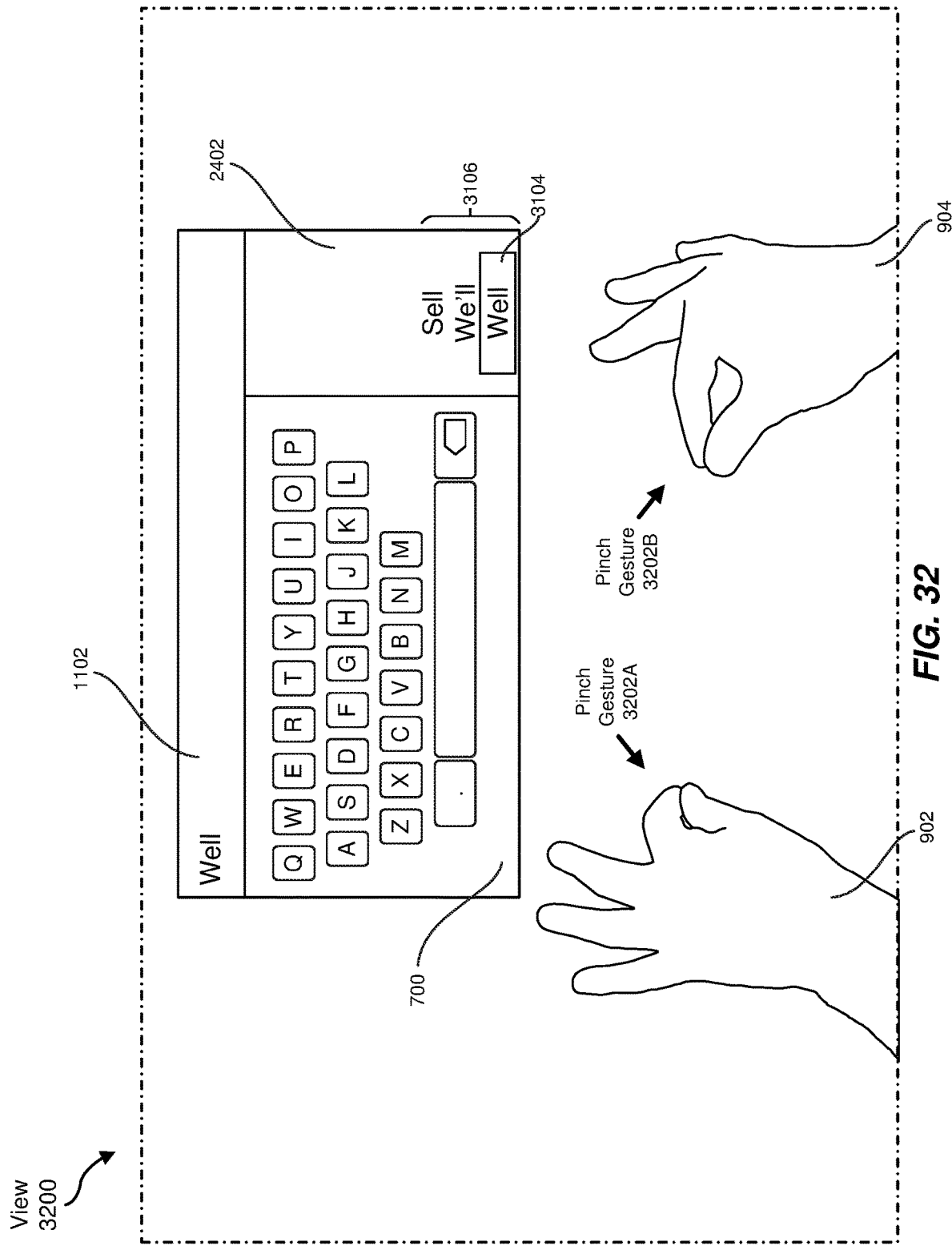
FIGS. 32 and 33 are illustrations of a user's view of an exemplary virtual keyboard as the user performs an exemplary pinch gesture, in accordance with some embodiments.
Figure 33:
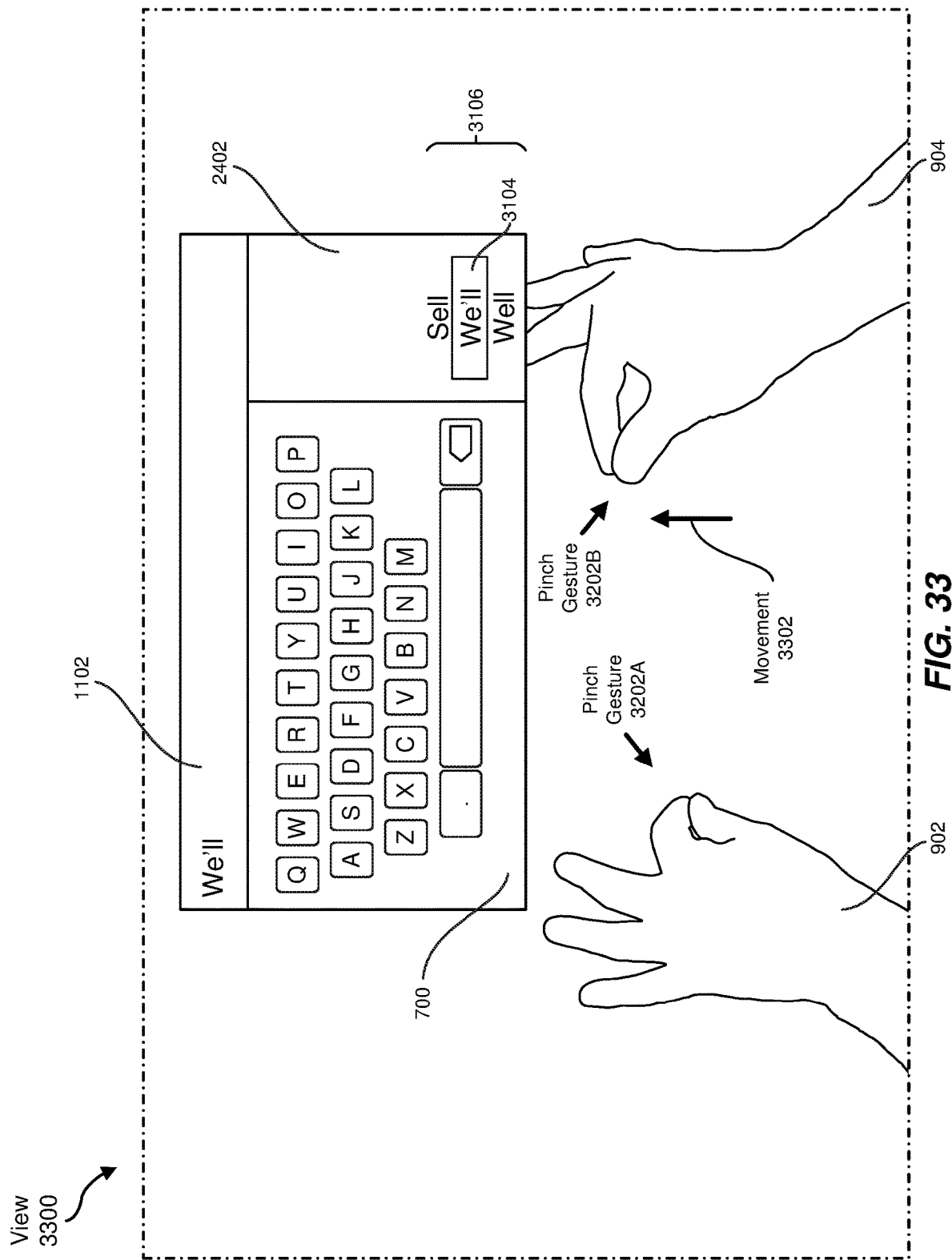

FIGS. 24-33 illustrate various exemplary pinch gestures made by a user while inputting text into input field 1102 using virtual keyboard 700. More specifically, FIGS. 25-30 illustrate exemplary views 2500-3000 of a user performing various exemplary pinch gestures while intending to input "I hope you are well" into input field 1102, and FIGS. 31-33 illustrate exemplary views 3100-3300 of a user performing various exemplary pinch gestures while intending to input "We'll see you soon" into input field 1102. As shown in FIG. 24, the systems disclosed herein may display an initial view 2400 of input field 1102, virtual keyboard 700, and a field 2402 for suggesting user input. While not illustrated, in some embodiments, the systems disclosed herein may enable a user to use virtual keyboard 700 to input text into input field 1102 without ever displaying virtual keyboard 700 to the user.

Figure 25:
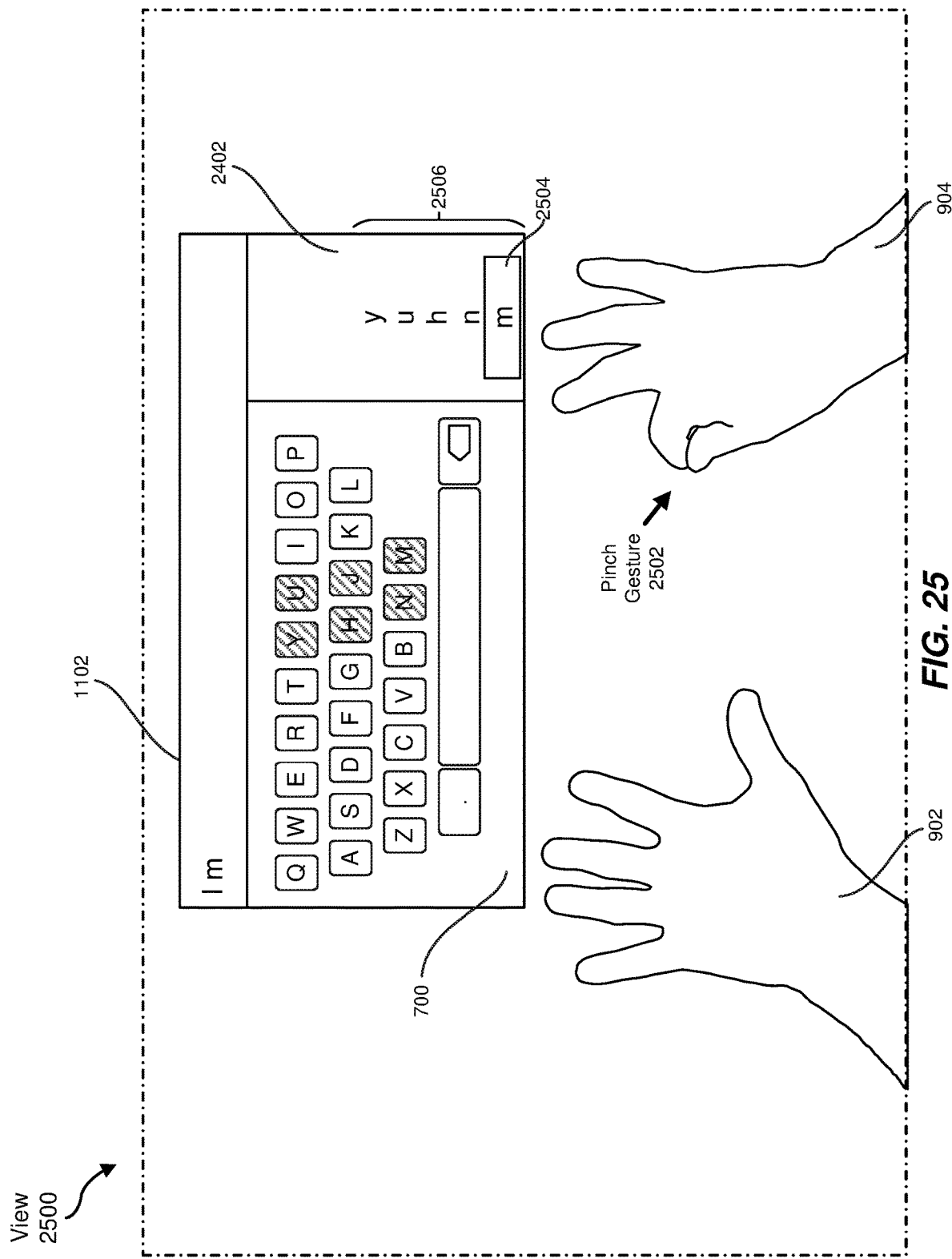
FIG. 25 is an illustration of a user's view of an exemplary virtual keyboard as the user performs an exemplary pinch gesture, in accordance with some embodiments.

As shown in FIG. 25, the systems described herein may detect a pinch gesture 2502 involving finger 918 and thumb 916 that maps to the characters of keys 718 and may display view 2500 with the most probable character "m" added to input field 1102 and a state of virtual keyboard 700 in which keys 718 are highlighted. The systems described herein may also display an indicator 2504 that the character "m" is the most likely user input from among candidates 2506, which have all been mapped to pinch gesture 2502. As shown, candidates 2506 may be displayed to the user in field 2402.

Figure 26:
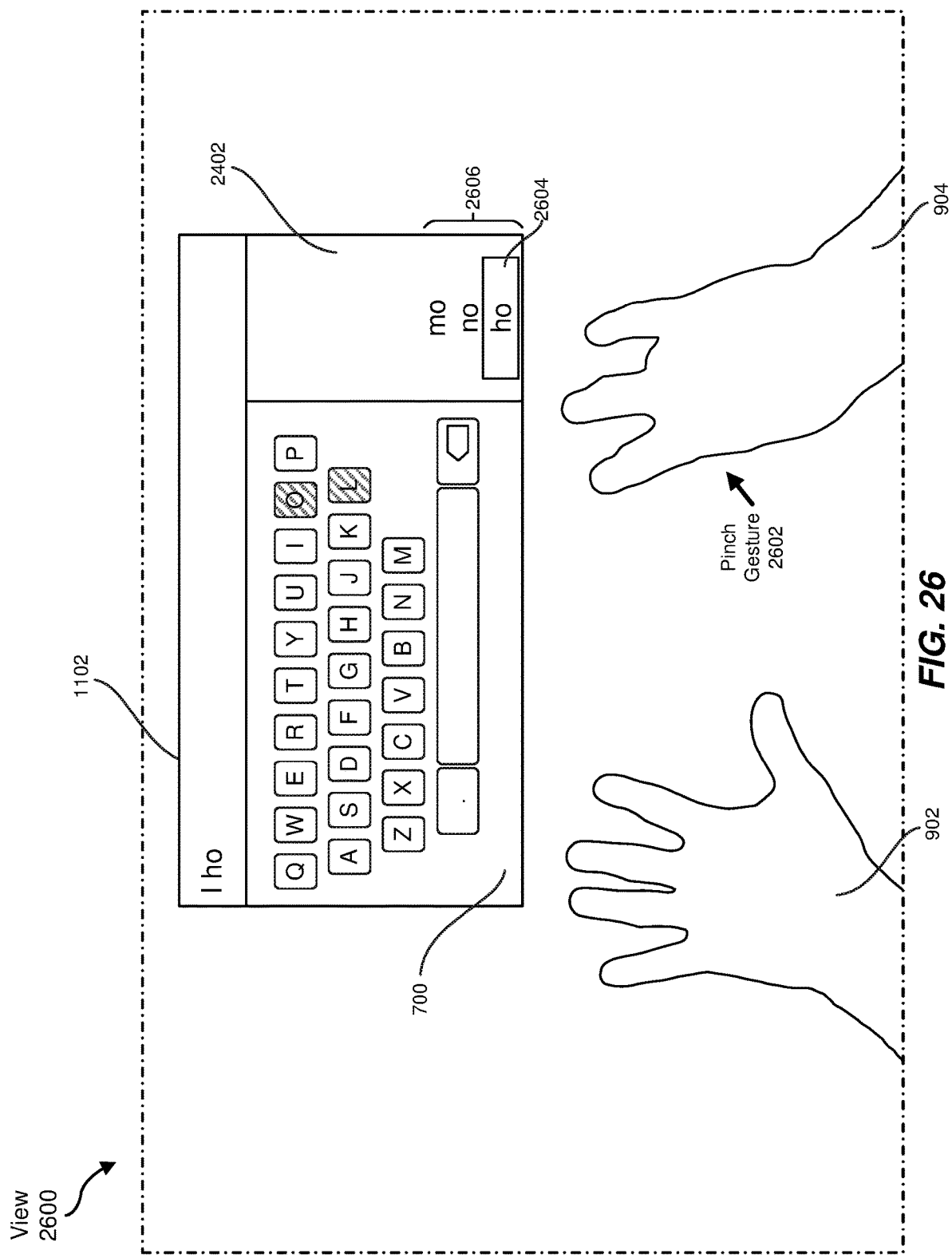
FIG. 26 is an illustration of a user's view of an exemplary virtual keyboard as the user performs an exemplary pinch gesture, in accordance with some embodiments.

As shown in FIG. 26, the systems described herein may detect a pinch gesture 2602 involving finger 922 and thumb 916 that maps to the characters of keys 722 and may display a view 2600 with the most probable characters "ho" for pinch gestures 2502 and 2602 added to input field 1102 and a state of virtual keyboard 700 in which keys 722 are highlighted. The systems described herein may also display an indicator 2604 of the characters "ho" being the most likely user input from among candidates 2606, which have all been mapped to a series of pinch gestures that include pinch gestures 2502 and 2602. As shown, candidates 2606 may be displayed to the user in field 2402.

Figure 27:
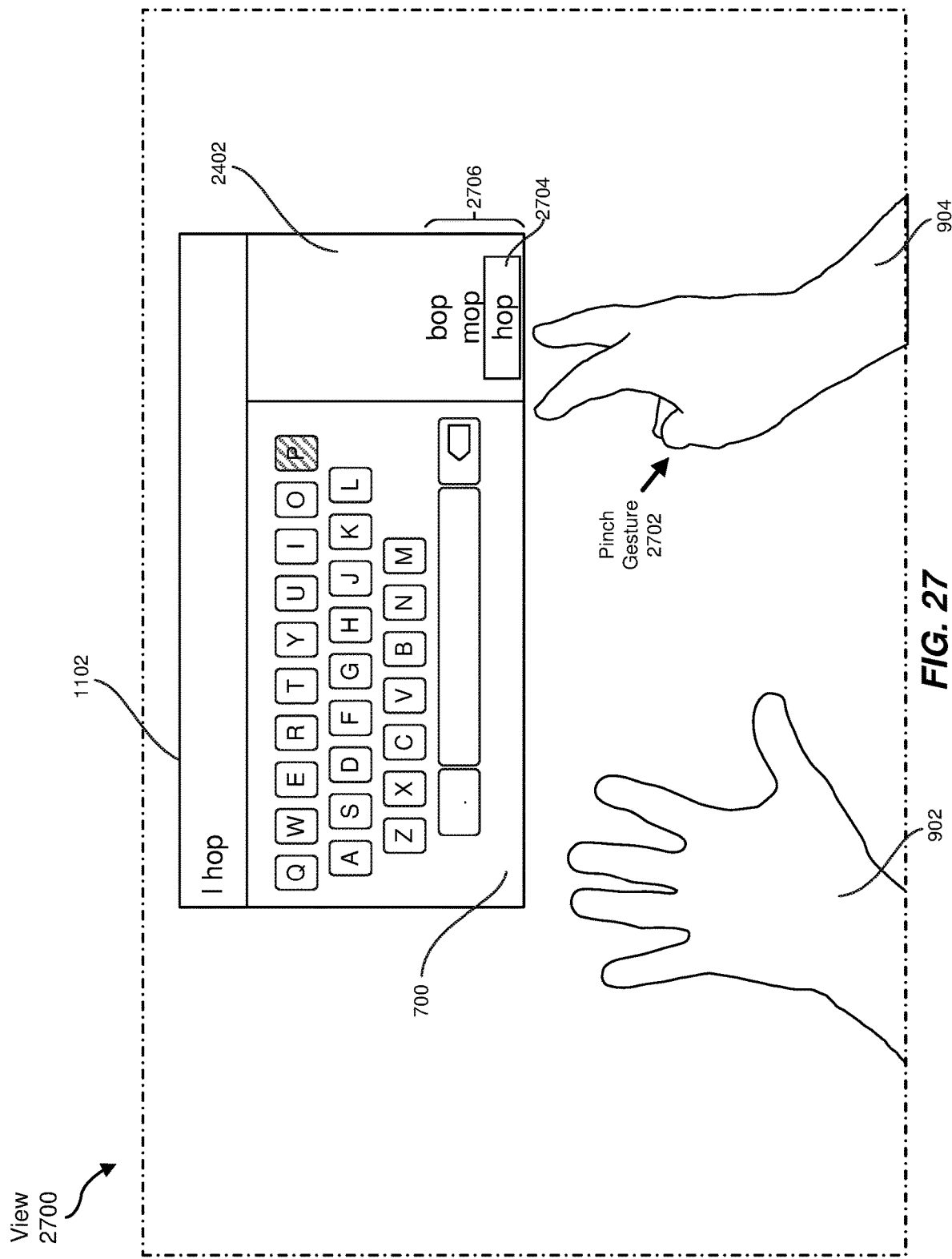
FIG. 27 is an illustration of a user's view of an exemplary virtual keyboard as the user performs an exemplary pinch gesture, in accordance with some embodiments.

As shown in FIG. 27, the systems described herein may detect a pinch gesture 2702 involving finger 924 and thumb 916 that maps to the character of key 724 and may display a view 2700 with the most probable characters "hop" for pinch gestures 2502, 2602, and 2702 added to input field 1102 and a state of virtual keyboard 700 in which key 724 is highlighted. The systems described herein may also display an indicator 2704 of the characters "hop" being the most likely user input from among candidates 2706, which have all been mapped to a series of pinch gestures that include pinch gestures 2502, 2602, and 2702. As shown, candidates 2706 may be displayed to the user in field 2402.

Figure 28:
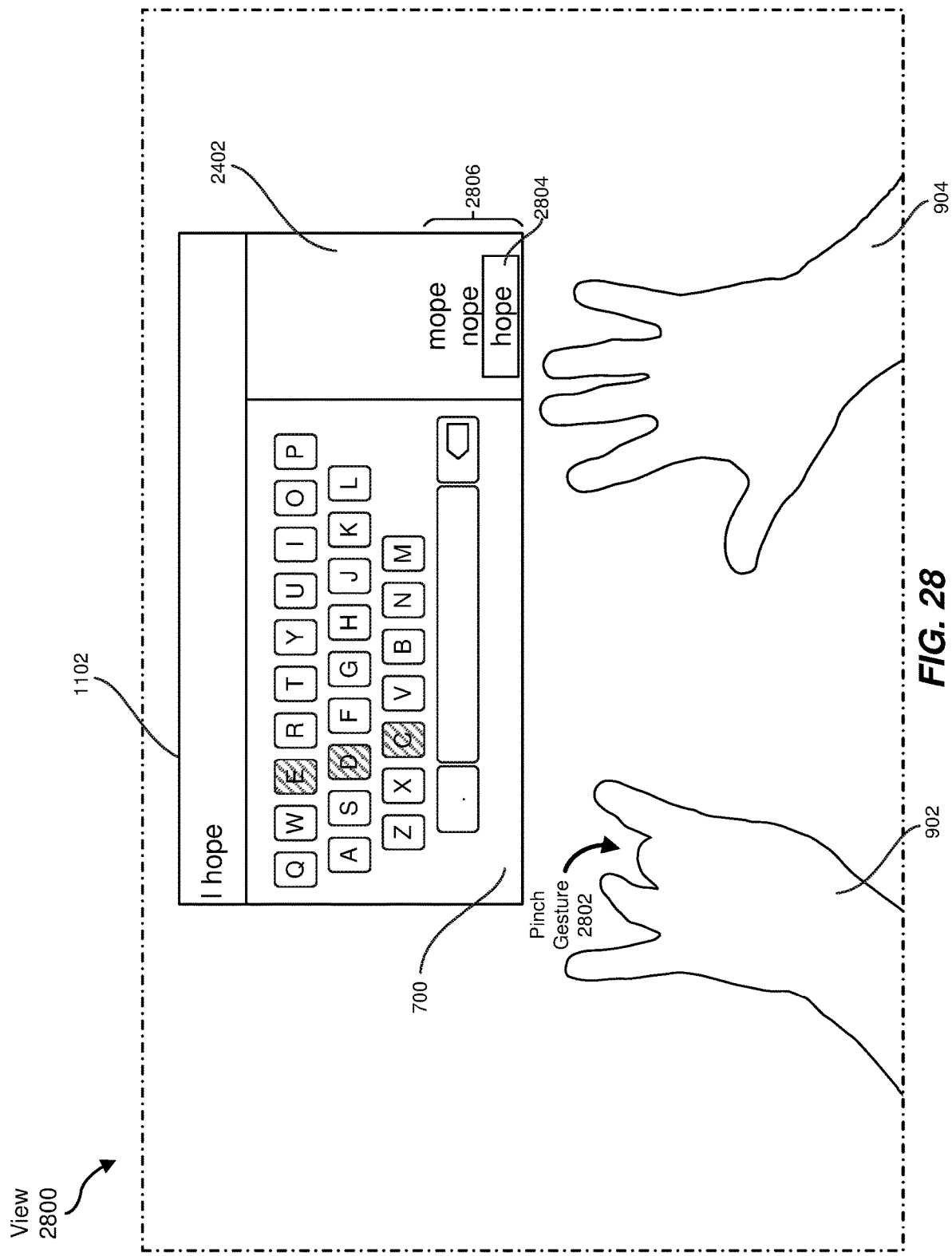
FIG. 28 is an illustration of a user's view of an exemplary virtual keyboard as the user performs an exemplary pinch gesture, in accordance with some embodiments.

As shown in FIG. 28, the systems described herein may detect a pinch gesture 2802 involving finger 910 and thumb 914 that maps to the characters of keys 714 and may display a view 2800 with the most probable characters "hope" for pinch gestures 2502, 2602, 2702, and 2802 added to input field 1102 and a state of virtual keyboard 700 in which keys 714 are highlighted. The systems described herein may also display an indicator 2804 of the characters "hope" being the most likely user input from among candidates 2806, which have all been mapped to a series of pinch gestures that include pinch gestures 2502, 2602, 2702, and 2802. As shown, candidates 2806 may be displayed to the user in field 2402.

As shown in FIG. 29, the systems described herein may detect pinch gestures 2902 (a combination of a pinch gesture 2902A involving finger 912 and thumb 914 and a pinch gesture 2902B involving finger 918 and thumb 916) that map to the space character of key 730 and may display view 2900 with a space character added to input field 1102 and a state of virtual keyboard 700 in which key 730 is highlighted. FIG. 30 illustrates an alternative combination of pinch gestures. As shown in FIG. 30, the systems described herein may detect pinch gestures 3002 (a combination of a pinch gesture 3002A involving finger 906 and thumb 914 and a pinch gesture 3002B involving finger 924 and thumb 916) that map to the backspace command of key 732 and may display view 3000 with a character removed from input field 1102 and a state of virtual keyboard 700 in which key 732 is highlighted. The systems described herein may also display an indicator 3004 of the characters "hop" being the most likely user input from among candidates 3006, which have all been mapped to a series of pinch gestures that include pinch gestures 2502, 2602, and 2702. As shown, candidates 3006 may be displayed to the user in field 2402.

Turning to the example illustrated in FIGS. 31-33. The systems described herein may detect a pinch gesture 3102 involving finger 922 and thumb 916 that maps to the characters of keys 722 and may display a view 3100 with the most probable characters "Well" for a series of pinch gestures ending with 3102 added to input field 1102 and a state of virtual keyboard 700 in which keys 722 are highlighted. The systems described herein may also display an indicator 3104 of the characters "Well" being the most likely user input from among candidates 3106, which have all been mapped to the series ending in pinch gesture 3102. As shown, candidates 3106 may be displayed to the user in field 2402. As shown in FIGS. 32 and 33, the systems described herein may detect the user's desire to input a different word from candidates 3106 by detecting pinch gestures 3202 (a combination of a pinch gesture 3202A involving finger 912 and thumb 914 and a pinch gesture 3202B involving finger 918 and thumb 916) and a movement 3302 of hand 904. In this example, the systems described herein may move indicator 3104 upward and downward within candidate words 3106 following upward and downward movements of hand 904 and may adjust input field 1102 accordingly. In some embodiments, the user may select characters "We'll" by ending the performance of pinch gestures 3202.

Figure 34:
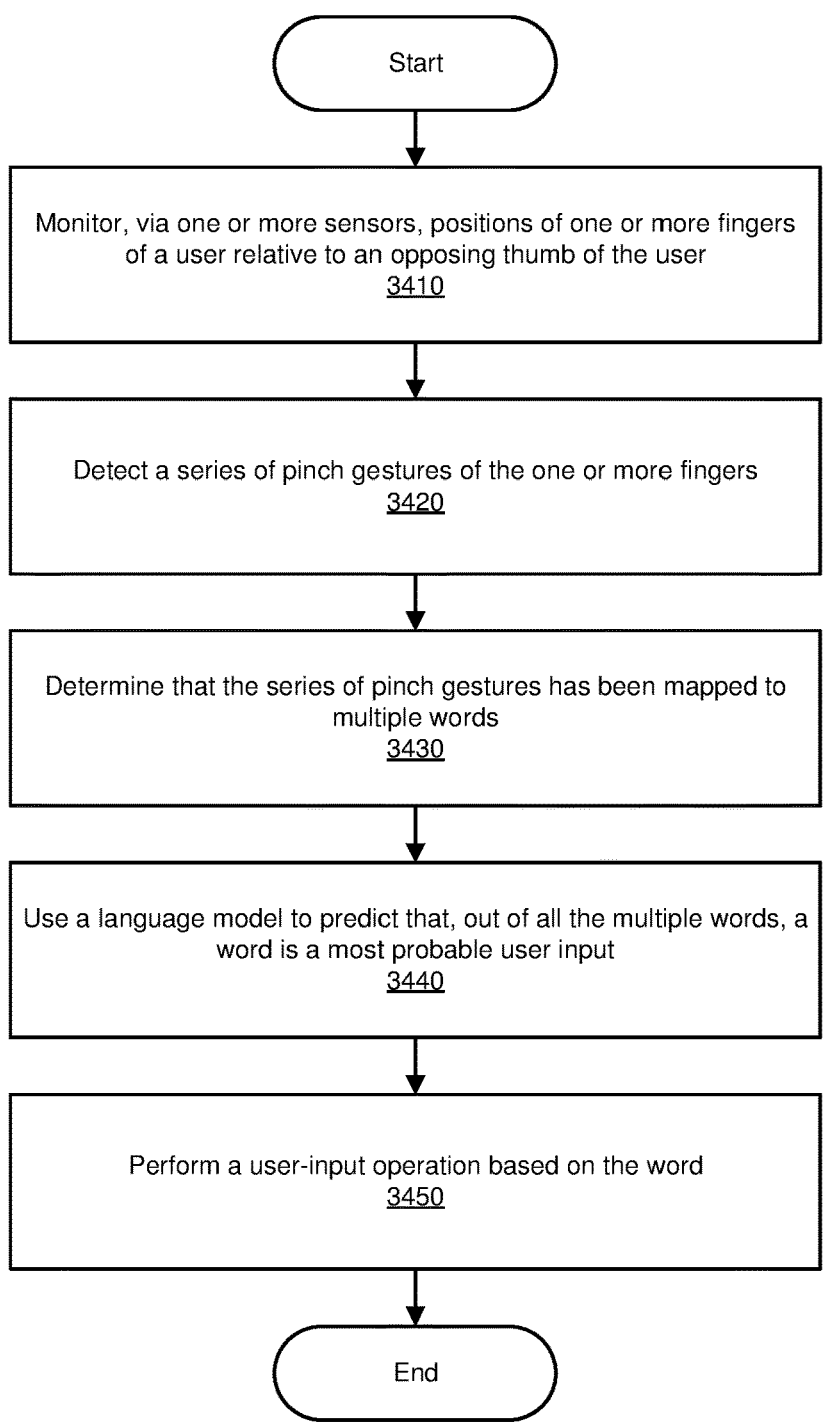
FIG. 34 is a flow diagram of another exemplary method for processing pinch-based user input, in accordance with some embodiments.
Figure 35:
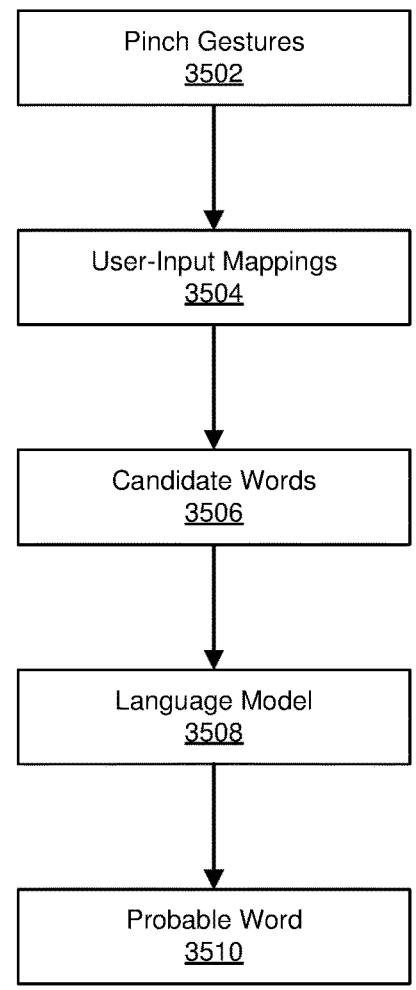
FIG. 35 is a block diagram of an exemplary data flow method for processing pinch-based user input, in accordance with some embodiments.

FIG. 34 is a flow diagram of an exemplary computer-implemented method 3400 for processing a series of pinch gestures as user input. The steps shown in FIG. 34 may be performed by any suitable computer-executable code and/or computing system, including the system(s) illustrated in FIGS. 1-5, 10, and 39-44. In one example, each of the steps shown in FIG. 34 may represent an algorithm whose structure includes and/or is represented by multiple sub-steps, examples of which will be provided in greater detail below. In some examples, all or a portion of computer-implemented method 3400 may be performed by an operating system, an application programing interface, or an artificial-reality framework of a head-mounted display system. In other examples, all or a portion of computer-implemented method 3400 may be performed by a third-party application executing on a head-mounted display system.

As illustrated in FIG. 34, at step 3410 one or more of the systems described herein may monitor, at a computing device via one or more sensors, positions of one or more fingers of a user relative to an opposing thumb of the user. For example, gesture-detecting module 122 may monitor, at a computing device via one or more sensors, positions of fingers 906-912 and fingers 918-924 relative to thumbs 914 and 916, respectively. At step 3420, one or more of the systems described herein may detect a series of pinch gestures of the one or more fingers. For example, gesture-detecting module 122 may detect pinch gestures 3502. In some embodiments, the term "series of pinch gestures" may refer to any series of distinguishable pinch gestures. In various embodiments, the term "series of pinch gestures" may refer to all pinch gestures performed by a user since the user last confirmed the user's intended user input and/or all pinch gestures performed by a user since the user last confirmed a space or punctuation character.

At step 3430, one or more of the systems described herein may determine that the series of pinch gestures has been mapped to multiple words. For example, input-determining module 124 may determine, using user-input mappings

3504, that pinch gestures 3502 have been mapped to candidate words 3506. In some examples, the systems described herein may display the candidate words to a user. Using FIG. 28 as an example, the systems described herein may display candidate words 2806 to the user as shown.

At step 3440, one or more of the systems described herein may use a language model to predict that, out of all the multiple words, a word is a most probable word. For example, input-determining module 124 may use a language model 3508 to predict that, from among candidate words 3506, word 3510 is most likely to be a user's intended user input.

At step 3450, one or more of the systems described herein may perform, at the computing device, a user-input operation based on the word. For example, input-processing module 126 may perform a user-input operation on word 3510. The systems described herein may perform step 3450 in a variety of ways. In one example, the systems described herein may present a word for autocompletion. In some examples, the systems described herein may enable the user to perform a gesture (e.g., a pinch or hand gesture to accept or select the word). Using FIG. 28 as an example, the systems described herein may display an indicator 2804 (e.g., a bounding box) that the word "hope" is the most likely word from candidate words 2806 and/or available for autocompletion.

Figure 36:
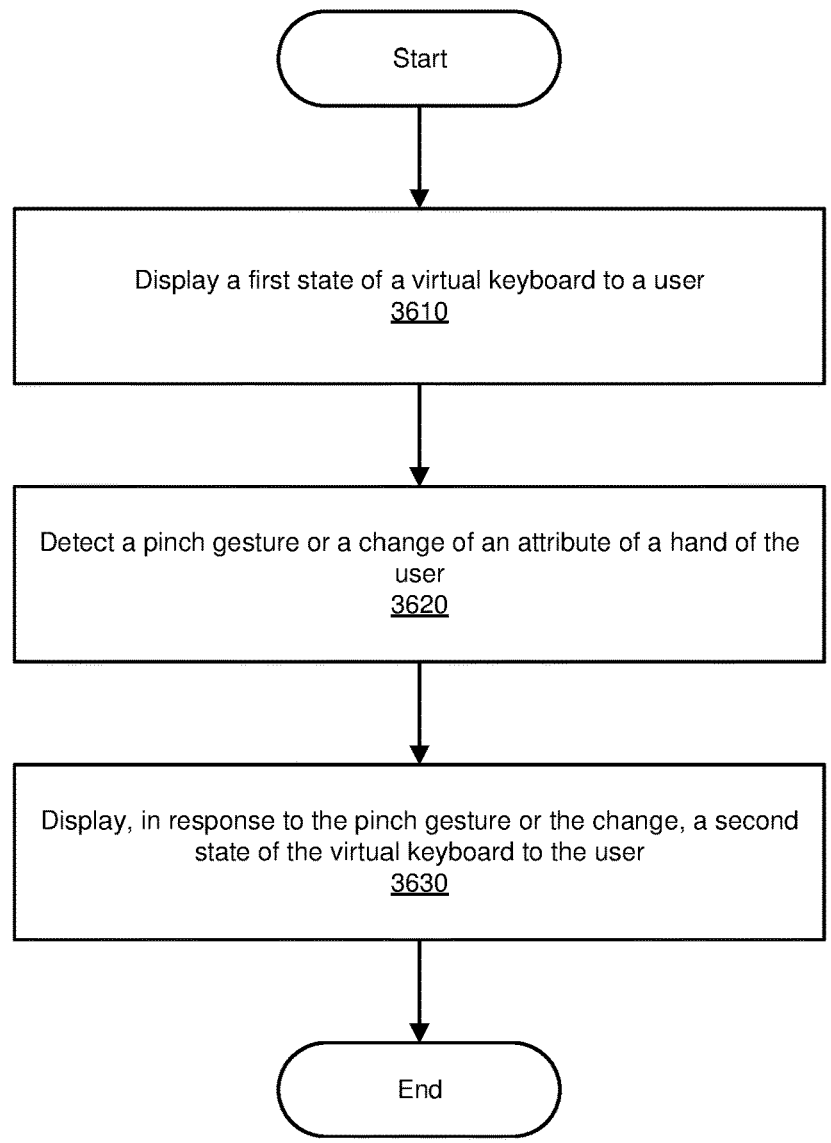
FIG. 36 is a flow diagram of an exemplary method for displaying a virtual keyboard to a user to facilitate pinch-based user input, in accordance with some embodiments.
Figure 37:
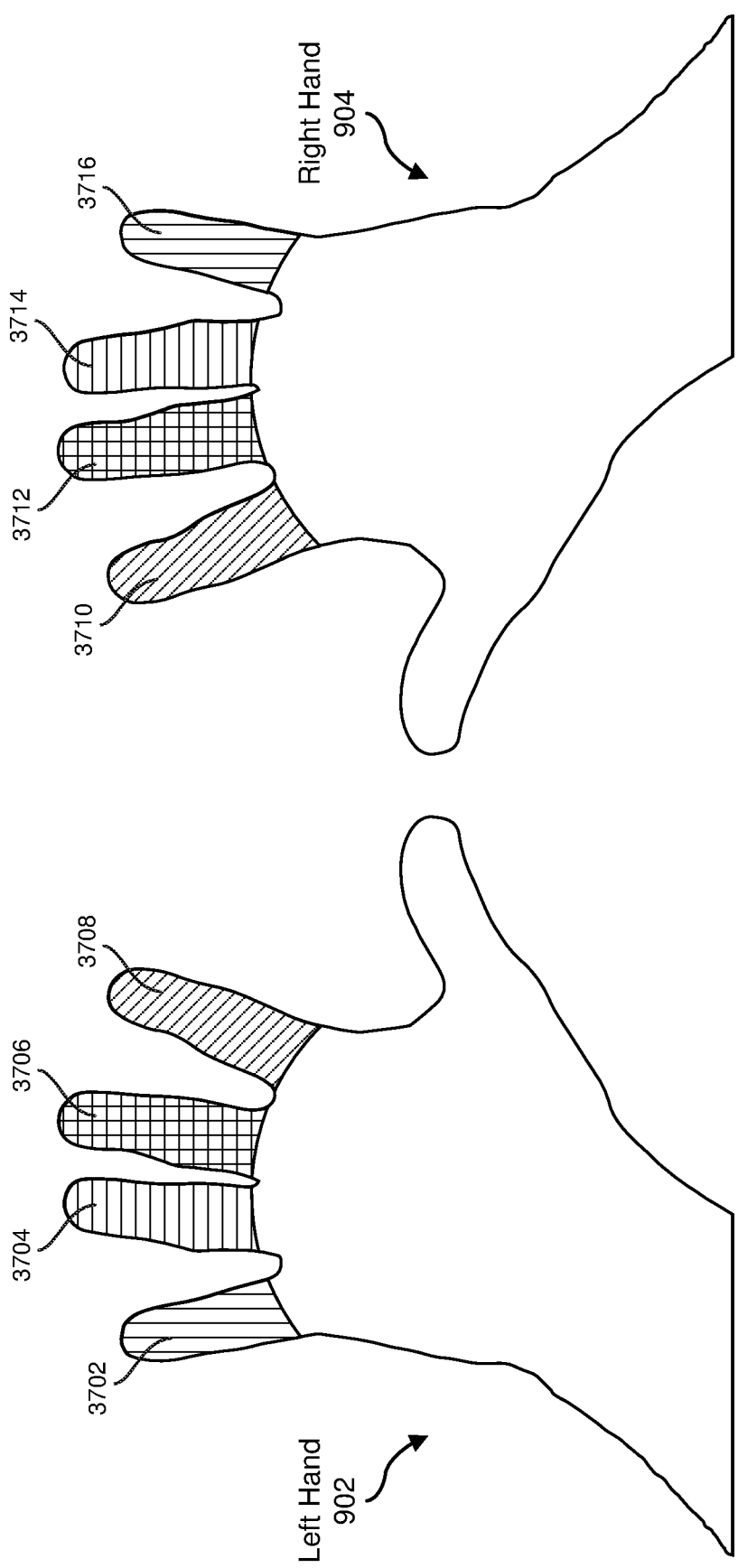
FIG. 37 is an illustration of exemplary visual attributes of a user's hands, in accordance with some embodiments.

FIG. 36 is a flow diagram of an exemplary computer-implemented method 3600 for displaying virtual keyboards. The steps shown in FIG. 36 may be performed by any suitable computer-executable code and/or computing system, including the system(s) illustrated in FIGS. 1-5, 10, and 39-44. In one example, each of the steps shown in FIG. 36 may represent an algorithm whose structure includes and/or is represented by multiple sub-steps, examples of which will be provided in greater detail below. In some examples, all or a portion of computer-implemented method 3600 may be performed by an operating system, an application programming interface, or an artificial-reality framework of a head-mounted display system. In other examples, all or a portion of computer-implemented method 3600 may be performed by a third-party application executing on a head-mounted display system.

As illustrated in FIG. 36, at step 3610 one or more of the systems described herein may display a first state of a virtual keyboard to a user. For example, user-input system 120 may display a first state of virtual keyboard 600 to a user of display system 100. The term "state" may refer to any presentable form of a virtual keyboard that can be distinguished from other presentable forms of the virtual key board. States of a virtual keyboard may differ in a variety of ways. For example, two states of a virtual keyboard may differ by the number of elements of the virtual keyboard shown to a user, the color of the elements, the highlighting of the elements, the orientations of the elements, the positions of the elements relative to each other, the positions of the elements relative to a user's field of view, the positions of the elements relative to a user's hands or fingers, and the positions of the elements relative to other real or virtual elements in a user's field of view.

In some embodiments, the systems disclosed herein may coordinate how elements of a virtual keyboard are displayed to a user with how features of the user's hands and/or fingers are displayed to the user. In some embodiments, the systems disclosed herein may display one or more keys of a virtual keyboard with a particular visual attribute (e.g., a color, a shade, a pattern, a size, etc.) and may cause a corresponding one or more of the user's fingers to be displayed to the user with the same or similar visual attribute. In one example, the systems described herein may project a color or pattern onto each of a user's fingers and may display the keys corresponding to each of the user's fingers with the same or similar color or pattern. Using FIGS. 7 and 37 as an example, the systems described herein may project colors 3702, 3704, 3706, 3708, 3710, 3712, 3714, and 3716 onto fingers 906, 908, 910, 912, 918, 920, 922, and 924, respectively. In this example, the systems described herein may, when displaying virtual keyboard 700, display keys 710 having color 3702, keys 712 having color 3704, keys 714 having color 3706, keys 716 having color 3708, keys 718 having color 3710, keys 720 having color 3712, keys 722 having color 3714, and key 724 having color 3716. Additionally or alternatively, the systems described herein may display, based on the exemplary mappings described above, keys 728 and 730 having colors 3708 and 3710 and key 732 having colors 3702 and 3716.

At step 3620, one or more of the systems described herein may detect a pinch gesture or a change of an attribute of a hand of the user. For example, user-input system 120 may detect pinch gesture 1302, upward movement 1704, or clockwise rotation 2204. At step 3630, one or more of the systems described herein may display a second state of the virtual keyboard to a user. For example, user-input system 120 may display a second state of virtual keyboard 600 or virtual keyboard 700 to the user.

Figure 38:
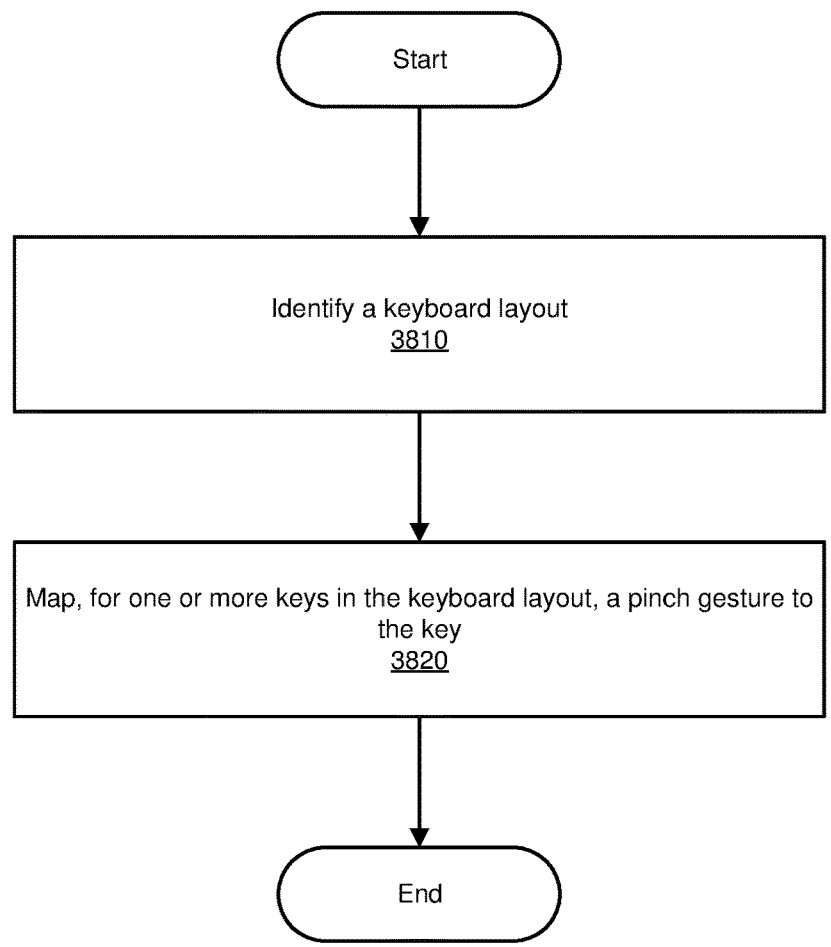
FIG. 38 is a flow diagram of an exemplary method for mapping pinch-based user input to a keyboard layout, in accordance with some embodiments.

FIG. 38 is a flow diagram of an exemplary computer-implemented method 3800 for displaying virtual keyboards. The steps shown in FIG. 38 may be performed by any suitable computer-executable code and/or computing system, including the system(s) illustrated in FIGS. 1-5, 10, and 39-44. In one example, each of the steps shown in FIG. 38 may represent an algorithm whose structure includes and/or is represented by multiple sub-steps, examples of which will be provided in greater detail below. In some examples, all or a portion of computer-implemented method 3800 may be performed by an operating system, an application programming interface, or an artificial-reality framework of a head-mounted display system. In other examples, all or a portion of computer-implemented method 3800 may be performed by a third-party application executing on a head-mounted display system.

As illustrated in FIG. 38, at step 3810 one or more of the systems described herein may identify a keyboard layout. For example, user-input system 120 may identify the layout of virtual keyboard 600 or a user-defined layout of a virtual keyboard. The term "layout" may refer to a relative positioning and orientation of keys of a virtual keyboard and/or the user input (e.g., characters or commands) that each key represents. At step 3820, one or more of the systems described herein may map a pinch gesture to one or more of the keys of the virtual keyboard. The systems described herein may perform step 3820 in a variety of ways. In some embodiments, the systems described herein may, when a keyboard layout is or is based on a common keyboard layout, map one or more of the keys of the virtual keyboard to a pinch gesture involving the finger or fingers that are known to be used by most users to press the keys. In some embodiments, the systems described herein may, when a keyboard layout is or is based on a user-customized keyboard layout, map one or more of the keys of the virtual keyboard to a user-selected pinch gesture.

As explained above, embodiments of the present disclosure may enable users to select text-based input (e.g., characters or words) and/or other types and forms of user input using pinch gestures. In some embodiments, the systems and methods described herein may use various sensors (e.g., optical sensors) to track the positions of a user's fingers and thumbs and may transform pinch gestures involving one or more fingers and a respective thumb into distinct alpha-numeric characters. By mapping the characters of standard keyboard layouts to particular finger-to-thumb pinch gestures, these systems and methods may enable users to have familiar touch-typing experiences without the need for conventional physical keyboards. Moreover, by employing pinch gestures for touch typing, the systems and methods described herein may enable a user's own fingertips to provide haptic feedback.

Example Embodiments

Example 1: A computer-implemented method that includes (1) monitoring, at a computing device via one or more sensors, positions of one or more fingers of a user relative to an opposing thumb of the user, (2) detecting, while monitoring the positions, a pinch gesture of the one or more fingers, (3) determining one or more user inputs to which at least the pinch gesture has been mapped, and (4) performing, at the computing device, a user-input operation based on the one or more user inputs.

Example 2: The computer-implemented method of Example 1, wherein (1) detecting the pinch gesture includes detecting a series of pinch gestures of the one or more fingers and determining the one or more user inputs includes determining that the series of pinch gestures has been mapped to the one or more user inputs.

Example 3: The computer-implemented method of Example 2, wherein (1) the one or more user inputs comprise a word, (2) the series of pinch gestures has been mapped to a plurality of words, and (3) the computer-implemented method further includes using a language model to predict that, out of all the plurality of words, the word is a most probable user input.

Example 4: The computer-implemented method of Example 1, wherein the one or more user inputs comprise one or more characters.

Example 5: The computer-implemented method of Example 4, wherein (1) the computer-implemented method further includes monitoring, at the computing device via the one or more sensors, an attribute of a hand of the user of which the one or more fingers are a part, (2) detecting the pinch gesture includes detecting a value of the attribute of the hand when the pinch gesture is made, and (3) determining the one or more user inputs includes determining that a combination of the pinch gesture and the value of the attribute is mapped to the one or more user inputs.

Example 6: The computer-implemented method of Example 5, wherein the attribute includes one or more of a height, a rotational orientation, or a rotation.

Example 7: The computer-implement method of Example 5, wherein (1) the one or more user inputs comprise a backspace input, (2) the pinch gesture includes a pinch gesture of the user's left index finger and the user's left thumb, and (3) the value of the attribute of the hand includes a counterclockwise rotation.

Example 8: The computer-implement method of Example 5, wherein (1) the one or more user inputs comprise a period character, (2) the pinch gesture includes a pinch gesture of the user's right index finger and the user's right thumb, and (3) the value of the attribute of the hand includes a clockwise rotation.

Example 9: The computer-implemented method of Example 5, further including (1) displaying, while the attribute of the hand of the user has an additional value, a first state of a virtual keyboard to the user, wherein the first state of the virtual keyboard is associated with the additional value and includes a virtual key associated with an additional one or more characters to which a combination of the additional value and the pinch gesture of the one or more fingers is mapped, (2) detecting a change of the attribute of the hand from the additional value to the value, and (3) displaying, in response to the change, a second state of the virtual keyboard to the user, wherein the second state of the virtual keyboard is associated with the value and includes an additional virtual key associated with the one or more characters.

Example 10: The computer-implemented method of Example 4, further including displaying, while monitoring the position, a virtual keyboard to the user, wherein the virtual keyboard includes a virtual key displaying the one or more characters.

Example 11: The computer-implemented method of Example 1, wherein (1) the computer-implemented method further includes monitoring, at the computing device via the one or more sensors, an attribute of an opposing hand of the user, (2) detecting the pinch gesture includes detecting a value of the attribute of the opposing hand when the pinch gesture is made, and (3) determining the one or more user inputs includes determining that a combination of the pinch gesture and the value of the attribute is mapped to the one or more user inputs.

Example 12: The computer-implemented method of Example 11, wherein the attribute includes a handshape.

Example 13: The computer-implement method of Example 12, wherein (1) the one or more user inputs comprise an uppercase letter and (2) the value of the attribute of the opposing hand includes a fist.

Example 14: The computer-implemented method of Example 1, further including (1) identifying a keyboard layout including (a) a first row of keys including at least a first key associated with the one or more fingers of the user, (b) a second row of keys including at least a second key associated with the one or more fingers of the user, and (c) a third row of keys including at least a third key associated with the one or more fingers of the user, (2) mapping a first combination of the pinch gesture and a first orientation of a hand of the user of which the one or more fingers are a part to a character associated with the first key, (3) mapping a second combination of the pinch gesture and a second orientation of the hand of the user to a character associated with the second key, and (4) mapping a third combination of the pinch gesture and a third orientation of the hand of the user to a character associated with the third key.

Example 15: The computer-implemented method of Example 1, further including (1) identifying a keyboard layout including (a) a first row of keys including at least a first key associated with the one or more fingers of the user, (b) a second row of keys including at least a second key associated with the one or more fingers of the user, and (c) a third row of keys including at least a third key associated with the one or more fingers of the user, (2) mapping the pinch gesture to a first character associated with the first key, (3) mapping the pinch gesture to a second character associated with the second key, (4) mapping the pinch gesture to a third character associated with the third key, (5) and using a language model to predict which of the first character, the second character, or the third character is a most probable user input.

Example 16: The computer-implement method of Example 1, wherein the pinch gesture includes one of (1) a pinch gesture of the user's left little finger and the user's left thumb that has been mapped to the letter a, (2) a pinch gesture of the user's left ring finger and the user's left thumb that has been mapped to the letter s, (3) a pinch gesture of the user's left middle finger and the user's left thumb that has been mapped to the letter d, (4) a pinch gesture of the user's left index finger and the user's left thumb that has been mapped to the letter f, (5) a pinch gesture of the user's left index and ring fingers and the user's left thumb that has been mapped to the letter g, (6) a pinch gesture of the user's right index and ring fingers and the user's left thumb that has been mapped to the letter h, (7) a pinch gesture of the user's right index finger and the user's right thumb that has been mapped to the letter j, (8) a pinch gesture of the user's right middle finger and the user's right thumb that has been mapped to the letter k, or (9) a pinch gesture of the user's right ring finger and the user's right thumb that has been mapped to the letter I.

Example 17: A system including (1) one or more sensors configured to capture data indicating positions of one or more fingers of a user relative to an opposing thumb of the user, (2) at least one physical processor, and (3) physical memory including computer-executable instructions that, when executed by the physical processor, cause the physical processor to (a) detect a pinch gesture of the one or more fingers, (b) determine one or more user inputs to which at least the pinch gesture has been mapped, and (c) perform, at the computing device, a user-input operation based on the one or more user inputs.

Example 19: The system of Example 17, wherein the system includes a head-mounted display device including the one or more sensors.

Example 20: A non-transitory computer-readable medium including one or more computer-executable instructions that, when executed by at least one processor of a computing device, cause the computing device to (1) monitor, at the computing device via one or more sensors, positions of one or more fingers of a user relative to an opposing thumb of the user, (2) detect, while monitoring the positions, a pinch gesture of the one or more fingers, (3) determine one or more user inputs to which at least the pinch gesture has been mapped, and (4) perform, at the computing device, a user-input operation based on the one or more user inputs.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 3900 in FIG. 39. Other artificial-reality systems may include an NED that also provides visibility into the real world (e.g., augmented-reality system 4000 in FIG. 40) or that visually immerses a user in an artificial reality (e.g., virtual-reality system 4100 in FIG. 41). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 39:
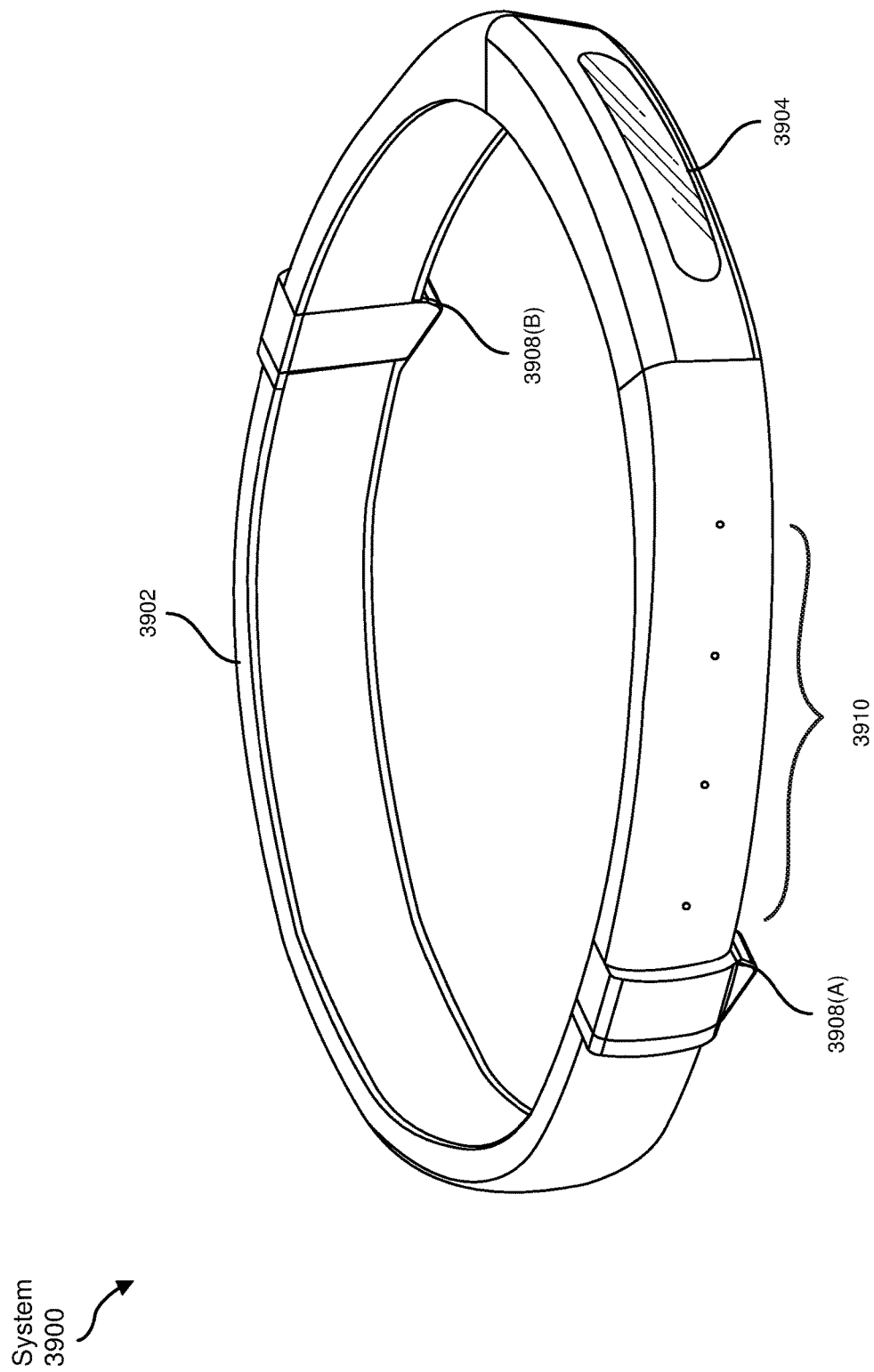
FIG. 39 is an illustration of an exemplary artificial-reality headband that may be used in connection with embodiments of this disclosure.

Turning to FIG. 39, augmented-reality system 3900 generally represents a wearable device dimensioned to fit about a body part (e.g., a head) of a user. As shown in FIG. 39, system 3900 may include a frame 3902 and a camera assembly 3904 that is coupled to frame 3902 and configured to gather information about a local environment by observing the local environment. Augmented-reality system 3900 may also include one or more audio devices, such as output audio transducers 3908(A) and 3908(B) and input audio transducers 3910. Output audio transducers 3908(A) and 3908(B) may provide audio feedback and/or content to a user, and input audio transducers 3910 may capture audio in a user's environment.

As shown, augmented-reality system 3900 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 3900 may not include an NED, augmented-reality system 3900 may include other types of screens or visual feedback devices (e.g., a display screen integrated into a side of frame 3902).

Figure 40:
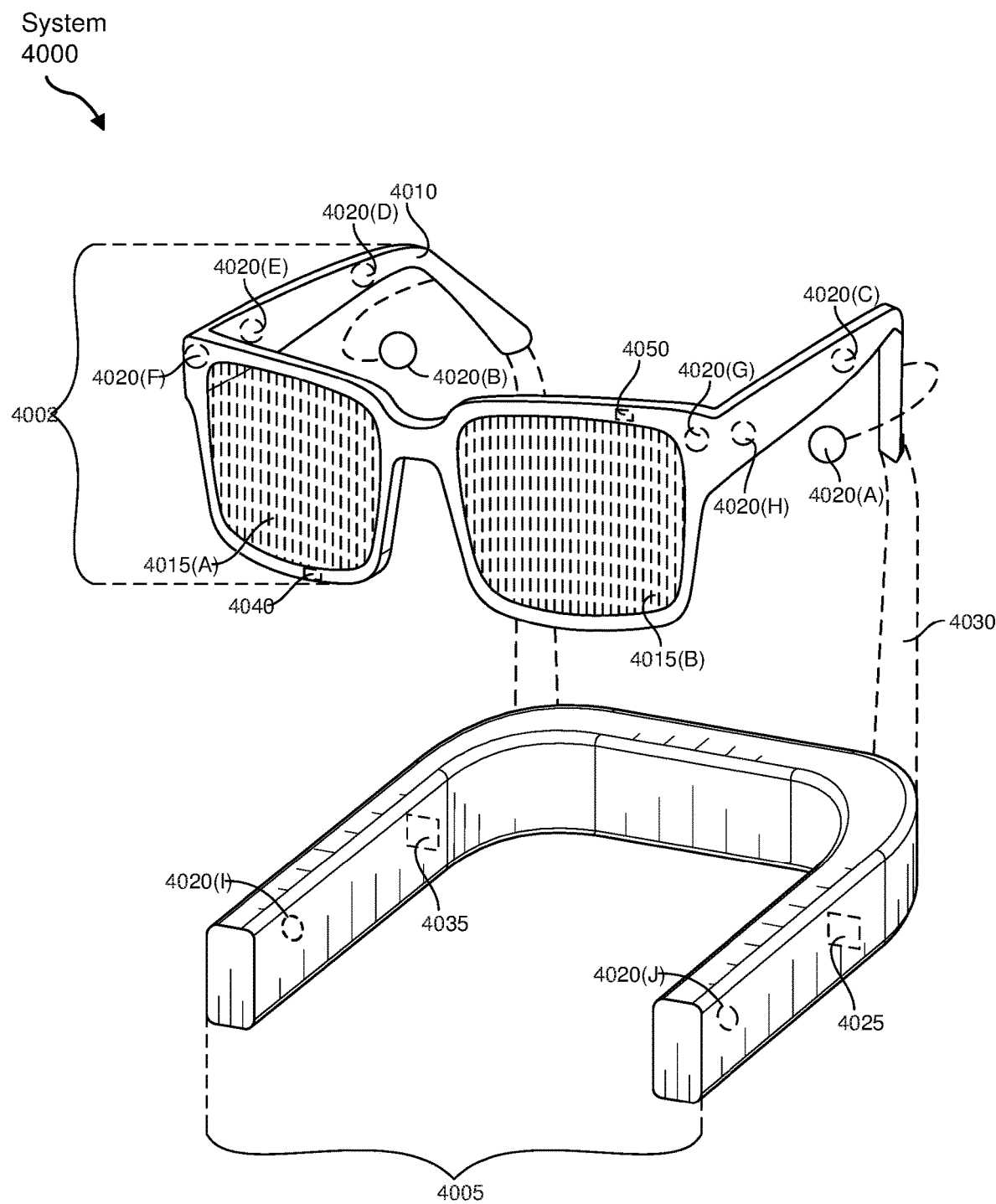
FIG. 40 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 40, augmented-reality system 4000 may include an eyewear device 4002 with a frame 4010 configured to hold a left display device 4015(A) and a right display device 4015(B) in front of a user's eyes. Display devices 4015(A) and 4015(B) may act together or independently to present an image or series of images to a user. While augmented-reality system 4000 includes two displays, embodiments of this disclosure may be implemented in augmented-reality systems with a single NED or more than two NEDs.

In some embodiments, augmented-reality system 4000 may include one or more sensors, such as sensor 4040. Sensor 4040 may generate measurement signals in response to motion of augmented-reality system 4000 and may be located on substantially any portion of frame 4010. Sensor 4040 may represent a position sensor, an inertial measurement unit (IMU), a depth camera assembly, or any combination thereof. In some embodiments, augmented-reality system 4000 may or may not include sensor 4040 or may include more than one sensor. In embodiments in which sensor 4040 includes an IMU, the IMU may generate calibration data based on measurement signals from sensor 4040. Examples of sensor 4040 may include, without limitation, accelerometers, gyroscopes, magnetometers, other suitable types of sensors that detect motion, sensors used for error correction of the IMU, or some combination thereof.

Augmented-reality system 4000 may also include a microphone array with a plurality of acoustic transducers 4020(A)-4020(J), referred to collectively as acoustic transducers 4020. Acoustic transducers 4020 may be transducers that detect air pressure variations induced by sound waves. Each acoustic transducer 4020 may be configured to detect sound and convert the detected sound into an electronic format (e.g., an analog or digital format). The microphone array in FIG. 2 may include, for example, ten acoustic transducers: 4020(A) and 4020(B), which may be designed to be placed inside a corresponding ear of the user, acoustic transducers 4020(C), 4020(D), 4020(E), 4020(F), 4020(G), and 4020(H), which may be positioned at various locations on frame 4010, and/or acoustic transducers 4020(I) and 4020(J), which may be positioned on a corresponding neckband 4005.

In some embodiments, one or more of acoustic transducers 4020(A)-(F) may be used as output transducers (e.g., speakers). For example, acoustic transducers 4020(A) and/or 4020(B) may be earbuds or any other suitable type of headphone or speaker.

The configuration of acoustic transducers 4020 of the microphone array may vary. While augmented-reality system 4000 is shown in FIG. 40 as having ten acoustic transducers 4020, the number of acoustic transducers 4020 may be greater or less than ten. In some embodiments, using higher numbers of acoustic transducers 4020 may increase the amount of audio information collected and/or the sensitivity and accuracy of the audio information. In contrast, using a lower number of acoustic transducers 4020 may decrease the computing power required by an associated controller 4050 to process the collected audio information. In addition, the position of each acoustic transducer 4020 of the microphone array may vary. For example, the position of an acoustic transducer 4020 may include a defined position on the user, a defined coordinate on frame 4010, an orientation associated with each acoustic transducer 4020, or some combination thereof.

Acoustic transducers 4020(A) and 4020(B) may be positioned on different parts of the user's ear, such as behind the pinna or within the auricle or fossa. Or, there may be additional acoustic transducers 4020 on or surrounding the ear in addition to acoustic transducers 4020 inside the ear canal. Having an acoustic transducer 4020 positioned next to an ear canal of a user may enable the microphone array to collect information on how sounds arrive at the ear canal. By positioning at least two of acoustic transducers 4020 on either side of a user's head (e.g., as binaural microphones), augmented-reality device 4000 may simulate binaural hearing and capture a 3D stereo sound field around about a user's head. In some embodiments, acoustic transducers 4020(A) and 4020(B) may be connected to augmented-reality system 4000 via a wired connection 4030, and in other embodiments, acoustic transducers 4020(A) and 4020(B) may be connected to augmented-reality system 4000 via a wireless connection (e.g., a Bluetooth connection). In still other embodiments, acoustic transducers 4020(A) and 4020(B) may not be used at all in conjunction with augmented-reality system 4000.

Acoustic transducers 4020 on frame 4010 may be positioned along the length of the temples, across the bridge, above or below display devices 4015(A) and 4015(B), or some combination thereof. Acoustic transducers 4020 may be oriented such that the microphone array is able to detect sounds in a wide range of directions surrounding the user wearing the augmented-reality system 4000. In some embodiments, an optimization process may be performed during manufacturing of augmented-reality system 4000 to determine relative positioning of each acoustic transducer 4020 in the microphone array.

In some examples, augmented-reality system 4000 may include or be connected to an external device (e.g., a paired device), such as neckband 4005. Neckband 4005 generally represents any type or form of paired device. Thus, the following discussion of neckband 4005 may also apply to various other paired devices, such as charging cases, smart watches, smart phones, wrist bands, other wearable devices, hand-held controllers, tablet computers, laptop computers and other external compute devices, etc.

As shown, neckband 4005 may be coupled to eyewear device 4002 via one or more connectors. The connectors may be wired or wireless and may include electrical and/or non-electrical (e.g., structural) components. In some cases, eyewear device 4002 and neckband 4005 may operate independently without any wired or wireless connection between them. While FIG. 40 illustrates the components of eyewear device 4002 and neckband 4005 in example locations on eyewear device 4002 and neckband 4005, the components may be located elsewhere and/or distributed differently on eyewear device 4002 and/or neckband 4005. In some embodiments, the components of eyewear device 4002 and neckband 4005 may be located on one or more additional peripheral devices paired with eyewear device 4002, neckband 4005, or some combination thereof.

Pairing external devices, such as neckband 4005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 4000 may be provided by a paired device or shared between a paired device and an eyewear device, thus reducing the weight, heat profile, and form factor of the eyewear device overall while still retaining desired functionality. For example, neckband 4005 may allow components that would otherwise be included on an eyewear device to be included in neckband 4005 since users may tolerate a heavier weight load on their shoulders than they would tolerate on their heads. Neckband 4005 may also have a larger surface area over which to diffuse and disperse heat to the ambient environment. Thus, neckband 4005 may allow for greater battery and computation capacity than might otherwise have been possible on a stand-alone eyewear device. Since weight carried in neckband 4005 may be less invasive to a user than weight carried in eyewear device 4002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 4005 may be communicatively coupled with eyewear device 4002 and/or to other devices. These other devices may provide certain functions (e.g., tracking, localizing, depth mapping, processing, storage, etc.) to augmented-reality system 4000. In the embodiment of FIG. 40, neckband 4005 may include two acoustic transducers (e.g., 4020(I) and 4020(J)) that are part of the microphone array (or potentially form their own microphone subarray). Neckband 4005 may also include a controller 4025 and a power source 4035.

Acoustic transducers 4020(I) and 4020(J) of neckband 4005 may be configured to detect sound and convert the detected sound into an electronic format (analog or digital). In the embodiment of FIG. 40, acoustic transducers 4020(I) and 4020(J) may be positioned on neckband 4005, thereby increasing the distance between the neckband acoustic transducers 4020(I) and 4020(J) and other acoustic transducers 4020 positioned on eyewear device 4002. In some cases, increasing the distance between acoustic transducers 4020 of the microphone array may improve the accuracy of beamforming performed via the microphone array. For example, if a sound is detected by acoustic transducers 4020(C) and 4020(D) and the distance between acoustic transducers 4020(C) and 4020(D) is greater than, e.g., the distance between acoustic transducers 4020(D) and 4020(E), the determined source location of the detected sound may be more accurate than if the sound had been detected by acoustic transducers 4020(D) and 4020(E).

Controller 4025 of neckband 4005 may process information generated by the sensors on neckband 4005 and/or augmented-reality system 4000. For example, controller 4025 may process information from the microphone array that describes sounds detected by the microphone array. For each detected sound, controller 4025 may perform a direction-of-arrival (DOA) estimation to estimate a direction from which the detected sound arrived at the microphone array. As the microphone array detects sounds, controller 4025 may populate an audio data set with the information. In embodiments in which augmented-reality system 4000 includes an inertial measurement unit, controller 4025 may compute all inertial and spatial calculations from the IMU located on eyewear device 4002. A connector may convey information between augmented-reality system 4000 and neckband 4005 and between augmented-reality system 4000 and controller 4025. The information may be in the form of optical data, electrical data, wireless data, or any other transmittable data form. Moving the processing of information generated by augmented-reality system 4000 to neckband 4005 may reduce weight and heat in eyewear device 4002, making it more comfortable to the user.

Power source 4035 in neckband 4005 may provide power to eyewear device 4002 and/or to neckband 4005. Power source 4035 may include, without limitation, lithium ion batteries, lithium-polymer batteries, primary lithium batteries, alkaline batteries, or any other form of power storage. In some cases, power source 4035 may be a wired power source. Including power source 4035 on neckband 4005 instead of on eyewear device 4002 may help better distribute the weight and heat generated by power source 4035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 4100 in FIG. 41, that mostly or completely covers a user's field of view. Virtual-reality system 4100 may include a front rigid body 4102 and a band 4104 shaped to fit around a user's head. Virtual-reality system 4100 may also include output audio transducers 4106(A) and 4106(B). Furthermore, while not shown in FIG. 41, front rigid body 4102 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 4000 and/or virtual-reality system 4100 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 4000 and/or virtual-reality system 4100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 3900, augmented-reality system 4000, and/or virtual-reality system 4100 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 39 and 41, output audio transducers 3908 (A), 3908(B), 4106(A), and 4106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 3910 may include condenser microphones, dynamic microphones, ribbon microphones, and/or any other type or form of input transducer. In some embodiments, a single transducer may be used for both audio input and audio output.

Figure 41:
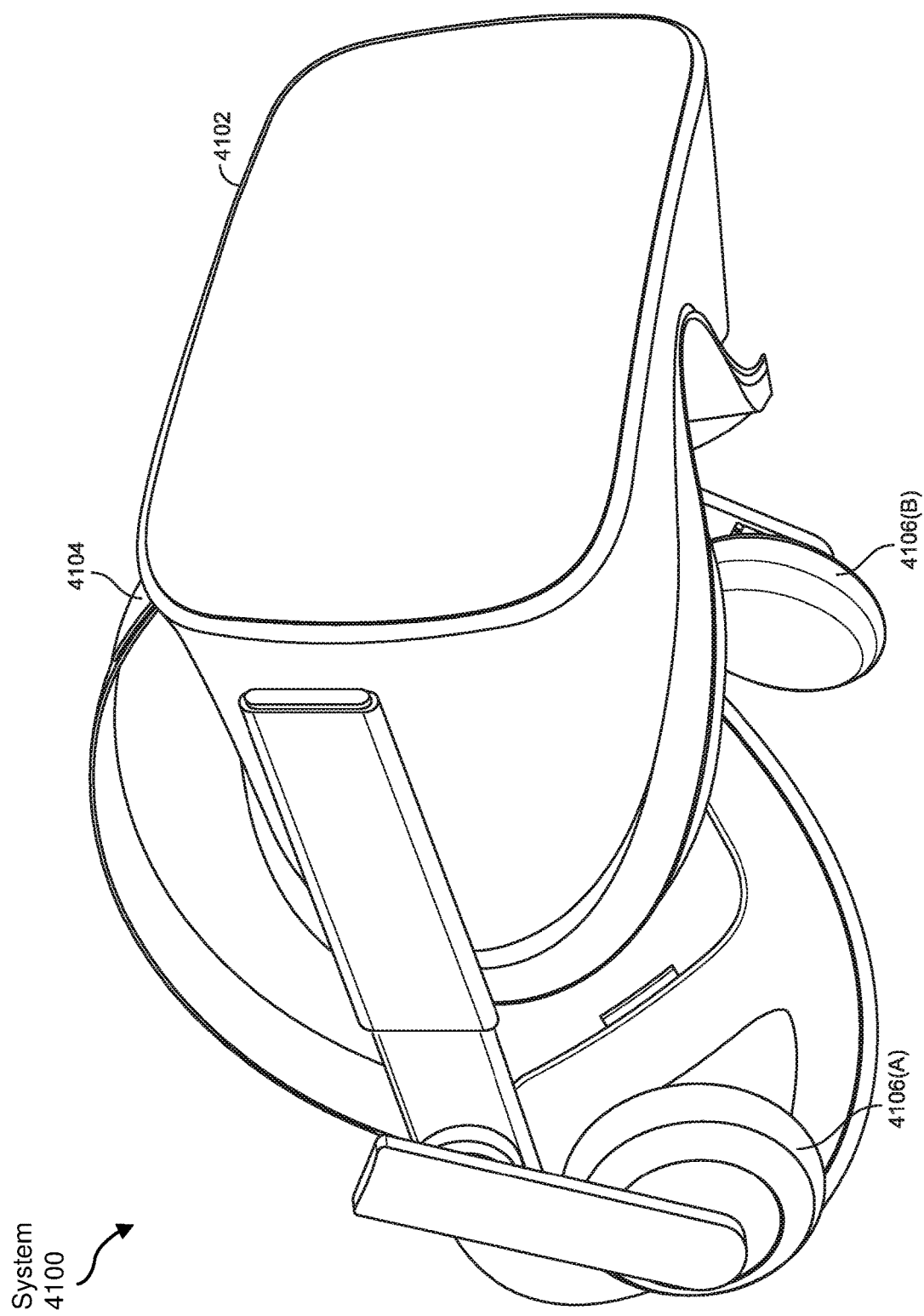
FIG. 41 is an illustration of an exemplary virtual-reality headset that may be used in connection with embodiments of this disclosure.

While not shown in FIGS. 39-41, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 3900, 4000, and 4100 of FIGS. 39-41, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's augmented-reality/virtual-reality device on demand.

As noted, artificial-reality systems 3900, 4000, and 4100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 42:
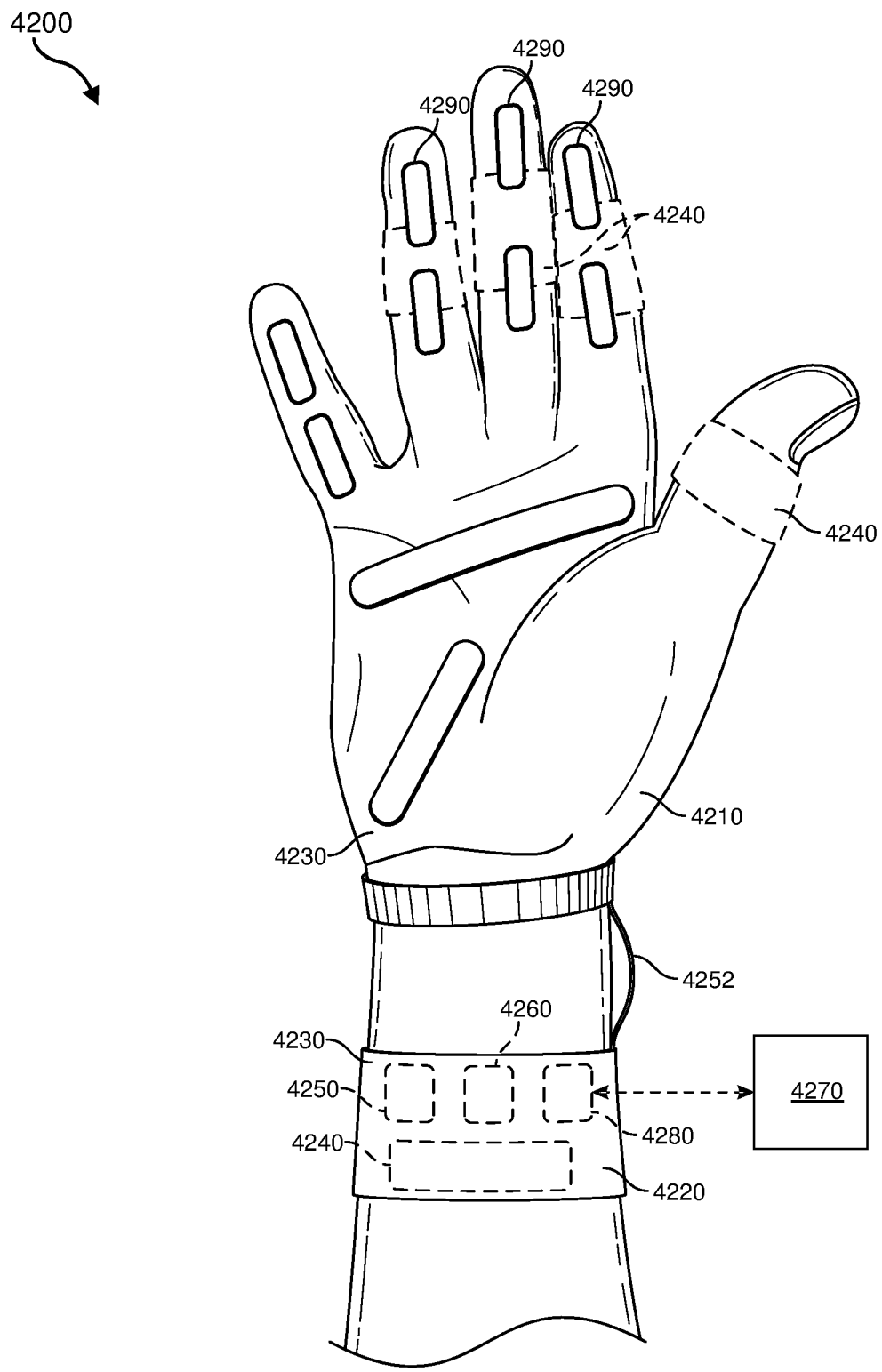
FIG. 42 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 42 illustrates a vibrotactile system 4200 in the form of a wearable glove (haptic device 4210) and wristband (haptic device 4220). Haptic device 4210 and haptic device 4220 are shown as examples of wearable devices that include a flexible, wearable textile material 4230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 4240 may be positioned at least partially within one or more corresponding pockets formed in textile material 4230 of vibrotactile system 4200. Vibrotactile devices 4240 may be positioned in locations to provide a vibrating sensation (e.g., haptic feedback) to a user of vibrotactile system 4200. For example, vibrotactile devices 4240 may be positioned against the user's finger(s), thumb, or wrist, as shown in FIG. 42. Vibrotactile devices 4240 may, in some examples, be sufficiently flexible to conform to or bend with the user's corresponding body part(s).

A power source 4250 (e.g., a battery) for applying a voltage to the vibrotactile devices 4240 for activation thereof may be electrically coupled to vibrotactile devices 4240, such as via conductive wiring 4252. In some examples, each of vibrotactile devices 4240 may be independently electrically coupled to power source 4250 for individual activation. In some embodiments, a processor 4260 may be operatively coupled to power source 4250 and configured (e.g., programmed) to control activation of vibrotactile devices 4240.

Vibrotactile system 4200 may be implemented in a variety of ways. In some examples, vibrotactile system 4200 may be a standalone system with integral subsystems and components for operation independent of other devices and systems. As another example, vibrotactile system 4200 may be configured for interaction with another device or system 4270. For example, vibrotactile system 4200 may, in some examples, include a communications interface 4280 for receiving and/or sending signals to the other device or system 4270. The other device or system 4270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 4280 may enable communications between vibrotactile system 4200 and the other device or system 4270 via a wireless (e.g., Wi-Fi, Bluetooth, cellular, radio, etc.) link or a wired link. If present, communications interface 4280 may be in communication with processor 4260, such as to provide a signal to processor 4260 to activate or deactivate one or more of the vibrotactile devices 4240.

Vibrotactile system 4200 may optionally include other subsystems and components, such as touch-sensitive pads 4290, pressure sensors, motion sensors, position sensors, lighting elements, and/or user interface elements (e.g., an on/off button, a vibration control element, etc.). During use, vibrotactile devices 4240 may be configured to be activated for a variety of different reasons, such as in response to the user's interaction with user interface elements, a signal from the motion or position sensors, a signal from the touch-sensitive pads 4290, a signal from the pressure sensors, a signal from the other device or system 4270, etc.

Although power source 4250, processor 4260, and communications interface 4280 are illustrated in FIG. 42 as being positioned in haptic device 4220, the present disclosure is not so limited. For example, one or more of power source 4250, processor 4260, or communications interface 4280 may be positioned within haptic device 4210 or within another wearable textile.

Figure 43:
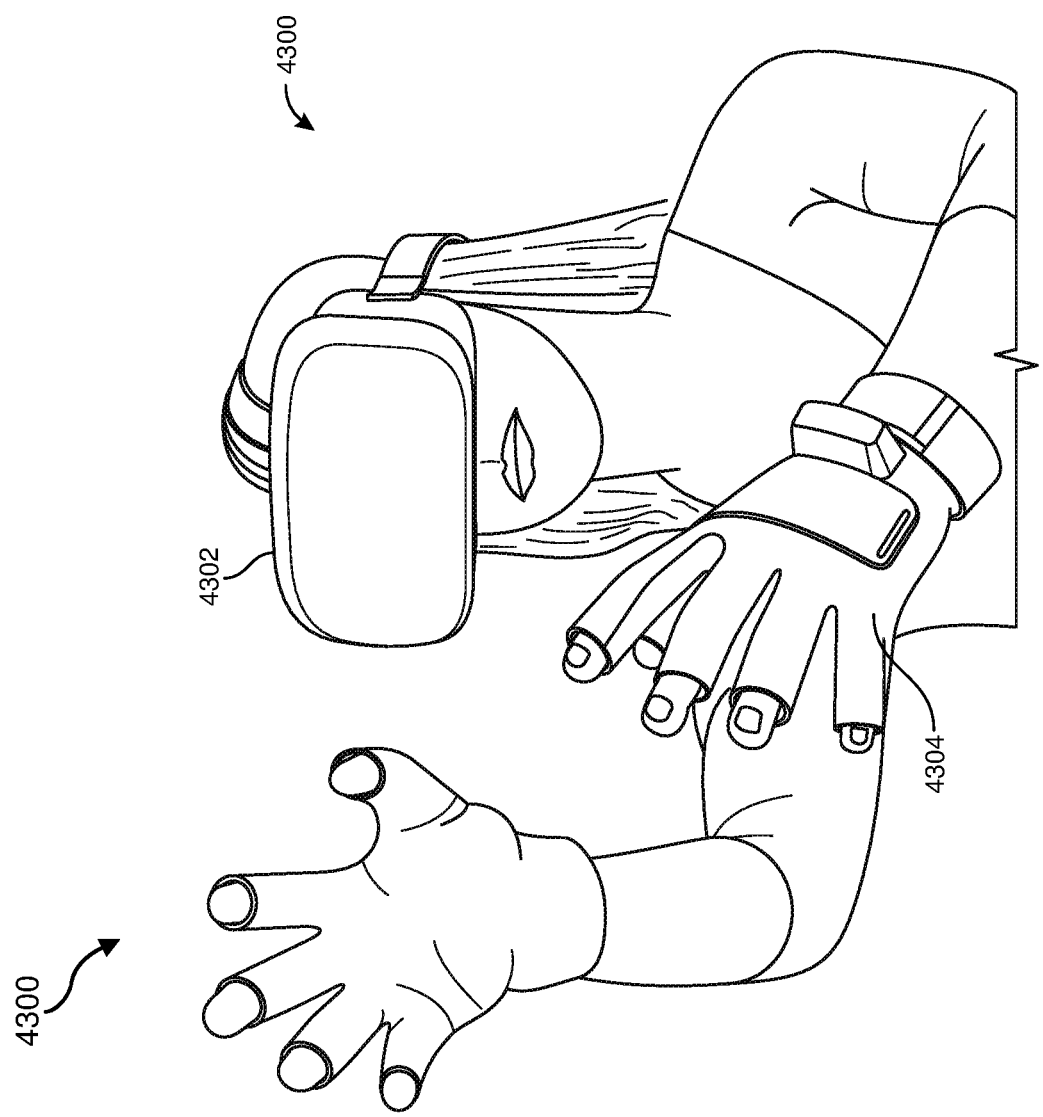
FIG. 43 is an illustration of an exemplary virtual-reality environment according to embodiments of this disclosure.

Haptic wearables, such as those shown in and described in connection with FIG. 42, may be implemented in a variety of types of artificial-reality systems and environments. FIG. 43 shows an example artificial-reality environment 4300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 4302 generally represents any type or form of virtual-reality system, such as virtual-reality system 4100 in FIG. 41. Haptic device 4304 generally represents any type or form of wearable device, worn by a user of an artificial-reality system, that provides haptic feedback to the user to give the user the perception that he or she is physically engaging with a virtual object. In some embodiments, haptic device 4304 may provide haptic feedback by applying vibration, motion, and/or force to the user. For example, haptic device 4304 may limit or augment a user's movement. To give a specific example, haptic device 4304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 4304 to send action requests to a console. Examples of action requests include, without limitation, requests to start an application and/or end the application and/or requests to perform a particular action within the application.

Figure 44:
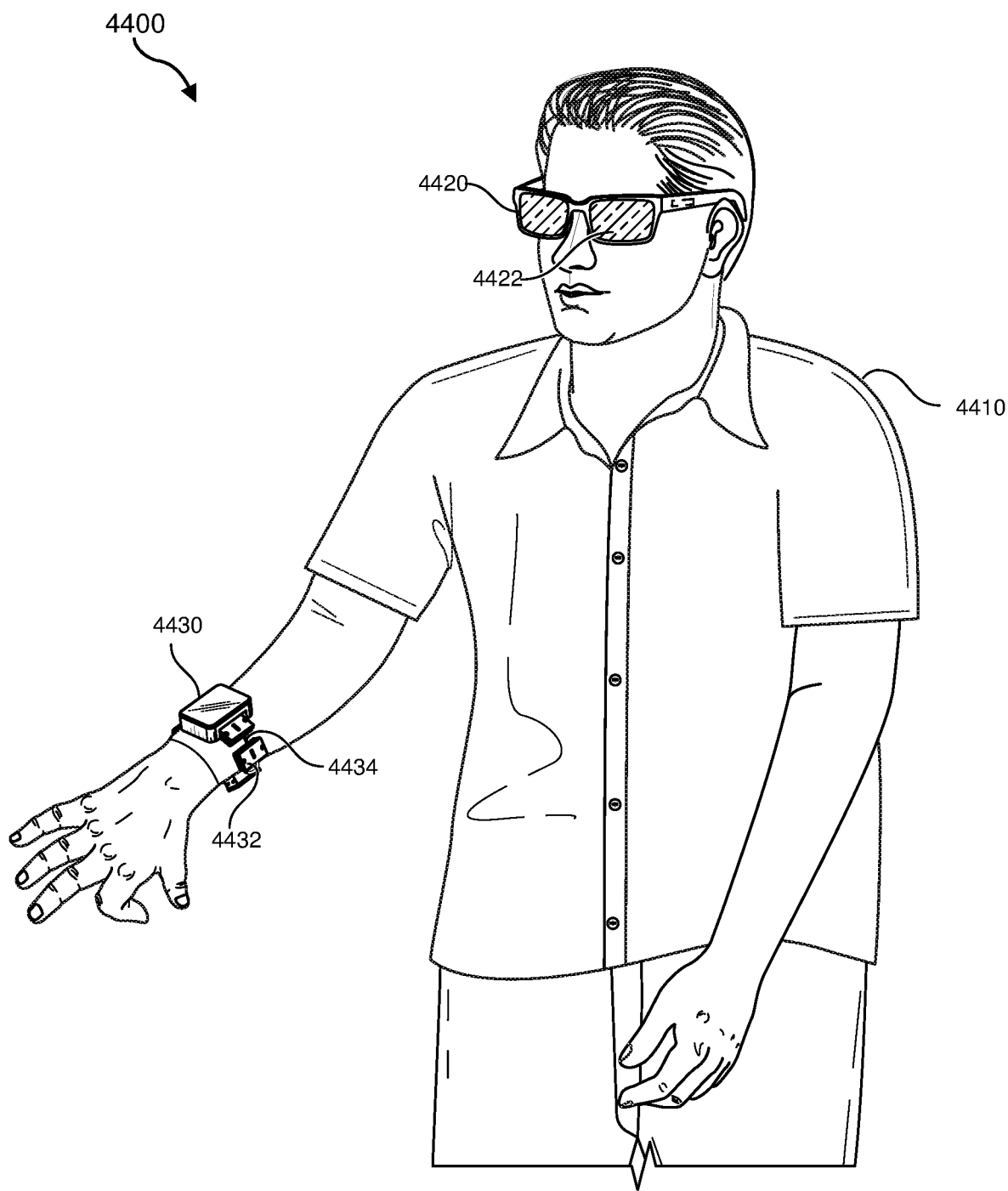
FIG. 44 is an illustration of an exemplary augmented-reality environment according to embodiments of this disclosure.

While haptic interfaces may be used with virtual-reality systems, as shown in FIG. 43, haptic interfaces may also be used with augmented-reality systems, as shown in FIG. 44. FIG. 44 is a perspective view of a user 4410 interacting with an augmented-reality system 4400. In this example, user 4410 may wear a pair of augmented-reality glasses 4420 that may have one or more displays 4422 and that are paired with a haptic device 4430. In this example, haptic device 4430 may be a wristband that includes a plurality of band elements 4432 and a tensioning mechanism 4434 that connects band elements 4432 to one another.

One or more of band elements 4432 may include any type or form of actuator suitable for providing haptic feedback. For example, one or more of band elements 4432 may be configured to provide one or more of various types of cutaneous feedback, including vibration, force, traction, texture, and/or temperature. To provide such feedback, band elements 4432 may include one or more of various types of actuators. In one example, each of band elements 4432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 4210, 4220, 4304, and 4430 may include any suitable number and/or type of haptic transducer, sensor, and/or feedback mechanism. For example, haptic devices 4210, 4220, 4304, and 4430 may include one or more mechanical transducers, piezoelectric transducers, and/or fluidic transducers. Haptic devices 4210, 4220, 4304, and 4430 may also include various combinations of different types and forms of transducers that work together or independently to enhance a user's artificial-reality experience. In one example, each of band elements 4432 of haptic device 4430 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive pinch gestures to be transformed, transform the pinch gestures into user input, output a result of the transformation to an application or method, use the result of the transformation to perform an operation based on the user input, and/or store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   associating a first plurality of keys of a virtual keyboard with one or more finger-to-thumb pinch gestures involving a first one of a user's fingers;
   associating a second plurality of keys of the virtual keyboard with one or more finger-to-thumb pinch gestures involving a second one of the user's fingers;
   monitoring, at a computing device via one or more sensors, positions of the user's fingers relative to a corresponding opposing thumb of the user;
   detecting, while monitoring the positions, a first finger-to-thumb pinch gesture involving the first one of the user's fingers;
   detecting, while monitoring the positions, a second finger-to-thumb pinch gesture involving the second one of the user's fingers;
   determining, in response to detecting the first and second finger-to-thumb pinch gestures, one or more user inputs to which the first and second finger-to-thumb pinch gestures have been associated;
   performing, at the computing device, a user-input operation based on the one or more user inputs; and
   presenting a result of performing the user-input operation to a display of the computing device.

2. The computer-implemented method of claim 1, wherein:
   the first one of the user's fingers involved in the first finger-to-thumb pinch gesture is a finger of the user's right hand; and
   the second one of the user's fingers involved in the second finger-to-thumb pinch gesture is a finger of the user's left hand.

3. The computer-implemented method of claim 1, wherein:
   the first plurality of keys of the virtual keyboard are associated with a first plurality of text characters;
   the second plurality of keys of the virtual keyboard are associated with a second plurality of text characters; and
   the computer-implemented method further comprises using a language model to predict which combination of the first plurality of text characters and the second plurality of text characters is a most probable user input.

4. The computer-implemented method of claim 1, wherein the first one of the user's fingers involved in the first finger-to-thumb pinch gesture is a ring finger.

5. The computer-implemented method of claim 1, wherein:
   the first finger-to-thumb pinch gesture is associated with a hand attribute;
   the computer-implemented method further comprises:
      monitoring, at the computing device via the one or more sensors, attributes of the user's hands;
      detecting an attribute of at least one of the user's hands when the first finger-to-thumb pinch gesture is made; and
   the one or more user inputs are determined based on the attribute.

6. The computer-implemented method of claim 5, wherein the attribute comprises one or more of:
   a height;
   a rotational orientation; or
   a rotation.

7. The computer-implemented method of claim 1, wherein:

the second one of the user's fingers is the user's left index finger;

associating the second plurality of keys of the virtual keyboard with the one or more finger-to-thumb pinch gestures involving the second one of the user's fingers comprises associating a backspace key of the virtual keyboard with the second finger-to-thumb pinch gesture involving the user's left index finger and a counterclockwise rotation of the user's left hand;

detecting the second finger-to-thumb pinch gesture involving the second one of the user's fingers comprises detecting the counterclockwise rotation of the user's left hand; and the one or more user inputs comprise a backspace input.

8. The computer-implemented method of claim 1, wherein:

the second one of the user's fingers is the user's right index finger;

associating the second plurality of keys of the virtual keyboard with the one or more finger-to-thumb pinch gestures involving the second one of the user's fingers comprises associating a space key of the virtual keyboard with the second finger-to-thumb pinch gesture involving the user's right index finger and a clockwise rotation of the user's right hand;

detecting the second finger-to-thumb pinch gesture involving the second one of the user's fingers comprises detecting the clockwise rotation of the user's right hand; and the one or more user inputs comprise a space character.

9. The computer-implemented method of claim 1, wherein:

the first one of the user's fingers is associated with a first virtual key and a second virtual key; and the computer-implemented method further comprises:

displaying, while the user's hand corresponding to the first one of the user's fingers has a first hand attribute, a first state of the virtual keyboard to the user, wherein the first state of the virtual keyboard is associated with the first hand attribute and comprises the first virtual key;

detecting a change from the first hand attribute to a second hand attribute; and displaying, in response to the change, a second state of the virtual keyboard to the user, wherein the second state of the virtual keyboard is associated with the second hand attribute and comprises the second virtual key.

10. The computer-implemented method of claim 1, further comprising displaying, while monitoring the positions of the user's fingers, the virtual keyboard to the user.

11. The computer-implemented method of claim 1, wherein:

the first finger-to-thumb pinch gesture is associated with an attribute of an opposing hand;

the computer-implemented method further comprises:

monitoring, at the computing device via the one or more sensors, attributes of the opposing hand of the user; and determining that the opposing hand has the attribute when the first finger-to-thumb pinch gesture is made; and the one or more user inputs are determined based on the opposing hand having the hand attribute when the first finger-to-thumb pinch gesture is made.

12. The computer-implemented method of claim 11, wherein the attribute comprises a handshape.

13. The computer-implemented method of claim 12, wherein associating the first plurality of keys with the one or more finger-to-thumb pinch gestures involving the first one of the user's fingers comprises associating a key representing an uppercase letter with a combination of the first finger-to-thumb pinch gesture and a first handshape.

14. The computer-implemented method of claim 1, wherein associating the first plurality of keys with the one or more finger-to-thumb pinch gestures involving the first one of the user's fingers comprises:

identifying a keyboard layout of the virtual keyboard comprising:

a first row of keys comprising at least a first key representing a first text character;

a second row of keys comprising at least a second key representing a second text character; and a third row of keys comprising at least a third key representing a third text character;

associating the first one of the user's fingers and a first orientation of a corresponding hand of the user with the first key;

associating the first one of the user's fingers and a second orientation of the corresponding hand of the user with the second key; and associating the first one of the user's fingers and a third orientation of the corresponding hand of the user with the third key.

15. The computer-implemented method of claim 1, wherein:

associating the first plurality of keys with the one or more finger-to-thumb pinch gestures involving the first one of the user's fingers comprises:

identifying a keyboard layout of the virtual keyboard comprising:

a first row of keys comprising at least a first key representing a first text character;

a second row of keys comprising at least a second key representing a second text character;

a third row of keys comprising at least a third key representing a third text character;

associating the first one of the user's fingers with the first key;

associating the first one of the user's fingers with the second key; and associating the first one of the user's fingers with the third key; and determining the one or more user inputs comprises using a language model to predict which of the first character, the second character, or the third character is a most probable user input.

16. The computer-implemented method of claim 1, wherein associating the first plurality of keys with the one or more finger-to-thumb pinch gestures involving the first one of the user's fingers comprises:

associating a key of the virtual keyboard representing the letter a with a finger-to-thumb pinch gesture involving the user's left little finger;

associating a key of the virtual keyboard representing the letter s with a finger-to-thumb pinch gesture involving the user's left ring finger;

associating a key of the virtual keyboard representing the letter d with a finger-to-thumb pinch gesture involving the user's left middle finger;

associating a key of the virtual keyboard representing the letter f with a finger-to-thumb pinch gesture involving the user's left index finger;

associating a key of the virtual keyboard representing the letter g with a finger-to-thumb pinch gesture involving the user's left index and middle fingers;
associating a key of the virtual keyboard representing the letter h with a finger-to-thumb pinch gesture involving the user's right index and middle fingers;
associating a key of the virtual keyboard representing the letter i with a finger-to-thumb pinch gesture involving the user's right index finger;
associating a key of the virtual keyboard representing the letter k with a finger-to-thumb pinch gesture involving the user's right middle finger; or
associating a key of the virtual keyboard representing the letter l with a finger-to-thumb pinch gesture involving the user's right ring finger.

17. A system comprising:
a display device;
one or more sensors configured to capture data indicating positions of a user's fingers relative to a corresponding opposing thumb of the user;
at least one physical processor; and
physical memory comprising computer-executable instructions that, when executed by the physical processor, cause the physical processor to:
associate a first plurality of keys of a virtual keyboard with one or more finger-to-thumb pinch gestures involving a first one of the user's fingers;
associate a second plurality of keys of the virtual keyboard with one or more finger-to-thumb pinch gestures involving a second one of the user's fingers;
detect a first finger-to-thumb pinch gesture involving the first one of the user's fingers;
detect a second finger-to-thumb pinch gesture involving the second one of the user's fingers;
determine, in response to detecting the first and second finger-to-thumb pinch gestures, one or more user inputs to which the first and second finger-to-thumb pinch gestures have been associated;
perform a user-input operation based on the one or more user inputs; and
present a result of performing the user-input operation to the display device.

18. The system of claim 17, wherein the system comprises a wristband comprising the one or more sensors.

19. The system of claim 17, wherein the system comprises a head-mounted display device comprising the one or more sensors.

20. A non-transitory computer-readable medium comprising one or more computer-executable instructions that, when executed by at least one processor of a computing device, cause the computing device to:
associate a first plurality of keys of a virtual keyboard with one or more finger-to-thumb pinch gestures involving a first one of a user's fingers;
associate a second plurality of keys of the virtual keyboard with one or more finger-to-thumb pinch gestures involving a second one of the user's fingers;
monitor, at the computing device via one or more sensors, positions of the user's fingers relative to a corresponding opposing thumb of the user;
detect, while monitoring the positions, a first finger-to-thumb pinch gesture involving the first one of the user's fingers;
detect, while monitoring the positions, a second finger-to-thumb pinch gesture involving the second one of the user's fingers;
determine, in response to detecting the first and second finger-to-thumb pinch gestures, one or more user inputs to which the first and second finger-to-thumb pinch gestures have been associated;
perform, at the computing device, a user-input operation based on the one or more user inputs; and
present a result of performing the user-input operation to a display of the computing device.

* * * * *

UNITED STATES PATENT AND TRADEMARK OFFICE
CERTIFICATE OF CORRECTION

PATENT NO. : 11,150,800 B1
APPLICATION NO. : 16/571274
DATED : October 19, 2021
INVENTOR(S) : Longest It is certified that error appears in the above-identified patent and that said Letters Patent is hereby corrected as shown below:

In the Claims

In Column 30, Line 6, Claim 13, delete "first" and insert -- fist --, therefor.

In Column 31, Line 8, Claim 16, delete "i" and insert -- j --, therefor.

Signed and Sealed this
Nineteenth Day of April, 2022

Katherine Kelly Vidal
*Director of the United States Patent and Trademark Office*